United States Patent [19]

Koza

[11] Patent Number: 5,136,686
[45] Date of Patent: Aug. 4, 1992

[54] NON-LINEAR GENETIC ALGORITHMS FOR SOLVING PROBLEMS BY FINDING A FIT COMPOSITION OF FUNCTIONS

[76] Inventor: John R. Koza, 25372 La Rena La., Los Altos Hills, Calif. 94022

[21] Appl. No.: 787,748

[22] Filed: Nov. 5, 1991

Related U.S. Application Data

[63] Continuation of Ser. No. 500,791, Mar. 28, 1990, abandoned, which is a continuation-in-part of Ser. No. 196,973, May 20, 1988, Pat. No. 4,935,877.

[51] Int. Cl.$^5$ .................................................. G06F 15/18
[52] U.S. Cl. ......................................................... 395/13
[58] Field of Search ........................................... 395/13

[56] References Cited

U.S. PATENT DOCUMENTS

| | | | |
|---|---|---|---|
| 4,479,241 | 10/1984 | Buckley | 364/513 |
| 4,675,829 | 6/1987 | Clemenson | 364/513 |
| 4,697,242 | 9/1987 | Holland et al. | 364/513 |
| 4,821,333 | 4/1989 | Gillies | 382/41 |

*Primary Examiner*—Allen R. MacDonald
*Attorney, Agent, or Firm*—Blakely, Sokoloff, Taylor & Zafman

[57] ABSTRACT

The present invention is a non-linear genetic algorithm for problem solving. The iterative process of the present invention operates on a population of problem solving entities. First, the activated entities perform producing results. Then the results are assigned values and associated with the producing entity. Next, entities having relatively high associated values are selected. The selected entities perform either crossover or fitness proportionate reproduction. In addition other operations such as mutation, permutation, define building blocks and editing may be used. Lastly, the newly created entities are added to the population.

This invention disclosed herein is useful for solving at least three groups of problems. The first group of problems consists of a problem that presents itself under several different names, namely, the problem of symbolic function identification, symbolic regression, empirical discovery, modeling, induction, chaos, and forecasting.

The second group of problems contains several similar, but different, problems. This group contains the problems of symbolic integration, symbolic differentiation, symbolic solution of differential equations, symbolic solution of integral equations, symbolic solution of mathematical equations, and inverses.

The third group of problems contains several other seemingly different, but related, problems, namely, function learning, planning, automatic programming, game playing, concept formulation, pattern recognition, and neural net design.

All of these problems can be formulated and then solved in the manner described herein.

50 Claims, 21 Drawing Sheets

NON-LINEAR GENETIC ALGORITHMS FOR SOLVING PROBLEMS BY FINDING A FIT COMPOSITION OF FUNCTIONS

This is a continuation of application Ser. No. 07/500,791, now abandoned, filed Mar. 28, 1990, which is a continuation-in-part of application Ser. No. 07/196,973, filed May 20, 1988, now Pat. No. 4,935,877.

BACKGROUND OF THE INVENTION

1. The Field of the Invention

The field of the invention is that of genetic algorithms. More specifically, the field is genetic algorithms useful for problem solving. The field spans the range of problems wherein a fit composition of functions may be found as a solution to the problem.

2. The Prior Art

Genetic algorithms provide a method of improving a given set of objects. The processes of natural selection and survival of the fittest provide a theoretical base. Genetic algorithms in their conventional form can solve many problems. However, the problem of the Prisoner's Dilemma illustrates the limitations of conventional genetic algorithms.

The Prisoner's Dilemma is a well-researched problem in game theory (with numerous psychological, sociological, and geopolitical interpretations) in which two players can either cooperate or not cooperate. The players make their moves simultaneously and without communication. Each player then receives a payoff that depends on his move and the move of the other player.

The payoffs in the Prisoner's Dilemma game are arranged so that a non-cooperative choice by one player (when the other player is cooperating) yields the non-cooperative player a greater payoff than a cooperative choice; but, if both players cooperate, they are both better off than if they both do not cooperate. Moreover, if both players are selfishly non-cooperative, they are both worse off than if they had both cooperated. The game is not a "zero sum game" because, among other things, both players are better off if they both cooperate.

Applying the conventional genetic-algorithm to a specific problem requires that a representation scheme be created to represent possible solutions to the problem as an individual chromosome amongst a large population of chromosomes. In the Prior Art, each individual chromosome in this population must take the form of a character string over a fixed alphabet, most typically a presentation of 0's and 1's (i.e. binary "bits") of the same length. The creation of this representation scheme (coding scheme) is an inherent part of the conventional genetic algorithm because the codes undergo manipulation when the genetic algorithm is actually applied.

In the case of a game, an individual in this population is a particular "strategy" for playing the game. A "strategy" for a given player in a game is a way of specifying what move the player is to make at a particular point in a game given all the allowable moves and information about the state of the game which is available to the player. In the case of the Prisoner's Dilemma game, the allowable moves for a particular player are always the same two alternatives—the player can cooperate or not. The information available to the player consists of the history of previous moves from the beginning of the game.

The chapter concerning game playing entitled "The Evolution of Strategies in the Iterated Prisoner's Dilemma" by Robert Axelrod in *Genetic Algorithms and Simulated Annealing* (1987) illustrates the general nature of conventional genetic algorithms and how they apply to specific problems. In particular, it illustrates the process by which a mathematical problem is converted into a form involving strings of 0's and 1's (i.e. strings of binary "bits") of the same length. Thus, the conventional genetic algorithm can be applied to the problem.

In his article on the Prisoner's Dilemma, Axelrod began by noting that there are 4 possible ways the previous play could have occurred (i.e. cooperation or non-cooperation by each of the 2 players). In order to represent this game within the confines of the conventional genetic algorithm, Axelrod decided to base a player's next move only on knowledge of the history of the previous 3 plays. Having made this limitation, there are then 64 possible previous play histories (i.e. 4 times 4 times 4). In this kind of representation scheme, the history of plays by both players for the previous 3 plays are associated with one of the 64 bit positions in a binary string of length 64. For example, bit position 64 might refer to cooperative plays by both players on all 3 previous plays (i.e. previous plays of CCCCCC). A "1" in bit position 64 of this string of length 64 might then instruct the player to cooperate on the current play if the previous plays have been CCCCCC. The entire string of 64 0's and 1's constitutes a complete way of telling the player how to move on the next play based on the history of the previous 3 plays. (In the article, Axelrod actually expands this binary string to length 70 to accommodate 6 special bit positions to deal with the very beginning of the game when there is no history).

After developing the representation scheme, the genetic algorithm begins by randomly creating a population of individual binary strings of length 70. The "fitness" of each of these individual strings (strategies) is then evaluated in an "environment" (which, in this case, consists of a series of different games). In order to play a particular game of the series in this "environment," it is necessary to refer to the appropriate bit position in the string of 70 0's and 1's for each move and then make the indicated move in the game; then, play the entire game; and, then, determine the payoff to the player for the game for following that particular individual strategy. These payoffs are then accumulated (and averaged) over the entire series of games to determine the average fitness of a particular individual strategy. Since each of the 70 bit positions in the binary string of length 70 represent a different past history, the series of games used to evaluate a given individual string would ideally contain a statistically meaningful number of different moves involving each of the 70 past histories.

The genetic algorithm then proceeds by identifying the best individual strategies in the current population and creates offspring for the next generation of individuals using the fittest individual strategies. As in nature, each offspring inherits some genetic traits from each parent in a process of "crossing" some genetic traits from each parent. The process of reproduction by the fittest and crossover tends to produce, over a period of many generations, a population with increasing overall fitness in the environment involved.

Axelrod achieved results from applying the conventional genetic algorithm to the Prisoner's Dilemma game that paralleled other mathematical research and international competitions on how to best play this game. However, it should be noted that the conventional genetic algorithm imposed four important limitations which restrict its usefulness in solving this particular gaming problem and other problems that have been studied.

First, the requirement that each individual in the population be a string of the same length required Axelrod to arbitrarily limit the player considering only a pre-determined number of previous plays (three here) in deciding how to make the next move. This meant possibly ignoring an opponent's previous history of deceitful "surprise attacks" if they occurred more than three moves in the past. Obviously, in many situations, a player whose strategy involves arbitrarily and intentionally ignoring available past history (particularly past history as recent as three moves earlier) would be susceptible to some devastating simple counter-strategies by the opposing player.

Secondly, the use of a binary string (a string of 0's and 1's) led to a representation scheme involving an explosively large number of "different" strategies merely to handle consideration of only the three previous plays ($2^{70}$ strategies—over a billion trillion). In contrast, if the representation scheme were not required to be rigidly structured in advance prior to the start of operation of the conventional genetic algorithm, a representation scheme involving only a relative handful of relevant possible histories might have evolved (e.g. "the opponent always cooperates", "the opponent cooperates about half of the time", etc).

Thirdly, the individuals in the population were representational descriptions (codings) of the strategy (as opposed to being actionable procedures which directly made the actual move in the game). Any particular strategy that one envisions and wants to include in the population had to be first coded into a binary string of length 70 before it could be inserted into the population. And, before any play could be made using a strategy, the binary string of length 70 had to be decoded into actionable instructions to make a move in a particular situation.

Fourthly, the binary strings of fixed length provide no hierarchical structure for potential solutions to the problem. The binary string is one dimensional. All items in the string operate at the same level. The significance and desirability of hierarchical structure for solving problems will be seen later.

Whatever the solution's structure, the natural selection process provides a powerful tool for problem solving. This is shown by nature and its various examples of biological entities that survive in various environments. In nature, complex combinations of traits give particular biological populations the ability to adapt, survive, and reproduce in their environments. Equally impressive is the complex, relatively rapid, and robust adaptation and relatively good interim performance that occurs amongst a population of individuals in nature in response to changes in the environment. Nature's methods for adapting biological populations to their environment and nature's method of adapting these populations to successive changes in their environments (including survival and reproduction of the fittest) provides a useful model. This model can develop methods to solve a wide variety of complex problems which are generally thought to require "intelligence" to solve.

In nature, a gene is the basic functional unit by which hereditary information is passed from parents to offspring. Genes appear at particular places (called gene "loci") along molecules of deoxyribose nucleic acid (DNA). DNA is a long thread-like biological molecule that has the ability to carry hereditary information and the ability to serve as a model for the production of replicas of itself. All known life forms on this planet (including bacteria, fungi, plants, animals, and human) are based on the DNA molecule.

The so-called "genetic code" involving the DNA molecule consists of long strings (sequences) of 4 possible gene values that can appear at the various gene loci along the DNA molecule. For DNA, the 4 possible gene values refer to 4 "bases" named adenine, guanine, cytosine, and thymine (usually abbreviated as A, G, C, and T, respectively). Thus, the "genetic code" in DNA consists of a long strings such as CTCGACGGT . . .

When living cells reproduce, the genetic code in DNA is read. Subsequences consisting of 3 DNA bases are used to specify one of 20 amino acids. Large biological protein molecules are, in turn, made up of anywhere between 50 and 500 such amino acids. Thus, this genetic code is used to specify and control the building of new living cells from amino acids.

A chromosome consists of numerous gene loci with a specific gene value (called an "allele") at each gene loci. The chromosome set for a human being consists of 23 chromosomes, and a typical human chromosome contains about 150,000,000 gene values. The 23 human chromosomes together provide the information necessary to describe one individual human being and contain about 3,000,000,000 genes. These 3,000,000,000 genes constitute the so-called "genome" for one particular human being. Complete genomes of the approximately 5,000,000,000 living human beings together constitute the entire pool of genetic information for the human species. It is known that certain gene values occurring at certain places in certain chromosomes control certain traits of the individual, including traits such as eye color, susceptibility to particular diseases, etc. Thus, our current world population of humans can be viewed as a product of a genetic algorithm.

*Adaptation in Artificial and Natural Systems*, by Professor John H. Holland, summarizes Holland's research in genetic algorithms and presents an overall mathematical theory of adaptation for both natural and artificial systems. A key part of this book described a "genetic algorithm" patterned after nature's methods for biological adaptation. However, a limitation of this work resides in using fixed length binary strings to represent the population. U.S. Pat. No. 4,697,242 (Holland) and U.S. Pat. No. 4,881,178 (Holland) are examples of processes which use fixed length binary strings with a genetic algorithm.

Empirical studies by various researchers have demonstrated the capabilities of such genetic algorithms in many diverse areas, including function optimization (De Jong 1980), operation of a gas pipeline (Goldberg 1983), pattern recognition (Englander in Grefenstette, 1985), and many others.

In the chapter entitled "An Overview" contained in the 1987 collection *Genetic Algorithms and Simulated Annealing*, Lawrence Davis and Martha Steenstrup stated, "In all of Holland's work, and in the work of many of his students, chromosomes are bit strings—lists of 0's and 1's." In addition, they continue, "Some researchers have explored the use of other representations, often in connection with industrial algorithms. Examples of other representations include ordered lists (for bin-packing), embedded lists (for factory scheduling problems), variable-element lists (for semiconductor layout), and the representations used by Glover and Grefenstette in this volume."

Some researchers have attempted to solve search and optimization problems using schemes patterned after evolution that employed mutation-plus-save-the-best strategies. Examples are Box (1957), Hicklin (1986), and the 1966 book by Fogel, Owens, and Walsh entitled *Artificial Intelligence Through Simulated Evolution*. The few results obtained from these efforts were highly specific to particular applications and domains and largely reflect the cleverness of implementation of the mutation concept rather than its usefulness as a general technique for achieving adaptive increases in fitness in populations. It is important to note that mutation is not the primary means by which biological populations in nature improve their fitness and it is not the primary means used in the present invention.

Since Holland's 1975 book, Holland and various colleagues have developed a novel application of conventional genetic algorithms called a "classifier system". A classifier system is a group of rules. Each rule consists of a conditional part and an action part (i.e. an IF-THEN rule). Both the conditional part and action part of each rule are like the individuals in the conventional genetic algorithm in that they are a strings of 0's and 1's of fixed length. In a classifier system, messages (consisting of binary strings) are received from the environment and activate those rules whose conditional part ("IF" part) match the message (binary string) coming in. This activation triggers the action part ("THEN" part) of the rule. The action part of a rule sends out a new message (binary string).

Classifier Systems are described in the 1978 article "Cognitive Systems based on Adaptive Algorithms" (by Holland and Judith S. Reitman) published in *Pattern-Directed Inference Systems*, edited by D. A. Waterman and Frederick Hayes-Roth; and David E. Goldberg's 1983 dissertation entitled *Computer-Aided Gas Pipeline Operations Using Genetic Algorithms and Rule Learning*. In classifier systems, credit is assigned to chains of individual rules that are invoked by a credit allocation scheme known as the "bucket brigade". The Holland process is a combination of a classifier system and a "bucket brigade algorithm". A 1987 paper by Cory Fujiki and John Dickinson in *Genetic Algorithms and Their Applications: Proceedings of the Second International Conference on Genetic Algorithms*, (edited by John J. Grefenstette) describes a computer program for a classifier system written in LISP for solving the Prisoner's Dilemma using binary strings of fixed length and IF-THEN classifier rules. In addition, Smith (1980, 1983) has placed IF-THEN rules in genetic strings in lieu of individual characters.

We call conventional genetic algorithms "linear" because they manipulate strings (sequences) of characters over a fixed alphabet (typically strings of binary digits 0 and 1). This is in contrast to the "non-linear" situation in which the objects being manipulated are hierarchical expressions consisting of a hierarchical arrangement of functions and arguments.

The reasons for limiting the conventional genetic algorithm to binary strings of fixed length appear in the literature. First, in his 1983 dissertation entitled *Computer-Aided Gas Pipeline Operation Using Genetic Algorithms and Rule Learning*, David E. Goldberg argues that any binary string of the common fixed length always has an interpretation (via a well-defined representation scheme) to the problem being solved. This might be called the property of being "well defined" and it is a desirable property.

Secondly, if each individual in the population consists of a binary string of fixed length, then the crossover operation will always produce another binary string of fixed length when applied to any two individuals in the population. This might be called a "closure" property and it is also a desirable property. Of course, binary strings of fixed length are not the only way of achieving these desirable properties of closure and being well-defined.

In *Adaptation in Natural and Artificial Systems* (1975, page 71), Holland argues in favor of strings consisting only of 0's and 1's (i.e. binary strings) in the conventional genetic algorithm on the basis that the number of strings in the search space that are searched automatically using what he calls the "implicit parallelism" of the conventional genetic algorithm is highest when the strings consist only of two possibilities. This point is true; however, it should not be the controlling consideration. For various reasons cited hereinafter, limiting the genetic algorithm to the one dimensional world of linear strings of fixed length (and, in particular, binary strings of fixed length) precludes solving many problems.

The field of computer science is replete with other situations where it is highly unrealistic to assume that the size or shape of a problem is known in advance to the solver so that he can use this information to rigidly pre-specify the size and shape of his search in advance. An elementary example from information theory illustrates this point. Huffman codes are binary strings of variable length that are used to maximize the amount of information that can be transmitted over a given channel. Huffman codes are somewhat similar to Morse code in that more frequent messages (letters, such as "e") are assigned codes of shorter length and less frequent messages are assigned codes of longer length. The Huffman coding algorithm starts with the messages that are to be transmitted and their probability of occurrence. The algorithm then assigns relatively short binary strings to the most frequent messages and relatively long binary strings to the rarer messages. The size of the strings needed in a Huffman coding scheme is not known in advance, but it is determined after applying the algorithm to the particular set of messages and their respective probabilities. Any attempt to decipher a Huffman code by searching and matching strings must take the length of longest binary strings actually used by the coding algorithm into account.

Using fixed length binary strings in conventional genetic algorithm limits their ability to solve many problems. The following 3 separate example problems illustrate additional limitations of conventional genetic algorithms.

First, suppose we want a computer to program itself to solve the problem of finding the point at which two intersecting straight lines intersect. The point of intersection of two straight lines is the pair of numbers that satisfy the two linear equations in two variables that represent the lines. Thus, the computer program we are seeking would use the coefficients of the two equations and various mathematical operators (such as multiplication, subtraction, etc.) to produce the desired answer. To make the problem of having a computer learning to program itself more realistic, it is best not to specify in advance the size or shape of the mathematical expression needed to solve the problem. It is also more realistic if the computer had access to various irrelevant inputs and extraneous mathematical operations to confuse its search to find the solution to the problem.

There is no simple or convenient way to uniquely associate a binary string whose length is predetermined in advance with an arbitrary mathematical expression composed of specified mathematical operations (functions) and arguments. A binary string of length n can only represent $2^n$ different things (no matter what the representation scheme). No matter how large an n is pre-selected in advance, there are additional mathematical expressions.

Before continuing, it should be emphasized that it is not necessary to represent things of infinite size. Rather, what should be avoided is arbitrarily pre-setting a limit on the size and shape of the things being represented (even though any particular thing will itself be finite in size). In most problems, the size and shape of the solution are not necessarily known in advance. The process of solving the problem should be free to develop proposed solutions without any pre-set limit on the size and shape of the solution.

Even if an arbitrary maximum length specified in advance were acceptable, the method for associating each arbitrary mathematical expression (for example: $A*B+C-D*E*F$) with a binary string would necessarily obscure the underlying mathematical operations involved. The highly complex method used by Godel in 1931 in his proof of the Incompleteness Theorem is an example of such a method for making this kind of association. Thus, this first example problem highlights the need to be able to represent arbitrary mathematical expressions (involving various functions and arguments) whose length is not arbitrarily limited in advance (rather than merely strings of 0's and 1's of the same fixed length).

It should be noted that if it is assumed that the two straight lines in this problem always intersect, the problem is entirely numerical. However, if the two lines might possibly be parallel, the answer from a computer program to this expanded version of the problem might appropriately be a symbolic response (e.g. "The Equations are inconsistent and the lines are parallel") rather than the numeric location of the point of intersection. This situation can be easily recognized by a computer program by checking to see if a certain computed value (the determinant) is zero. Thus, this expanded version of this first example problem highlights the need occasionally to accommodate symbolic processing and symbolic output from a computer program that normally produces a numeric output.

Second, consider the problem of predicting the future elements of a sequence of numbers from a sampling of early numbers from the sequence. This problem is an example of induction. Induction is the logical process by which one observes specific examples of some process (e.g. "The sun has come up every morning so far during my life") and then "induces" a reasonable underlying rule for the process (e.g. "The sun always comes up in the morning"). In applying inductive reasoning, there is no proof that the result is correct. Nonetheless, the process of induction is very important and indeed lies at the heart of all learning.

In contrast, deduction is the logical process in which one starts with some given premises (or facts) and some deductive rules of inference and then reaches a logical conclusion by repeatedly applying the deductive rules to the original given premises or facts. The sequence of steps used in deduction to reach a conclusion is called the proof.

If one is given a sampling of a sequence of numbers such as 0, 2, 4, 6, 8, 10, 12, 14 it is not difficult to reasonably induce that the next number in the sequence is 16. The number 16 is a reasonable induction because each previous element of the sequence is 2 times the element's position in the sequence (counting the first element as position 0). Note, however, that even elements of this simple numerical sequence cannot be represented with strings whose length has been specified in advance.

More interesting sequences involve more complicated mathematical operations. For example, the 6th element of the sequence 2, 4, 8, 16, 32, can be expressed directly in mathematics as 2 raised to the 6th power (i.e. 64). This sequence can also be expressed in mathematics using a recursion—that is, by defining the 6th element in terms of previous element(s) in the sequence. In this case, the $m^{th}$ element of the sequence is 2 times element m-1 of the sequence (that is, 2 times 32 is 64).

For some important mathematical sequences, there is no known non-recursive expression for each element of the sequence, and the use of a recursion becomes a necessity, not merely an option. The well-known Fibonacci sequence 1, 1, 2, 3, 5, 8, 13, 21, 34, 55, is constructed by adding the 2 previous elements of sequence. For example, 8 is the sum of 3 and 5, and 13 is the sum of 5 and 8. In general, the $m^{th}$ element of the Fibonacci sequence is the sum of element m-1 and element m-2 of the sequence (with the understanding that the first two elements of the sequence are a "default" value of 1).

Thus, the problem of sequence induction highlights the need to be able to represent recursions as well as arbitrary mathematical expressions (involving functions and arguments). It also re-emphasizes the need to be able to represent strings whose length has not been pre-specified in advance.

Many problems are best approached by developing hierarchies in which solutions to sub-problems are manipulated and assembled hierarchically into solutions to the original main problem. In fact, many mathematical problems are solved by first "decomposing" a larger problem into smaller sub-problems. Then, an attempt is made to solve each of the sub-problems. And, finally, the solutions to the sub-problems are assembled into a solution to the original problem. The problem of solving sets of a large number of equations with many variables and solving polynomial equations of high order are examples of problems where decomposition can be used. In some cases, there is a symmetry between this process of assembly and the solution to the individual sub-problem. That is, in this assembly process, the solutions to the sub-problems may be manipulated as if they themselves were merely the elements of a sub-problem.

Even when no symmetry is involved, a "hierarchy" develops when a problem is solved by decomposition. At the lowest level of the hierarchy, the sub-problem is solved. The hierarchy consists of combining the solutions of the sub-problem into the solution to the larger problem. Something similar is commonplace in computer programming in general. For example, sub-routines (or sub-procedures) are typically called by a main program. The main program is at the top of the hierarchy, typically organized to provide an overview of the solution to the whole problem. Each of the sub-routines called by the main program are found at one level lower on the hierarchy. If one of the sub-routines itself happens to call upon another sub-routine, that second sub-routine is one level lower on the hierarchy than the sub-routine which called it. Complex social organizations (such as corporations and military organizations), are similarly organized into hierarchies. The ability to decompose problems into hierarchies of sub-problems is generally important for solving problems.

What is needed is a way to apply some of the general principles of biological natural selection that are embodied in the conventional genetic algorithm (i.e. survival of the fittest and crossing over of parents' traits to offspring) to a greatly expanded class of problems. In particular, what is needed is a method for adaptively creating computer programs involving complicated combinations of mathematical functions and their arguments, recursions, symbolic processing, and other complicated data structures (such as permutations) with no advance limitations on the size, shape, or complexity of the programs. One object of the present invention is to provide a genetic algorithm to provide solutions for an expanded class of problems. A further object of the present invention is to provide a genetic algorithm process without any predetermined limits on the size, shape, or complexity of the members of the subject population.

REFERENCES CITED

U.S. Patents

U.S. Pat. No. 4,697,242, "Adaptive Computing System Cable of Learning and Discovery", issued Sep. 29, 1987, filed Jun. 11, 1984, Holland et al.

U.S. Pat. No. 4,881,178, "Method of Controlling a Classifier System", issued Nov. 14, 1989, filed May 7, 1987, Holland et al.

Other Publications

Box, G. E. P. "Evolutionary Operation: A Method for Increasing Industrial Productivity"—*Journal of the Royal Statistical Society*, 6 (2), 81–101.

Barto, A. G., Anandan, P., and Anderson, C. W. Cooperativity in networks of pattern recognizing stochastic learning automata, In Narendra, K. S. *Adaptive and Learning Systems*, New York: Plenum 1985.

Davis, Lawrence (Editor)—*Genetic Algorithms and Simulated Annealing*, Pitman, London 1987.

Fogel, L. J., Owens, A. J. and Walsh, M. J.—*Artificial Intelligence through Simulated Evolution*, New York: John Wiley 1966.

Fujiki, Cory—*An Evaluation of Holland's Genetic Operators Applied to a Program Generator*, Master of Science Thesis, Department of Computer Science, University of Idaho, 1986.

Goldberg, David E.—*Computer-Aided Gas Pipeline Operation Using Genetic Algorithms and Rule Learning*, (Doctoral Dissertation, University of Michigan, 1983) Dissertation Abstracts International 44(10), 3174B (University Microfilms No. 8402282).

Goldberg, David E., *Genetic Algorithms in Search, Optimization, and Machine Learning*, Reading, MA: Addison-Wesley 1989.

Green, Cordell C. et al., *Progress Report on Program-Understanding Systems*, Stanford Artificial Intelligence Laboratory memo AIM-240, Stanford University Computer Science Department, August 1974.

Grefenstette, John J. (Editor)—*Proceedings of an International Conference on Genetic Algorithms and Their Applications*, Pittsburgh, Pa. 1985.

Grefenstette, John J. (Editor)—*Genetic Algorithms and Their Applications: Proceedings of the Second International Conference on Genetic Algorithms*, Lawrence Erlbaum Associates, Hillsdale, N.J. 1987.

Hicklin, Joseph F.—*Application of the Genetic Algorithm to Automatic Program Generation*, Master of Science Thesis Department of Computer Science, University of Idaho, 1986.

Holland, John H.—*Adaptation in Natural and Artificial Systems*, The University of Michigan Press, Ann Arbor, 1975.

Holland, J. H., & Reitman, J. S. (1978), Cognitive systems based on adaptive algorithms, In D. A. Waterman & F. Hayes-Roth (Eds.), *Pattern Directed Inference Systems* (pp. 313–329), New York: Academic Press.

Jefferson, David, Collins, Rob, et al., The Genesys System: Evolution as a theme in artificial life, In Langton, Christopher, G. and Farmer, D. (editors) *Proceedings of Second Conference on Artificial Life*, Redwood City, Calif.: Addison-Wesley, 1990, In Press.

Koza, John R., Econometric modeling by genetic breeding of mathematical functions, *Proceedings of International Symposium on Economic Modeling*, Urbino, Italy: 1990, In Press.

Koza, John R. and Keane, Martin A., Genetic breeding of non-linear optimal control strategies for broom balancing, *Proceedings of the Ninth International Conference on Analysis and Optimization of Systems*, Antibes, France: 1990, In press.

Koza, John R., Hierarchical genetic algorithms operating on populations of computer programs, *Proceedings of the 11th International Joint Conference on Artificial Intelligence (IJCAI)*, San Mateo, Calif: Morgan Kaufman 1989.

Koza, John R. and Keane, Martin, Cart centering and broom balancing by genetically breeding populations of control strategy programs, *Proceeding of International Joint Conference on Neural Networks*, January 1990, Volume I.

Langley, Pat and Zytkow, Jan M., Data-driven approaches to empirical discovery, *Artificial Intelligence*, 40 (1989) 283–312.

Langley, Pat, Simon, Herbert A., Bradshaw, Gary L., and Zytkow, Jan M., *Scientific Discovery: Computational Explorations of the Creative Process*, Cambridge, Mass. : MIT Press 1987.

Lenat, Douglas B. AM: *An Artificial Intelligence Approach to Discovery in Mathematics as Heuristic Search*, Ph-D Dissertation, Computer Science Department, Stanford University, 1976.

Lenat, Douglas B., The role of heuristics in learning by discovery: Three case studies, In Michalski, Ryszard S., Carbonell, Jaime G. and Mitchell, Tom M., *Machine Learning: An Artificial Intelligence Approach*, Volume I, P. 243–306, Los Altos, Calif.: Morgan Kaufman 1983.

Lenat, Douglas B. and Brown, John Seely., Why AM and EURISKO appear to work, *Artificial Intelligence*, 23 (1984), 269–294.

Nilsson, Nils J., *Action Networks*, Draft Stanford Computer Science Department Working Paper, Oct. 24, 1988, Stanford, Calif.: Stanford University, 1988a.

Quinlan, J. R., Introduction of decision trees, *Machine Learning*, 1 (1) pages 81–106.

Schaffer, J. D. (editor), *Proceedings of the 3rd International Conference of Genetic Algorithms*, San Mateo, Calif.: Morgan Kaufman Publishers Inc. 1989.

Smith, Steven F., *A Learning System Based on Genetic Adaptive Algorithms*, PhD dissertation, Pittsburgh: University of Pittsburgh, 1980.

Smith, Steven F., Flexible learning of problem solving heuristics through adaptive search, *Proceeding of the 8th International Conference on Artificial Intelligence*, Karlsruhe, Germany: Morgan Kaufman 1983.

Steele, Guy L. Jr., *Common LISP*, Digital Press, 1984.

Tanese, Reiko, *Distributed Genetic Algorithm For Function Optimization*, PhD. dissertation, Department of Electrical Engineering and Computer Science, University of Michigan, 1989.

Widrow, Bernard, Pattern recognizing control systems, *Computer and Information Sciences (COINS)Symposium Proceedings*, Washington, D.C., Spartan Books, 1963.

Widrow, Bernard, The original adaptive neural net broom balancer, 1987 *IEEE International Symposium on Circuits and Systems*, Vol. 2.

Wilson, Stewart W., Bid competition and specificity reconsidered, *Journal of Complex Systems*, 2(6), 705–723, 1988.

SUMMARY OF THE INVENTION

The present invention relates to non-linear genetic algorithms. The process of the present invention operates upon a population of entities which accomplish tasks and can vary in size and shape. Each iteration of the process comprises activating, assigning, selecting, choosing, performing, and adding. First, each entity activates to accomplish its goal and produces a result. Second, a value is associated with the result of each activation and assigned to the corresponding entity. Third, at least one entity having a relatively high associated value is selected. Next, an operation is chosen from crossover, fitness proportionate reproduction, mutation or permutation. If crossover is chosen, then the selected entity performs the crossover operation. Crossover creates new entities by combining portions of at least one selected entity with portions of at least one other entity. Fitness proportionate reproduction retains the selected entity in the population. Mutation radomly alters a small random part of an entity. Permutation reorders the parts of an entity without a net gain or loss. Finally, the newly produced entities are added to the population.

Many seemingly different problems can be reformulated into a problem requiring discovery of a mathematical expression or computer program that produces some desired output for particular inputs. When viewed in this way, the process of solving these seemingly different problems becomes equivalent to searching a space of possible mathematical expressions or computer programs for a most fit individual mathematical expression or computer program.

This invention disclosed herein is useful for solving at least three groups of problems.

The first group of problems consists of a problem that presents itself under several different names, namely, the problem of symbolic function identification, symbolic regression, empirical discovery, modeling, induction, chaos, and forecasting.

The second group of problems contains several similar, but different, problems. This group contains the problems of symbolic integration, symbolic differentiation, symbolic solution of differential equations, symbolic solution of integral equations, symbolic solution of mathematical equations, and inverses.

The third group of problems contains several other seemingly different, but related, problems, namely, function learning, planning, automatic programming, game playing, concept formulation, pattern recognition, and neural net design.

All of these problems can be formulated and then solved in the manner described herein.

Computer programs have the ability to perform alternative computations conditioned on the outcome of intermediate calculations, to perform computations on variables of many different types, to perform iterations and recursions to achieve the desired result, and to define and subsequently use computed values and subprograms. This flexibility found in computer programs facilitates the solution to these various different problems.

The process of solving these problems can be reformulated as a search for a most fit individual computer program in the space of possible computer programs. In particular, the search space is the hyperspace of LISP "symbolic expressions" (called S-expressions) composed of various terms (called atoms in LISP) along with standard arithmetic operations, standard programming operations, standard mathematical functions, and various functions peculiar to the given problem domain. For example, the standard arithmetic functions of addition, subtraction, multiplication, etc., are relevant when we are attempting to construct a mathematical expression that might be the solution to a differential equation. In general, the objects that are manipulated in our attempts to build computer programs are of four types. These objects include functions of various number of arguments, such as addition mentioned above; variable atoms, such as the independent variable(s) in an equation; constant atoms, such as 0, 1, etc.; and control structures such as If-Then-Else, Do-Until, etc.

The LISP S-expression required to solve each of the problems described above tends to emerge from a simulated evolutionary process using the non-linear genetic algorithm. This process starts with an initial population of LISP S-expressions (typically randomly generated) composed of functions and atoms appropriate to the problem domain.

The fitness of each individual LISP S-expression in a population drives the process. Fitness will be measured by the sum of the distances (taken for all the environmental cases) between the point in the solution space (whether real-valued, complex-valued, vector-valued, multiple-valued, Boolean-valued, integer-valued, or symbolic-valued) created by the S-expression for a given set of arguments and the correct point in the solution space.

The closer this sum is to zero, the better the S-expression. If this sum is close to zero, there is a good fit. If this sum attains the closest possible value to zero, there is a best fit. If this sum actually attains the value of zero, there is a perfect fit. The notions of good, best, and perfect fit are well known in the art. The differences needed to compute this fitness function depends on the specific problem in the group of problems. Once the desired level of fitness is attained, the iteration of the evolutionary process can be terminated.

The initial individual S-expressions in the population typically will have exceedingly poor fitness. Nonetheless, some individuals in the population will be somewhat more fit than others.

Then, a process is based on the Darwinian principle of reproduction and survival of the fittest (fitness proportionate reproduction) and the genetic operation of crossover (recombination) to create a new population of individuals. In particular, a genetic process of sexual reproduction (crossover) among two parental S-expressions will be used to create offspring S-expressions. At least one of the two participating parental S-expressions will be selected in proportion to fitness. The resulting offspring S-expressions will be composed of sub-expressions from their parents.

In addition, other operations such as mutation and permutation define building blocks and editing may be used.

Finally, the new population of offspring (i.e. the new generation) will replace the old population of parents and the process will continue.

At each stage of this highly parallel, locally controlled and decentralized process, the state of the process will consist only of the current population of individuals. Moreover, the only input to the algorithmic process will be the observed fitness of the individuals in the current population in grappling with the problem environment.

This process produces populations which, over a period of generations, tend to exhibit increasing average fitness in dealing with their environment, and which, in addition, can robustly (i.e. rapidly and effectively) adapt to changes in their environment.

The solution produced by this process at any given time can be viewed as the entire population of distinctive alternatives (typically with improved overall average fitness), or more commonly, as the single best individual in the population at that time ("winner take all").

The hierarchical character of the computer programs is an essential aspect of the process. The results of this process are inherently hierarchical and in many cases the results contain default hierarchies which often solve the problem in a relatively parsimonious way.

The dynamic variability of the size and shape of the computer programs that are developed along the way to a solution are also an essential aspect of the process. In each case, it would be difficult and unnatural to try to specify or restrict the size and shape of the eventual solution in advance. Moreover, the advance specification or restriction of the size and shape of the solution to a problem narrows the window by which the system views the world and might well preclude finding the solution to the problem.

DETAILED DESCRIPTION OF THE INVENTION

Figure 1:
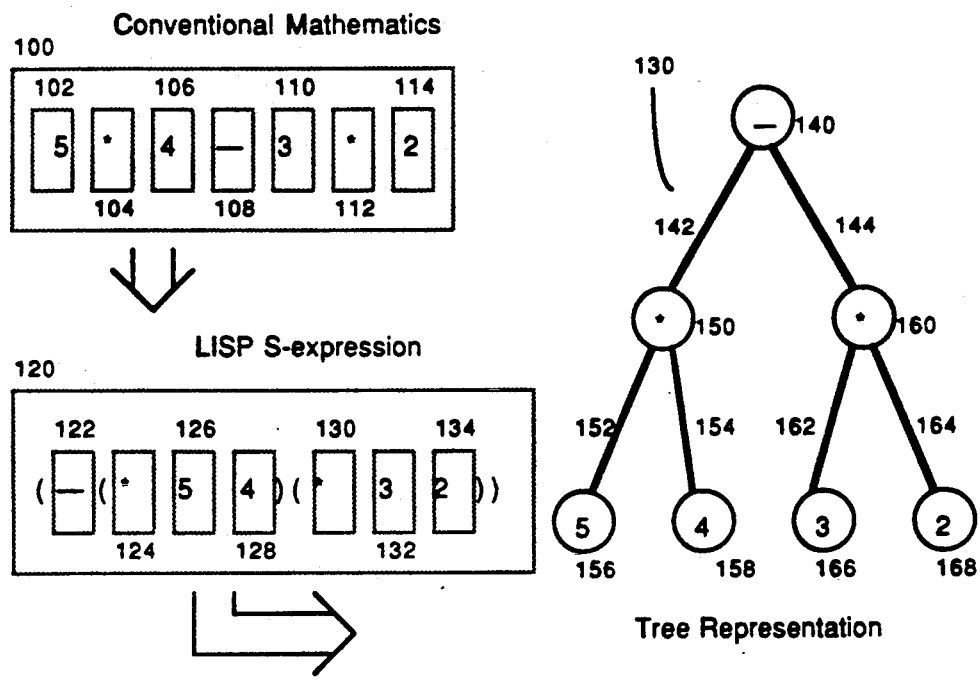
FIG. 1 is a tree diagram representation of a LISP S-expression.

The present invention describes a genetic algorithm process for problem solving. In the following description, numerous specific details are set forth in order to prove a thorough understanding of the present invention. It will be obvious, however, to one skilled in the art that the present invention may be practiced without using these specific details. In other instances, well-known methods and structures have not been described in detail so as not to unnecessarily obscure the present invention.

The present invention operates on a population of entities. The entities must possess an ability to produce an objectively observable result. To provide utility, the entities must direct their actions toward a constructive end, even if their results do not always serve those ends. The iterative process of the present invention produces populations which tend to accomplish their constructive ends better than previous populations.

Although the preferred embodiment uses computer programs as entities, using other types of entities remain within the scope and spirit of the present invention. For example, combinations of electrical circuits could provide a population for the iterative process of the present invention. The circuits could reproduce and crossover until the population produces sufficiently robust solutions to a subject problem. Additionally, different automobile designs could comprise another population, with elements of the designs taken as different alleles for crossover and rearrangement. Thus although the following description uses computer programs as entities, the description does not limit the present invention.

The computer languages FORTRAN, COBOL, ALGOL, PL/1, FORTH, PASCAL, C, PROLOG, ADA, BASIC, etc. have the ability to write complicated mathematical expressions, recursions, complex data structures, and symbolic expressions. Some of these languages can write symbolic expressions that are executable as computational procedures (or programs) within the language itself. Also, some of these languages can generate symbolic expressions, although often this process is inconvenient and inefficient. In general, most computer languages do not allow arbitrarily complex expressions to be written. Also, most do not delay assigning actual computer memory (and types) in the computer for such expressions until just prior to actual execution of the expression. Such a memory management method is termed dynamic storage allocation or "late binding".

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" has started to emerge as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated", and treating the remaining elements of the list as arguments to that function. Moreover, unless otherwise indicated, LISP reads, evaluates, and returns a value for each such function it encounters. Thus, in LISP, entire computer programs can appear as merely functions within functions within functions (often called "compositions" of functions and arguments or more simply a "composition" of functions). Applying functions to arguments as encountered controls the flow of LISP program. In other words, the control structure in LISP is based on composition of functions.

Within the outermost pair of parentheses in. LISP, there may be numerous functions, including functions for performing arithmetic, functions for performing recursions, functions for modifying symbolic expressions, functions for conditionally varying the program flow, and other complex functions. A key feature of LISP is that LISP programs have the same form as the data (and the functions). As the above features indicate, LISP is a functional programming language. LISP is not the only existing functional programming language nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

For example, consider the simple mathematical expression ordinarily written as 5*4−3*2. To evaluate this expression, one must start by first evaluating 5*4. One evaluates 5*4 by performing the function of multiplication (*) on the two arguments (5 and 4). The basic structure in LISP is a list of items (that is, an ordered set of items contained within a set of parentheses). Moreover, unless otherwise indicated, LISP treats the first item in every list encountered as a function and the remaining items in the list as arguments to that function. Thus, LISP represents 5*4 as (*5 4). Here a function (i.e. the multiplication function denoted by *) is the first item of the list and the two arguments to the function (i.e. the two numbers to be multiplied) follow. Similarly, LISP denotes 3*2 as (*3 2). Once these two multiplications are executed (evaluated), the subtraction function then has the two arguments (i.e. 20 and 6). The two values obtained by evaluating these two multiplication functions are treated as arguments to the subtraction function which performs the operation of subtraction, which is (−(*5 4) (*3 2)). Expressions such as (−(*5 4) (*3 2)) in LISP are called S-expressions. Here the function of subtraction (−) is performed on the result previously obtained for (*5 4) and (*3 2). When a simple number or variable is used as the argument of a function (such as the 3 or 2 in the multiplication 3*2), it is called an "atomic" argument. The contrasting situation occurs with a composition of functions when the argument to one function is itself the result of carrying out an earlier (embedded) function. We can represent increasingly complex mathematical expressions by embedding previous results within new expressions in this manner.

It is helpful to graphically depict a functional programming language's expressions. Functional expressions can be viewed graphically as a tree with labels on the various points of the tree. In particular, any such expression can be viewed as a rooted point-labeled tree in which the internal points of the tree are labeled with functions and the endpoints of the lines radiating downwards from each such internal point is labeled with the arguments to that function. By use of the term downwards with rooted-point labeled trees, extending farther away from the root of the tree is the intended meaning. The external points of the tree (sometimes called "leafs") are labeled with the atomic arguments. The root of the tree is the particular internal point labeled with the function executed first. In a LISP S-expression, the first function is the outer-most LISP function (i.e. the function just inside the outermost left parenthesis of the LISP S-expression).

FIG. 1 illustrates this for LISP using the equation 5*4−3*2. In the ordinary notation of arithmetic shown as equation 100, the function 104 (multiplication) operates on the arguments 102 and 106 (i.e. 5 and 4 respectively) and the function 112 (multiplication) operates on the arguments 110 and 114 (i.e. 3 and 2 respectively). The function 108 (subtraction) then operates on the results of these two functions as its arguments. The function 108 is higher in the hierarchy than the functions 104 and 112.

In FIG. 1, the LISP S-expression 120, (−(*5 4) (*3 2)) is expressed as the function 124 (multiplication) operating on the arguments 126 (the number 5) and 128 (the number 4) and the function 130 (multiplication) operating on the arguments 132 (the number 3) and 134 (the number 2). The function 122 (subtraction) then operates on the results of these two evaluations.

When presented graphically in FIG. 1, the internal point 150 of the tree 130 with root 140 is labeled with the function of multiplication (*) and the external points 156 and 158 of the tree are labeled with the two arguments to the multiplication function (i.e. 5 and 4 respectively). The arguments to a given function (such as the multiplication function denoted by the internal point 150) are found by following the lines 152 and 154 radiating downwards from the internal point 150. Similarly, the internal point 160 of the tree is labeled with the function of multiplication and the external points of the tree 166 and 168 are labeled with the two arguments to the multiplication function (i.e., 3 and 2, respectively). The arguments to the function 160 are found by following the lines 162 and 164 radiating downwards from the internal point 160. The internal point of the tree 140 is labelled with the subtraction function. The arguments to the subtraction function are found by following the lines 142 and 144 radiating downwards from point 140. These arguments turn out to be the results of the previously performed multiplication operations. Arguments may be found at external points (if they are "atoms") or at internal points (i.e. when the arguments to one function, such as subtraction here at 140, are the result of previous functions). The internal point 140 is the root of the tree and is labeled with the outermost function (subtraction) 122 in the LISP S-expression 120 (i.e., the function just inside the outermost left parenthesis of the LISP S-expression).

The advantage of a computer language such as Common LISP for performing work of this kind derives from the enormous flexibility arising from repeated applications of this very simple basic structure. The functions available in LISP can include functions other than the simple arithmetic operations of multiplication and subtraction. They include more complex mathematical functions such as square roots, exponentiation, etc; program control functions such as PROGN which allow a series of LISP expressions to be performed in series; recursions (wherein a function refers to itself in the process of evaluating itself); iterative functions (such as DOTIMES) which cause certain functions to be performed repeatedly (typically with differing arguments); conditional functions [which cause specified alternative functions to be performed if some predicate function is (or is not) satisfied]; and symbolic functions which operate on symbols (instead of numbers).

Figure 2:
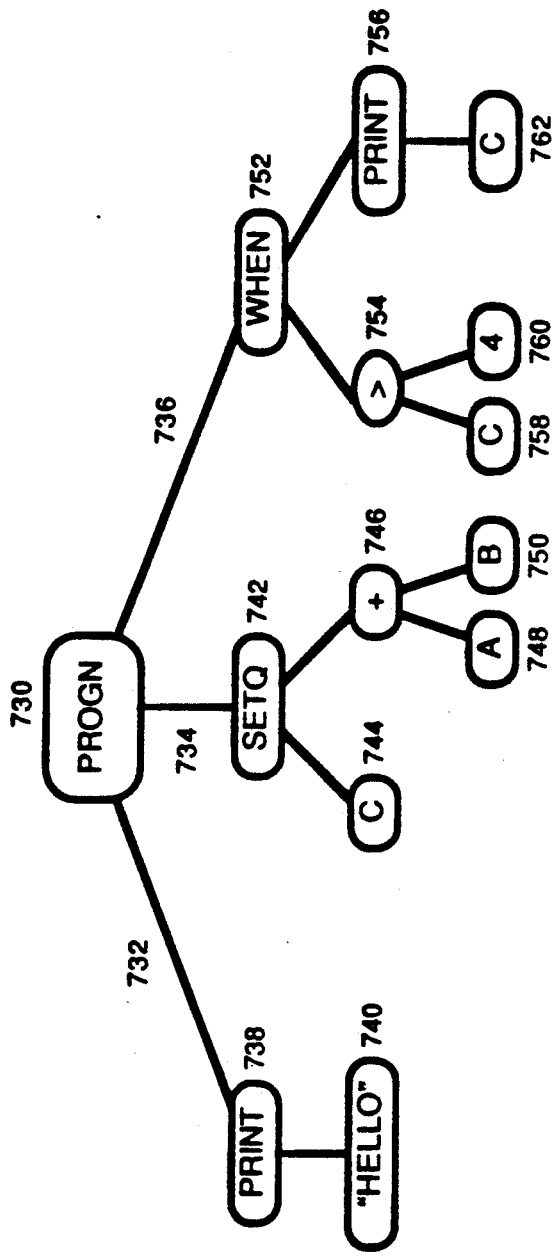
FIG. 2 is a tree diagram representation of a LISP program.

By way of an example, suppose we want a computer program to begin by printing the symbolic string "HELLO"; then set the variable C to the sum of the variables A and B; and, then print the value of C only when C is greater than 4. In FIG. 2, the LISP S-expression (i.e. program) 700 performs these tasks. The function 701 PROGN allows a series of 3 major steps to be combined together into one program. The first major step of the series involves the function 702 (PRINT) operating on the symbolic string argument 704 ("HELLO"). The second major step involves the function 706 (SETQ) operating on a variable 708 (C) and the result obtained from the function 710 (addition) operating on the arguments 712 (the variable A) and 714 (the variable B). The SETQ function assigns a value (its second argument) to a variable (its first argument). Finally, the third major step involves the conditional function 716 (WHEN) operating on two arguments. The first argument is a predicate function involving the relationship 718 (greater than) operating on the arguments 720 (the variable C) and 722 (the number 4). The second argument is the function 724 (PRINT) operating on the argument 726 (the variable C).

Graphically, this LISP program (S-expression) can be represented as a tree whose internal points are labeled with functions and where the endpoints of the lines radiating downwards from each such internal point is labeled with the arguments to that function. In this graphical representation, one of the internal points is the root of the tree and the root is labeled with the function that appears just inside the first left parenthesis of the LISP S-expression.

Here, the root of the tree 730 is labeled with the function PROGN. The function PROGN has 3 arguments. The 3 lines 732, 734, and 736 radiating downwards from the internal point 730 (the root) correspond to the 3 arguments of PROGN. The first argument of PROGN is function 738, the PRINT function. It is the endpoint of the first line 732 radiating downwards from internal point 730. The function PRINT has one argument 740. In the case of the PRINT function, it has one argument which it prints. In this case, the argument is the symbolic string 740 "HELLO". This string 740 "HELLO" is an atomic argument and appears at an external point (leaf) of the tree.

The second argument of PROGN is function 742, the SETQ function. The function SETQ has two arguments 744 and 746. The second argument of SETQ is itself a function 746 (addition) operating on the two arguments 748 (the variable A) and 750 (the variable B). The two arguments 748 and 750 are the variables A and B (atoms in LISP). They appear at external points (leafs) of the tree. The first argument of SETQ is 744 (the variable C) which is set to the sum of A and B.

The third argument of PROGN is function 752, the WHEN function. The function WHEN has two arguments, 754 and 756. The first argument of the WHEN function is a predicate function 754 (greater than). The predicate function 754> has two arguments 758 (the variable C) and 760 (the number 4). The predicate function 754> returns a value of T (for "True") or NIL (for "False") depending on whether its first argument 758 (the variable C) is greater than its second argument 760 (the number 4). The WHEN function executes its second argument 756 (the PRINT function) if its first argument 754 evaluates as T (True). The PRINT function 756 has one argument 762 (the numeric value of the variable C). Note that the PRINT function is flexible; it can accommodate a symbolic argument (such as "HELLO" at 740) or a number (such as the variable C at 762).

Although LISP can be run on virtually any computer, it is preferable to use a computer especially designed for performing LISP function. The Texas Instruments Explorer II computer is particularly advantageous for these purposes because it contains an especially designed microprocessor chip (called the Mega Chip) which performs LISP functions directly. The Mega Chip contains basic microcode that correspond directly to the basic operations of LISP. These include, among others, basic LISP operations for constructing stacks (which, among other things, retain references to repeated calls on functions) and performing other operations peculiar to LISP. A conventional microprocessor chip (such as the Intel 80286 contained in the IBM AT computer) can be programmed to carry out the various LISP functions by applying its generic computer instructions to the requirements of LISP.

Figure 24:
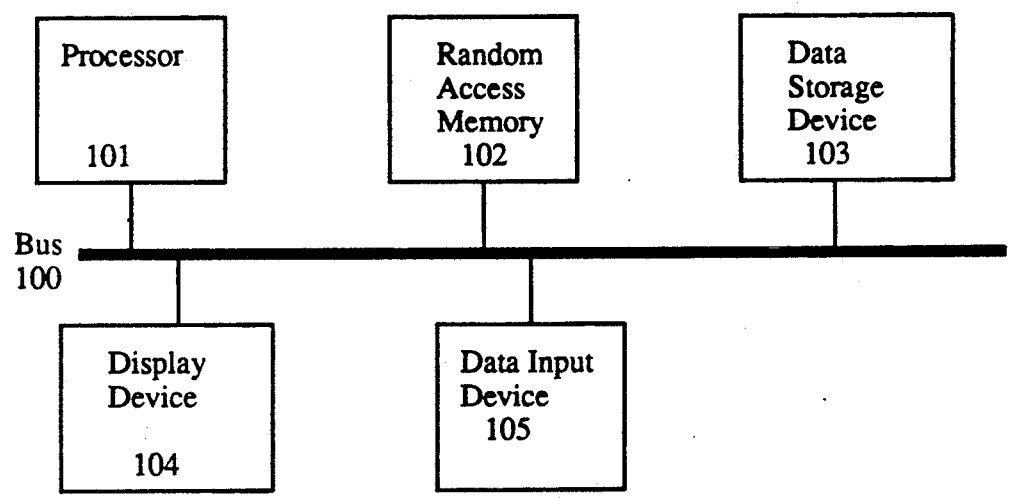
FIG. 24 illustrates a typical computer configuration.

Moreover, it is especially advantageous to run LISP programs on computers with large amounts of internal memory because the complex structures that one develops using LISP in applications such as are described here often require large amounts of memory. To the extent that computer memory is not available as internal memory in a given computer, significant inefficiencies in operation result. Since the solution to problems often require complex structures, significant inefficiencies may make the difference between being able to solve the problem or not solve the problem. The preferred embodiment of the present invention uses an Explorer II computer with 32,000,000 bytes of internal memory (32 megabytes). A typical computer configuration is depicted in FIG. 24.

After generating a population of computational procedures, these procedures are executed and a value in the environment involved is assigned to the result of the execution. Thus an important requirement for any implementation of this system is the ability to generate computational procedures (computer programs) and then execute them to produce a result.

Using LISP representations on a computer having sufficient memory, the present invention can solve problems previously intractable under prior art methods. This disclosure presents a general method and specific examples of the present invention. First, the process itself is described. Secondly, two examples of its operation are presented. The examples illustrate the operation of the present invention dealing with linear equations and sequences.

Figure 3:
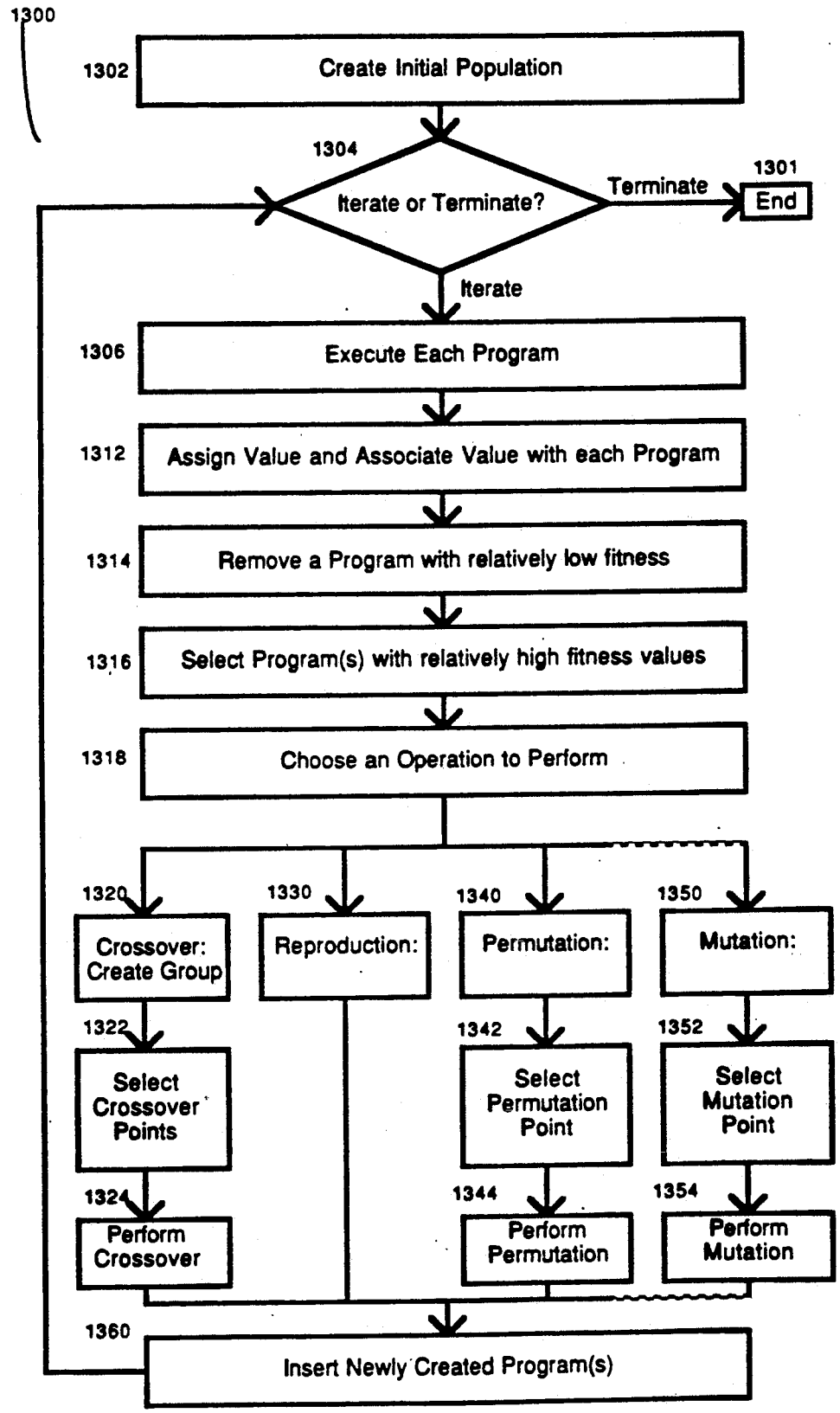
FIG. 3 is a flow chart diagram of the present invention.

FIG. 3 is a flow-chart of the process of the present invention. The process 1300 starts by the step Create Initial Population 1302 which creates a number of programs (typically randomly). If the termination test for the process 1304 is satisfied (for example, by achieving a known best solution to the problem among the population of individuals, by achieving a certain degree of improvement in average fitness for the population, etc.), the process terminates at End 1301. Otherwise, the process continues to iterate.

The basic iterative loop of the process begins with the step Execute Each Program 1306 wherein each program executes. The next step, Assign Value and Associate Value with each Program 1312, involves assigning a value (fitness) to each result produced by execution, and associating the value with the producing-program. After assigning and associating, Remove Program(s) with relatively low fitness, step 1314, causes the removal of the less fit members of the population (the term "program(s)" used herein refers to the phrase "program or programs"). Although not essential, step 1314 improves the average fitness and eases memory requirements by keeping the population within reasonable limits. Step 1316, Select Program with relatively high fitness values, picks at least one program to use in the following operation. The selected program(s) have a relatively high fitness value.

At step 1318, Choose an Operation to Perform, the process determines which operation to begin. Crossover 1320 and Reproduction 1330 are the basic operations performed; however, Permutation 1340 also plays a role. Optionally, the operation of Mutation 1350 may be used. Typically, the vast majority of operations are the reproduction and crossover operations.

If, in selecting the groups of two parents above, the selection is carried out with probabilities proportionate to fitness, the same individual may be selected more than once (i.e., selection with replacement allowed). It should be recognized that there are numerous slight variations of the overall process possible. Some of these variations can be used as a matter of convenience.

Crossover 1320 requires a group of at least two programs (typically two parents), so second program(s) are picked to mate with at least one selected program(s). No definitive method of choosing the second parent or parents exists, but choosing only relatively high fitness individuals is preferable over choosing randomly. Parents mate by matching selected program(s) with at least one second picked program(s). For each mating, a crossover point is separately selected at random from among both internal and external points within each parent at Select Crossover Points 1322. Then newly created programs are produced at Perform Crossover 1324 from the mating group using crossover. Two parents would typically produce two offspring.

Note also no requirement exists that the population be maintained at a constant size. The version of the crossover operation producing two offspring from two parents has the convenient attribute of maintaining the population at constant size. (Note that the other operations each produce one offspring from one parent so that they too maintain constant population size). On the other hand, if the crossover operation acts on a group of more than two parents, the size of the population may grow. For example, if three parents formed a mating group, each parent would have two crossover points selected for it and there would be 27 possible offspring ($3 \times 3 \times 3$). Even if the three offspring equivalent to the three original parents are excluded, there would be 24 possible new offspring available. In general, if there are N parents, then $N-1$ crossover points would be selected for each and there would be $N^N - N$ new offspring available. When an operation produces more offspring than parents, then either the population can be allowed to grow or the population can be trimmed back to a desired (presumably constant) size when the next round of fitness proportionate reproduction takes place.

For the operation of Reproduction 1330, the Selected program(s) remain unchanged. The preferred method for selecting computational procedures for reproduction is to select them with a probability proportional to their normalized fitness.

If the permutation operation is selected then the process continues at Permutation 1340. A permutation point is selected at random in Select Permutation Point 1342 from among the internal points within the selected individual. Then Perform Permutation 1344 is performed, by reordering the selected program's sub-procedures, parameters, or both at the permutation points.

If the mutation option is chosen, Mutation 1350 occurs. The location of the mutation is picked in Select Mutation Point 1352 for each Selected program. Perform Mutation 1354 then randomly generates, for each Selected program, a portion of a program and inserts it at the mutation point. The portion inserted is typically a single point, but may be a sub-program.

Finally, the newly created programs are inserted into the population at 1360 and the process returns to the termination test 1304.

An audit trail can be created of the entire process from the creation of the initial population of individuals to the current population of individuals. In fact, compositions of LISP S-expressions provide an ideal way of representing audit trails. Suppose we denote the individuals of the initial population as I1, I2, I3, . . . These individuals can be either stored directly or one can store the random algorithm (and random seeds) used to generate the initial members. When a crossover is performed on two individuals (say I1 and I2, at point p of parent 1 and point q of parent 2), the LISP function LIST can be used to create an S-expression involving 5 items—namely, the symbolic string "CROSSOVER", the identities of the two individuals being crossed at the time (i.e. I1 and I2) and the two crossover points (i.e. p and q). In this example, the S-expression would be (CROSSOVER I1 I2 p q). This new string would be the identity (i.e. audit trail) of the newly created individual. If a crossover were later performed on the result of the first crossover illustrated above at point r, with initial individual I3 at point s, the audit trail of the resulting individual would be (CROSSOVER (CROSSOVER I1 I2 p q) I3 r s). If a subsequent crossover (or other operation) were performed on this individual, this string would, in turn, become an argument of a new LIST operation. Similarly, when a permutation is performed on an individual, the LIST can be employed to create an S-expression involving 3 items—namely, the symbolic string "PERMUTATION", the identity of the individual, and the permutation point. An example would be (PERMUTE I4 t) if the permutation operation had been performed on individual I4 at point t.

The first step in the iterative process involves activating each entity. Activation means having each entity attempt to accomplish its goal, producing an objective result. In the preferred embodiment, entities are computer programs, so activation requires executing the programs of the population. The second step in the process assigns a fitness value to the objective result, and associates that fitness value with its corresponding entity. For computer programs, the fitness value is generally a number, or a vector, which reflects the program's execution, although the fitness value could be any symbolic representation used on a computer.

In general, some of the entities will prove to be better than others when a value is assigned to them after their interaction with the "environment" of the problem. The best value (fitness) may be the lowest number (as is the case here where we are measuring the deviation between a result and a known perfect solution). In other problems, the best value (fitness) may be the highest number (e.g. scoring direct "hits"). The value (fitness) assigned may be a single numerical value or a vector of values, although it often most convenient that it be a single numerical value. In many problems, the best value is not known. However, even in such problems, it is known whether lower (or higher) numbers connote better fitness and the best value attained by the process at a given time can be identified.

A useful method for organizing raw fitness values involves normalizing the raw values, then calculating probabilities based on the normalized values. The best raw fitness value is assigned an adjusted fitness of 1, the worst value is assigned a value of 0, and all intermediate raw values are assigned in the range of 0 to 1. The probability of being selected is determined by the equation:

$$P(i) = \frac{f_i}{\sum_{j=1}^{n} f_j}$$

Where P(i) is the probability of selection for individual i having an adjusted fitness of $f_i$, and n is the total number of the population. Thus, an individual's probability of being selected equals the individual's adjusted fitness value divided by the sum of all the adjusted fitness values of the population. In this way, the normalized fitness values range P (i) between 0 and 1, with a value of 1 associated with the best fitness and a value of 0 associated with the worst, and the sum of all the probabilities equals 1.

It may also be desirable to remove individual computation procedures from the population with relatively poor fitness values. In practice, it may also be convenient to defer this activity briefly until a new generation of individuals is created.

It is a key characteristic of this overall process that the new populations of individuals tends to display, over a period of time, increasing average value (fitness) in the environment involved. Moreover, another characteristic of this overall process is that if the environment changes, the new populations of individuals will also tend to display, over a period of time, increasing average value (fitness) in the new environment involved.

At any given time, there is one individual in every finite population having a single fitness value that is the best amongst that population. Moreover, some environments have a known best fitness value. Examples are when fitness is measured as deviation from a known answer (e.g. the linear equations problem) or number of matches (e.g. the sequence induction problem). The present invention's process may occasionally generate an individual whose value (fitness) happens to equal the known best value. Thus, this overall process can produce the best solution to a particular problem. This is an important characteristic of the overall process, but it is only one characteristic. Another important characteristic (and the one which is more closely analogous to nature) is that a population of individuals exists and is maintained which collectively exhibits a tendency to increase their value (fitness) over a period of time. Also, by virtue of the many individuals with good, but not the very best, fitness values the population exhibits the ability to robustly and relatively quickly deal with changes in the environment. Thus, the variety in the population lowers its overall average value (fitness); additionally, the population's variety gives the population an ability to robustly adapt to changes in the environment.

In executing the overall process, it is often convenient to mark the one (or perhaps two) individuals in the population with the best fitness value amongst that population at any given time. Such marked best individuals are then not subject to removal (as parents), but are instead retained in the population from generation to generation as long as they remain the best. This approach prevents loss of the most fit individual in the population and also provides a convenient reference point for analytical purposes. If the problem involved happens to have a known best solution, after a certain number of generations the best individual will often be the known best solution.

The third step involves selecting entities which will be used to perform operations. A number of selection methods exist which tend to select entities of relatively high value. The theoretically most attractive way to select individuals in the population is to do so with a probability proportionate to their fitness values (once so normalized between 0 and 1). Thus, an individual with fitness of 0.95 has 19 times greater chance of being selected than an individual of fitness value 0.05. Occasionally individuals with relatively low fitness values will be selected. This selection will be appropriately rare, but it will occur.

If the distribution of normalized fitness values is reasonably flat, this method is especially workable. However, if the fitness values are heavily skewed (perhaps with most lying near 1.00), then making the selection using a probability that is simply proportionate to normalized fitness will result in the differential advantage of the most fit individuals in the population being relatively small and the operation of the entire process being prolonged. Thus, as a practical matter, selection is done with equal probability among those individuals with relatively high fitness values rather than being made with probability strictly proportionate to normalized fitness. This is typically accomplished by choosing individuals whose fitness lies outside some threshold value. One implementation of this approach is to select a threshold as some number of standard deviations from the mean (selecting for example, all individuals whose fitness is one standard deviation from the means fitness).

In connection with selection of individuals on the basis of fitness, we use the phrase "relatively high value" herein to connote either selection based on a probability proportionate to normalized fitness (the theoretically preferred approach) or selection with equal probability among those individuals having fitness values outside some threshold. In practice, choosing individuals from the best half with equal probability is a simple and practical approach, although fitness proportionate selection is the most justified theoretically.

After completing selection, the fourth step requires choosing an operation. The possible operations include crossover, permutation, and reproduction. The preferred operation is crossover, followed by reproduction, and lastly permutation. However, this preference is only a generalization, different preferences may work better with some specific examples. Thus the choice of operations should mainly be the preferred operation; but that choice should remain flexible to allow for solving differing problems.

As will be seen below, the key operation for introducing new individuals into the population is the crossover operation. To illustrate the crossover operation for this example, a group of two computational procedures is selected from among the population of individual S-expressions having relatively high fitness values, although, it is not necessary to limit the size of the group selected to two. Two is the most familiar case since it is suggestive of sexual reproduction involving a male parent and a female parent. The underlying mathematical process can obtain effective results by "crossing" hereditary information from three or more parents at one time. However, the key advantage of being able to combine traits from different individuals is attained with two parents. In its preferred form, all of the individuals in the group of parents have relatively high fitness values. In its most general form, the requirement is only that at least one of the individuals in the group of parents has a relatively high fitness value. The other parents in the group could be any member of the population. In either case, all mating involves at least one parent with relatively high fitness values.

Figure 4:
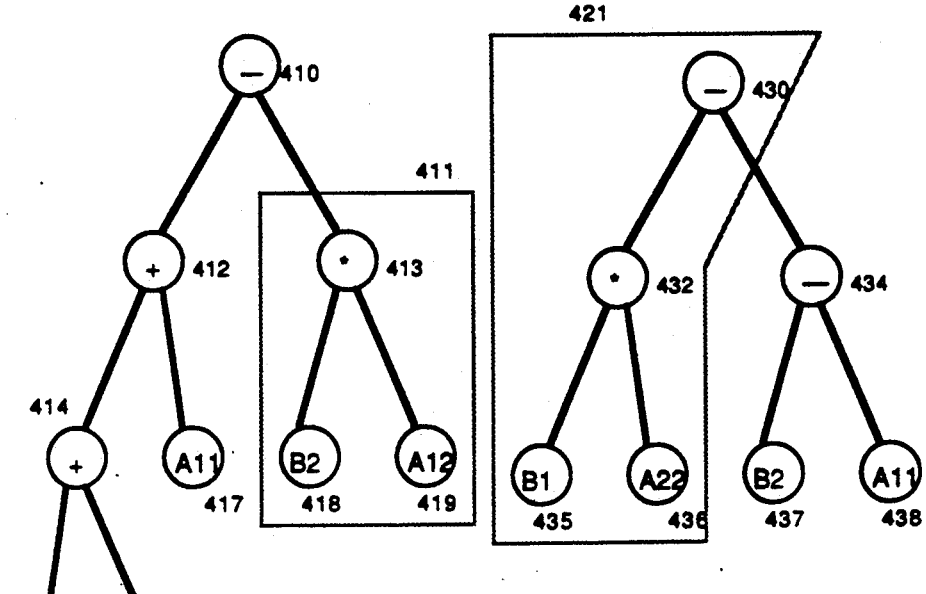
FIG. 4 is a tree diagram representation of a crossover operation occurring at internal points.
Figure 4:
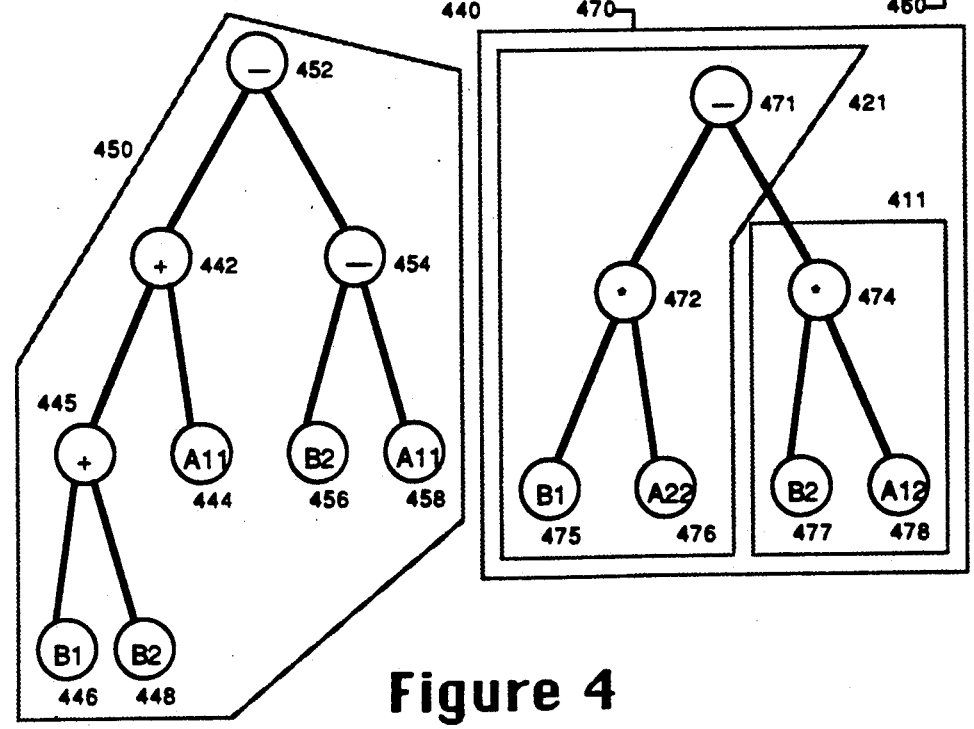

For purposes of this example problem, assume that a group of two parents with relatively high fitness values has been selected. The group of parents is now used to create two new computational procedures. FIG. 4 graphically illustrates a simple example of mating two parents to produce two new offspring for the example problem involving linear equations. It should be noted that there need not be precisely two offspring and some versions of the basic concept here produce only one offspring (or can produce more than two offspring).

Parent 1 is the computational procedure 400:

(−(+(+B1 B2) A11) (*B2 A12))

This computational procedure can also be represented by the rooted point-labeled tree with root 410. Root 410 is the subtraction function and has lines to two arguments, internal nodes 412 and 413. Node 412 is the addition function having lines to internal node 414 and leaf 417 (the variable A11), its arguments. Node 414 is the addition function having lines to leafs 415 and 416 (the variables B1 and B2, respectively). The root 410's second argument, node 413, is the multiplication function having lines to leafs 418 and 419 (the variables B2 and A12, respectively), its two arguments. Sub-tree 411 comprises 413, 418, and 419. Parent 2 is the computational procedure 420, (−(*B1 A22) (−B2 A11)). This computational procedure can also be represented as the rooted point-labeled tree with root 430. Root 430 is the subtraction function and has lines to two arguments, internal node 432 and 434. Node 432 is the multiplication function having lines to arguments at leafs 435 and 436 (the variables B1 and A22, respectively). Node 434 is the subtraction function having lines to arguments at leafs 437 and 438 (the variables B2 and A11, respectively). Tree 421 comprises 430, 432, 435 and 436, which is all of parent 2 except for the root 430's second argument.

Selecting the crossover point starts by counting up the internal and external points of the tree. The tree with root 410 has 9 points (410, 412, 413, 414, 415, 416, 417, 418, and 419). One of the 9 points (410, 412, 413, 414, 415, 416, 417, 418 and 419) of the tree for parent 1 (that is, the tree with root 410) is chosen at random as the crossover point for parent 1. A uniform probability distribution is used (so that each point has a probability of 1/9 of being selected). In this figure, point 413 is chosen. Point 413 happens to be an internal point of the tree.

Similarly, one of the 7 points (430, 432, 434, 435, 436, 437 and 438) of the tree for parent 2 (that is, the tree with root 430) is chosen at random as the crossover point for parent 2. In this figure, point 434 is chosen. Point 434 happens to be an internal point of the tree. Each of the 7 points has a uniform probability of 1/7 of being chosen.

Offspring 2 is produced by combining some of the traits of parent 1 and some of the traits of parent 2. In particular, offspring 2 is produced by substituting the sub-tree 411 (sub-procedure), beginning at the selected crossover point 413 [namely, (*B2 A12)] of parent 1, into the tree 421 of parent 2 at the selected crossover point 434 of parent 2. The resulting offspring 470 thus contains the sub-procedure 411 (*B2 A12) from parent 1 as a sub-procedure at point 474, which is attached to the second line from root 430 of tree 421. It is otherwise like parent 2 [that is, it has a root labeled with the subtraction function having (*B1 A22) as its argument]. This particular mating produces the computational procedure 460, (−(*B1 A22) (*B2 A12)), which is the known correct solution for the first variable X1 for a pair of two linear equations in two variables. In other words, the crossover involving parents 1 and 2 (neither of which were the correct solution to the linear equations problem) using the crossover points 413 and 434 happened to produce an offspring with best fitness (i.e. the known correct solution to the problem).

Offspring 1 is produced in a similar fashion by combining some of the traits of parent 1 and some of the traits of parent 2. In this case, the complementary portions of each parent combine. In particular, offspring 1 is produced by substituting the sub-tree (sub-procedure) beginning at the crossover point 434, [(−B2 A11)] of parent 2, into the tree of parent 1 at the crossover point 413 of parent 1. The resulting offspring 450 thus contains the sub-procedure (−B2 A11) from parent 2 as a sub-procedure at point 454. It is otherwise similar to parent 1. Root 452 is the subtraction function having lines to arguments at internal nodes 442 and 454. Node 442 is the addition function having lines to arguments at internal node 445 and leaf 444 (the variable A11). Internal node 445 is the addition function having lines to arguments at leafs 446 and 448 (the variables B1 and B2, respectively). Node 454 is the subtraction function having lines to arguments at leafs 456 and 458 (the variables B2 and A11, respectively).

Figure 5:
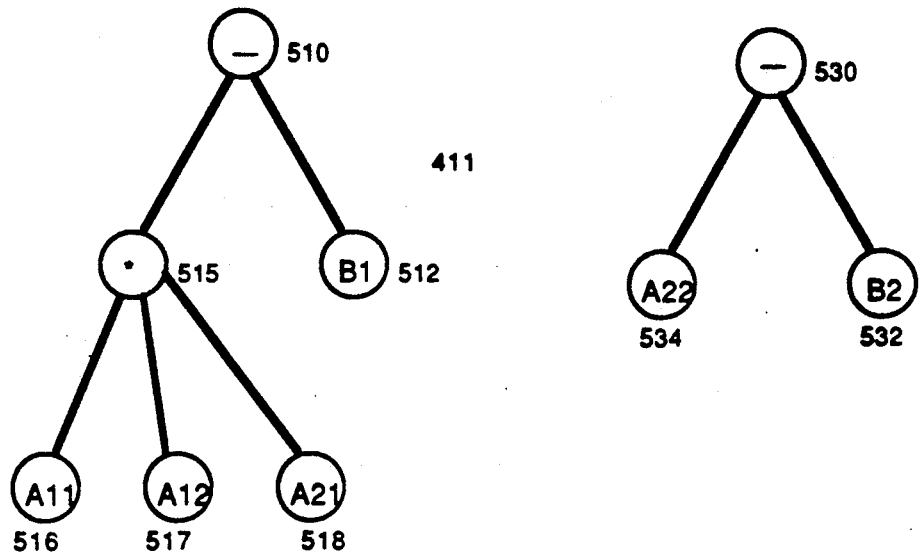
FIG. 5 is a tree diagram representation of a crossover operation occurring at external points.
Figure 5:
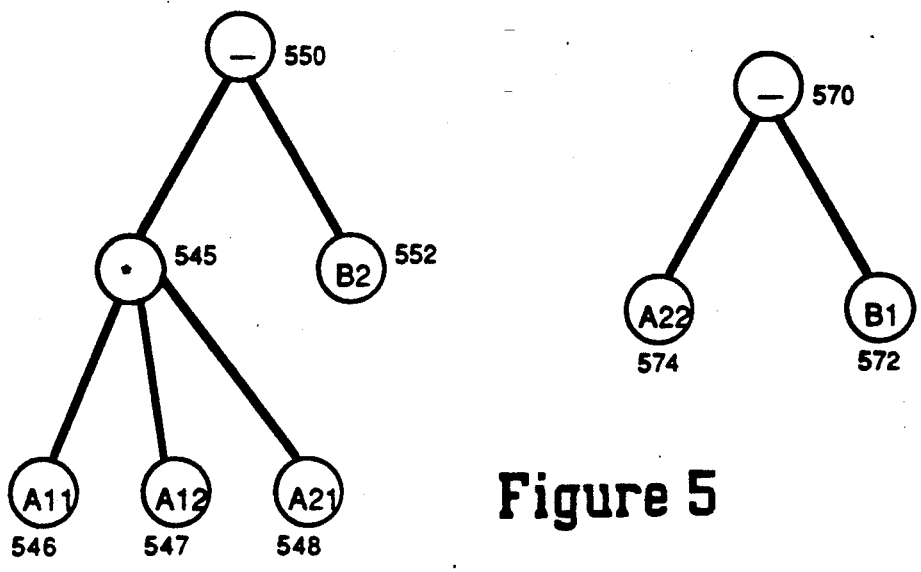

If two external points (leafs) of the tree had been chosen as crossover points, the crossover would have proceeded similarly with the labels (i.e. arguments) for the two points being exchanged. FIG. 5 illustrates the mating of two parents with crossover occurring only at external points (leafs) for the linear equations example problem. The first parent 500, (−(*A11 A12 A21) B1), is represented by the tree with root 510. Root 510 is the subtraction function having lines to arguments at internal node 515 and leaf 512 (the variable B1). Node 515 is the multiplication function having lines to arguments at leafs 516, 517, and 518 (the variables A11, A12, and A21, respectively). External point (leaf) 512 has been chosen as the crossover point for the first parent and contains the atomic argument of the variable B1. Note that, for purposes of illustrating the generality of functions, one of the functions (*) has 3 arguments (A11, A12 and A21) in this particular figure. The second parent 520 is represented by the tree with root 530. Root 530 is the subtraction function having lines to arguments at leafs 534 and 532 (the variables A22 and B2, respectively). External point (leaf) 532 has been chosen as the crossover point for the second parent and contains the atomic argument B2.

The result of the crossover operation is two new offspring 540 and 560. The first offspring 540, (−(*A11 A12 A21) B2), is represented by the tree with root 550. Root 550 is the subtraction function having lines to arguments at internal node 545 and leaf 552 (the variable B2). Node 545 is the multiplication function having lines to arguments at leafs 546, 547, and 548 (the variables A11, A12, and A21, respectively). This tree is identical to the tree with root 510 (i.e. parent 1) except that external point (leaf) 552 is now the argument B2 (instead of B1) from parent 2. The second offspring 560, (−A22 B1), is represented by the tree with root 570. Root 570 is the subtraction function having lines to arguments at leafs 574 and 572 (the variables A22 and B1, respectively). This tree is identical to the tree with root 530 (i.e. parent 2) except that external point (leaf) 572 is now the argument B1 (instead of B2) from parent 1. Thus, the arguments B1 and B2 have been crossed over (exchanged) to produce the two offspring.

Figure 6:
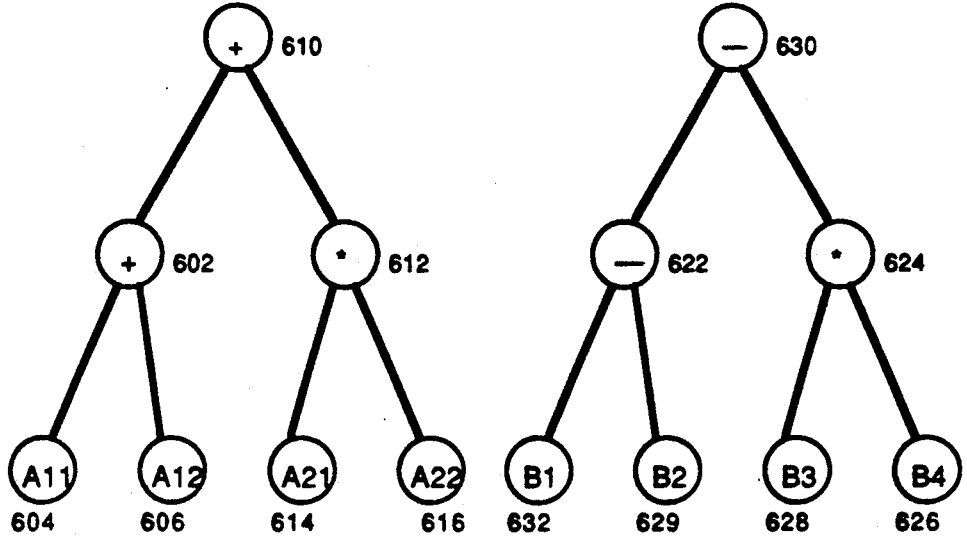
FIG. 6 is a tree diagram representation of a crossover operation occurring at an internal and an external point.
Figure 6:
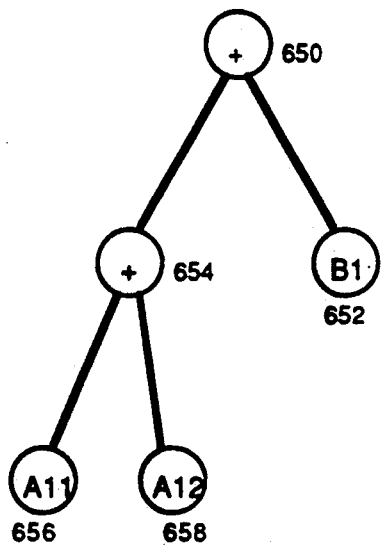
Figure 6:
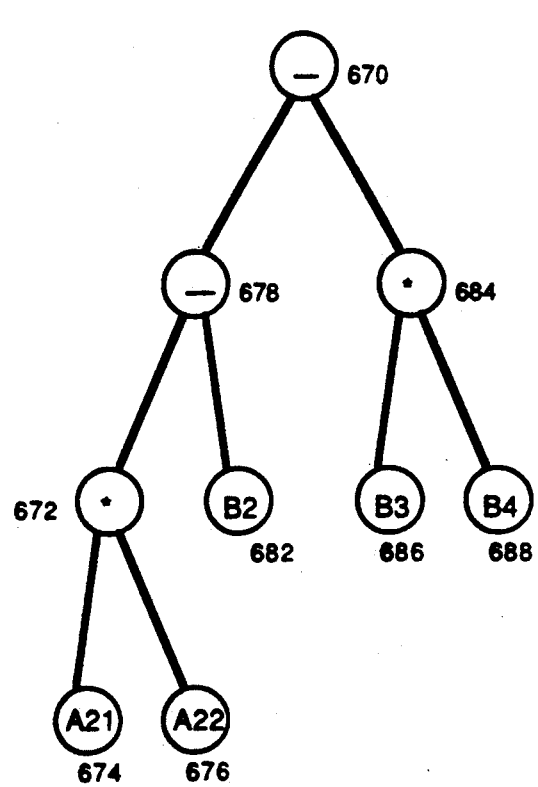

FIG. 6 illustrates the mating of two parents with crossover occurring at one internal point (i.e. a point labeled with a function) and one external point (i.e. a point labeled with an atomic argument). The first parent 600, (+(+A11 A12) (*A21 A22)), is represented by a tree with root 610. Root 610 is the addition function having lines to arguments at internal nodes 602 and 612. Node 602 is the addition function having lines to arguments at leafs 604 and 606 (the variables A11 and A12, respectively). Node 612 is the multiplication function having lines to arguments at leafs 614 and 616 (the variables A21 and A22, respectively). Internal point 612 has been chosen as the crossover point for the first parent. The second parent 620, (−(−B1 B2) (*B3 B4)), is represented by a tree with root 630. Root 630 is the subtraction function having lines to arguments at internal nodes 622 and 624. Node 622 is the subtraction function having lines to arguments at leafs 632 and 629 (the variables B1 and B2, respectively). Node 624 is the multiplication function having lines to arguments at 628 and 626 (the variables B3 and B4, respectively). External point 632 has been chosen as the crossover point for the second parent.

The result of the crossover operation is two new offspring. The first offspring 640, (+(+A11 A12) B1), is represented by the tree with root 650. Root 650 is the addition function having lines to arguments at internal node 654 and leaf 652 (the variable B1). Node 654 is the addition function having lines to arguments at leafs 656 and 658 (the variables A11 and A12, respectively). This tree is identical to the tree with root 610 (i.e. parent 1) except that the second argument of the function + (addition) 652 is now the single argument (atom) B1 from parent 2. The second offspring 660, (−(−(*A21 A22) B2) (*B3 B4)), is represented by the tree with root 670. Root 670 is the subtraction function having lines to arguments at internal nodes 678 and 684. Node 678 is the subtraction function having lines to arguments at internal node 672 and leaf 682 (the variable B2). Node 672 is the multiplication function having lines to arguments at leafs 674 and 676 (the variables A21 and A22, respectively). Node 684 is the multiplication function having lines to arguments at leafs 686 and 688 (the variables B3 and B4, respectively). This tree is identical to the tree with root 630 (i.e. parent 2) except that the internal point 672 (i.e. the first argument of the subtraction function 678) is now a function (multiplication) instead of the atomic argument of the variable B1.

Thus, regardless of whether internal or external points are selected as crossover points on the trees of the parents, the result of the crossover operation is that offspring are produced which contain the traits of the parents. In fact, the offspring resulting from crossover consist only of subprocedures from their parents. To the extent this is not entirely the case in actual practice, the result can be viewed as having been the result of applying crossover to the parents and then allowing a mutation (random variation) to occur. The crossover operation has the properties of closure and being well-defined.

Occasionally, a given individual may be mated with itself. In the conventional genetic algorithm involving binary strings, crossover with identical parents merely creates two copies of the original individual. When computational procedures are involved, an individual mating with itself generally produces two different individuals (unless the crossover points selected happen to be the same).

The three examples of mating with crossover were presented above in terms of the graphical representation of the computational procedures. Graphical representations are especially suited to demonstrating the "cut and paste" character of the crossover operation. In addition, the graphical method of representation is a general way of representing functions and the objects they operate on (whether computational procedures or machines) and is also not inherently associated with any particular programming language or any particular mode of implementation. As previously discussed, the computer language LISP is preferred for actually implementing these processes on a computer.

In FIG. 6, the mating of two parents with crossover occurring at one internal point and one external point is illustrated. FIG. 6 will be referred to in the following discussion since it encompasses the principles involved in both FIGS. 4 and 5. Parent 1 in FIG. 6 was the LISP computational procedure (+(+A11 A12) (*A21 A22)) and parent 2 in FIG. 6 was the LISP computational procedure (−(−B1 B2) (*B3 B4)). Using LISP computational procedures, the mating of the two parents is implemented in the following way.

First, the number of functions and atomic arguments in the LISP S-expression 600 in FIG. 6 are counted. For LISP S-expression 600, there are 3 functions (i.e. 2 occurrences of + and 1 occurrence of *) and there are 4 atomic arguments (i.e. A11, A12, A21 and A22). The total count is 7. This counting can be easily performed in LISP in a variety of well-known ways. One especially simple way makes use of such basic LISP functions as CAR and CDR, which are built into the microcode of microprocessor chips that are especially designed to handle LISP (such as found in the Texas Instruments Explorer II computer). The CAR function in LISP allows one to examine the first item of any list. Here the first item in computational procedure 600 is the first + function (i.e. the addition function appearing just inside the outermost left parenthesis). The "+" is identified as a function and included in the overall count. Meanwhile, the CDR function eliminates the first item of the list by returning a list comprising all but the first item. Thus, the remainder of the computational procedure (which is now smaller than the original computational procedure 600 by the first element +) can be subjected to similar handling in a recursive way.

Secondly, having counted the number of functions and atomic arguments in the computational procedure 600, a random number generator is called to select a number between 1 and 7. Typically, a uniform probability distribution (i.e. probability of 1/7 for each of the 7 possibilities is used). Such random number generators are well-known in the art and often included in a package of utility functions provided by computer manufacturers to users of their computers. Texas Instruments provides a random number generator for generating a random integer within certain bounds using a uniform probability distribution. If the random number generator selects the integer 5, then the multiplication function *(shown graphically at point 612) would be chosen as the crossover point for parent 1. This identification is most simply accomplished by numbering the functions and atomic arguments in the same order as the counting function encountered them (although any ordering might be used for this purpose). In particular, the crossover point is the first element of the sub-list (*A21 A22).

This sub-list is the third element of the list 600. Note that in LISP, a computational procedure is represented by a list—an ordered set of items found inside a pair of parenthesis.

Similarly, the functions and atomic arguments in computational procedure 620 can be counted. The count for parent 2 would thus be 7. In this example, the atomic argument B1 is selected as the crossover point for parent 2. This atomic argument happens to be in the second top-level element of the list 620—namely, the sub-list (−B1 B2). In fact, B1 is the second element of this second top-level element of list 620.

The third step involves finding the "crossover fragment" for each parent. When the crossover point for a given parent is an atomic argument, then the "crossover fragment" for that parent is simply the atomic argument. Thus, for example, the crossover fragment for parent 2 is the atom B1. On the other hand, when the crossover point for a given parent is a function, then the "crossover fragment" for that parent is the entire list of which the function is the first element. Thus, for example, the crossover fragment for parent 1 is the entire list (*A21 A22). By producing a "crossover fragment", portions of each parent combine to produce offspring.

In the above case, the list has no sub-lists. However, if this list contained a sub-list (that is, an argument that was itself a function of other arguments), then it is carried along also. This point about sub-lists can be easily illustrated by supposing that the first element of list 600 had been chosen as the crossover point (instead of the multiplication * function). This first element is the function +. Then the crossover fragment associated with this crossover point is the entire original list 600—that is, the list consisting of the function + and the 2 sub-lists (+A11 A12) and (*A21 A22).

The fourth step is to produce offspring 1. Offspring 1 is produced by allowing parent 1 to perform the role of the "base" ("female") parent and parent 2 to perform the role of the "impregnating" ("male") parent. In general, an offspring is produced within the female parent by replacing the crossover fragment of female parent with the crossover fragment of the male parent. In particular, the crossover fragment of the female parent [the entire list (*A21 A22)] is replaced within the female parent by the crossover fragment of the male parent (the atomic argument B1). The resulting offspring 1 is thus:

(+(+A11 A12) B1).

The fifth step is to produce offspring 2. Offspring 2 is produced by allowing parent 2 to perform the role of the "base" ("female") parent and parent 1 to perform the role of the "impregnating" ("male") parent. In particular, the crossover fragment of the female parent (the atomic argument B1) is replaced by the crossover fragment of the male parent [the list (*A21 A22)]. The resulting offspring 2 is thus: (−(−(*A21 A22) B2) (*B3 B4).

Thus, two parents can produce two offspring. In some variations of the process, only one offspring is produced from a designated male-female pair; however, it is most convenient to have two parents produce two offspring (since, among other things, this produces the convenient, although not necessary, side effect of maintaining the population size at a constant level). In this preferred implementation of the crossover process, each offspring is composed of genetic material that came from either its male parent or its female parent. The genetic material of both parents finds its way into one of the two offspring.

For the operation of reproduction, one computational procedure with relatively high fitness is selected from among the computational procedures in the population. This computational procedure is retained in the population unchanged. The preferred method for selecting computational procedures for reproduction is to select them with a probability proportional to their normalized fitness. In other words, there is survival and reproduction of the fittest amongst the computational procedures in the population. One consequence of the reproduction operation is that individuals in the population with relatively low fitness values are progressively removed from the population.

It should be noted that the reproduction operation introduces nothing new to the population. If only reproduction operations were performed, no new individuals would be-created. In fact, if only reproduction occurred, there would be progressively fewer and fewer different individuals in the population (although the average fitness of the population would tend to increase). The reproduction operation has the properties of closure and being well-defined.

Figure 7:
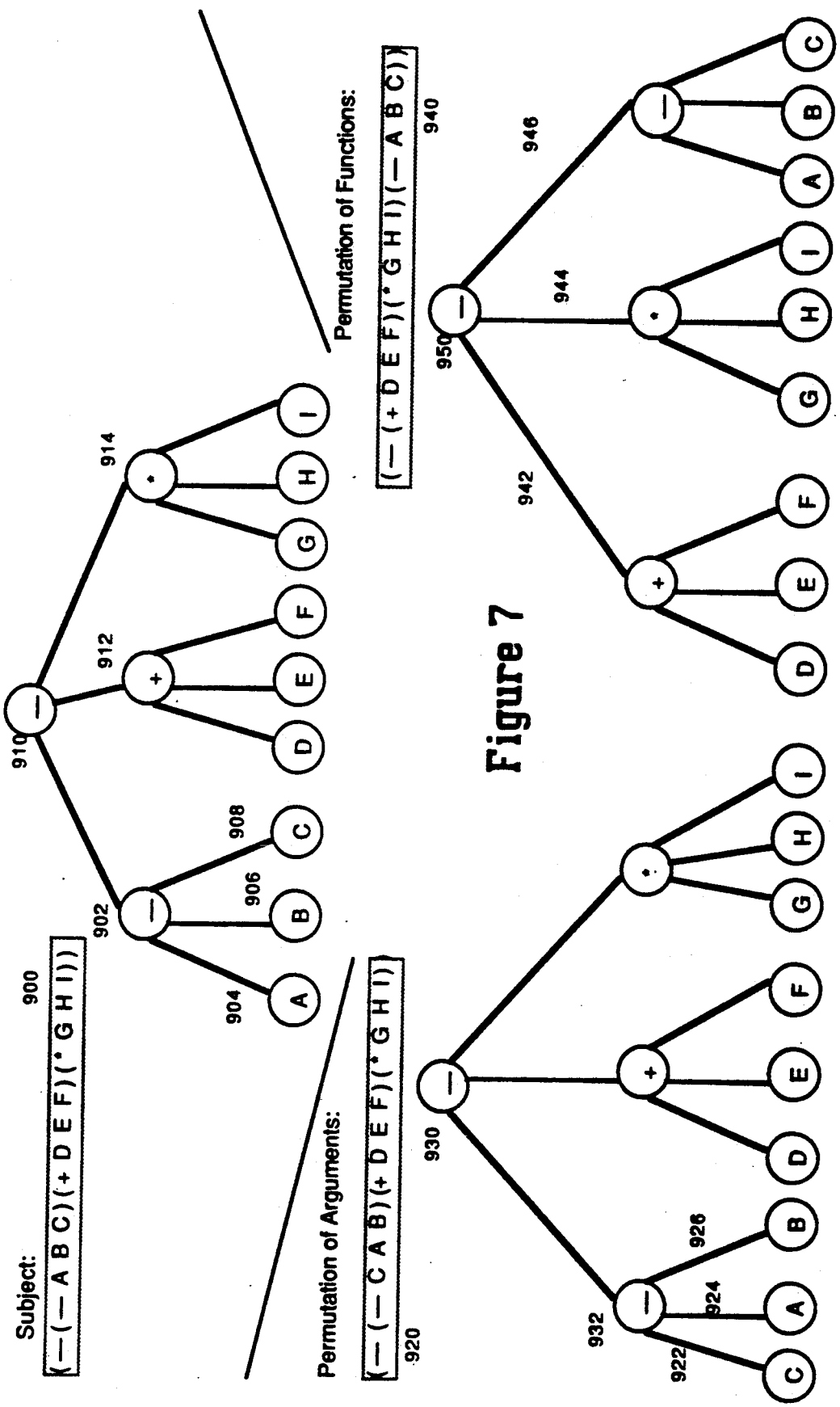
FIG. 7 is a tree diagram representation of a permutation operation.

Reproduction of the fittest and crossover are the basic operations for varying and improving the population of individual computational procedures. In addition, there is a permutation operation. Permutation operates on a single subject and produces a single computational procedure. The permutation operation has the properties of closure and being well-defined. FIG. 7 illustrates the permutation operation on a computational procedure.

The permutation operation is also performed on an individual in the population with relatively good fitness. One purpose of permutation is to introduce a new order among existing sub-procedures of a given computational procedure (possibly allowing some new possibility for adaptation to emerge). However, the chances of this happening are relatively remote (just as the chance of a random mutation producing a mutant with high fitness is remote). The most important purpose of permutation is, however, to improve various sub-procedures within a given computational procedure already having high fitness. Potentially, a new order for existing sub-procedures within a computational procedure already having high fitness will be less subject to disruption due to the operation of the crossover operation.

In FIG. 7, the subject computational procedure 900, (−(−A B C) (+D E F) (*G H I)), is represented by a tree with root 910. Root 910 is the subtraction function and has lines to arguments at internal nodes 902, 912 and 914. Node 902 is the subtraction function and has lines to arguments at leafs 904, 906 and 908 (the variables A, B, and C, respectively). Node 912 is the addition function and has lines to arguments at leafs with the variables D, E, and F. Node 914 is the multiplication function and has lines to arguments at leafs with the variables G, H, and I.

Only internal points are selected for the permutation operation. To accomplish this, the internal points are counted and one of them is chosen at random from among the possibilities (typically using a uniform probability distribution). The tree with root 910 has four internal points (910, 902, 912, and 914). Once the permutation point is chosen, all the lines radiating downwards from that point are permuted (i.e. re-ordered) at random. If there are K lines radiating from a given permutation point, then there are K-factorial possible permutations. Thus, if K is 3 (as it is for internal point 902), then there are six possible permutations (i.e. 3 times 2 times 1) possible at the permutation point 902.

One of the six possible permutations is chosen at random using a uniform probability distribution over the six possibilities. One of the six possible permutations of three items permutes the items A, B, C to C, A, B. Suppose this one was chosen. The computational procedure 920, (−(−C A B) (+D E F) (*G H I)), is represented by the tree with root 930; it is the tree that results when this particular permutation is applied to the tree with root 910 using the permutation point 902. In this new tree 930, the first line 922 radiating from the internal point 932 ends with the label C (instead of A as at 904). The second line 924 radiating from internal point 932 ends with the label A (instead of B as at 906). The third line 926 radiating from internal point 932 ends with label B (instead of C as at 908). The second and third lines from 930 have the same arguments as the second and third lines from root 910. Thus, the permutation of A,B,C to C,A,B at permutation point 902 has been effected. If a particular permutation happens to exactly reverse the order of items, it is called an inversion.

If internal point 910 had been chosen as the permutation point, the computational procedure 940, (−(+D E F) (*G H I) (−A B C)), represented by the tree having root 950 would be the result. In this tree, the first line 942 radiating downwards from root 950 ends with the label+(addition). The second line 944 radiating downwards from internal point 950 ends with the label * (multiplication). The third line 946 radiating downwards from internal point 950 ends with the label−(subtraction). Thus, the three items −,+,* from tree 910 are permuted into the new order +,*,−. Each function has the same arguments as the corresponding tree with root 910. If one views the permutation operation as operating on the lines radiating downwards from the chosen point of permutation, there is no fundamental difference between the permutation of arguments illustrated by 920 and the permutation of functions illustrated by 940. The two are included here for the sake of illustration.

Another possible step in the present invention's process is mutation. The mutation operation alters a randomly selected point within an individual. It has the properties of closure and being well defined. Mutation, if performed at all, is performed on only a tiny fraction of alleles in a tiny fraction of entities in the population. It is preferably performed on randomly selected individuals in the population having a relatively high fitness. The purpose of mutation is not to accidently create a mutant individual with extremely high fitness and thereby improve the population (although there is a very remote possibility that this may happen). Mutation does, however, perform one role which is occasionally useful—namely, it provides a way to introduce (or reintroduce) new genetic material into the population.

Generally, with even a modestly sized population, all the possible gene values (alleles) will be represented somewhere in the population. This is almost certainly going to be the case in the initial population if it is at least modestly sized and if it is generated at random. In fact, a potential pitfall of priming an initial population (especially if 100% of the initial population comes from priming) is the possibility of accidently limiting the search possibilities to only a portion of the potential search space. However, in the course of removing individuals with low fitness, there is a remote possibility that particular alleles may actually disappear completely from a population. There is also a remote possibility later the vanished alleles may become necessary to achieve the next level of advance in fitness. To forestall this remote conjunction of possibilities, the mutation operation may prove useful. By randomly altering an allele in a tiny number of randomly chosen individuals from time to time, the mutation operation may reintroduce a vanished allele back into a population.

Finally, the results of the chosen operation are added to the population. When new individual computational procedures are created by any operation, they are added to the existing population of individuals. The process of executing the new computational procedures to produce a result and then assigning a value to the results can be immediately performed. Thus, if the next step terminates the iterative process, the newly created computational procedures will have a fitness value.

Figure 8:
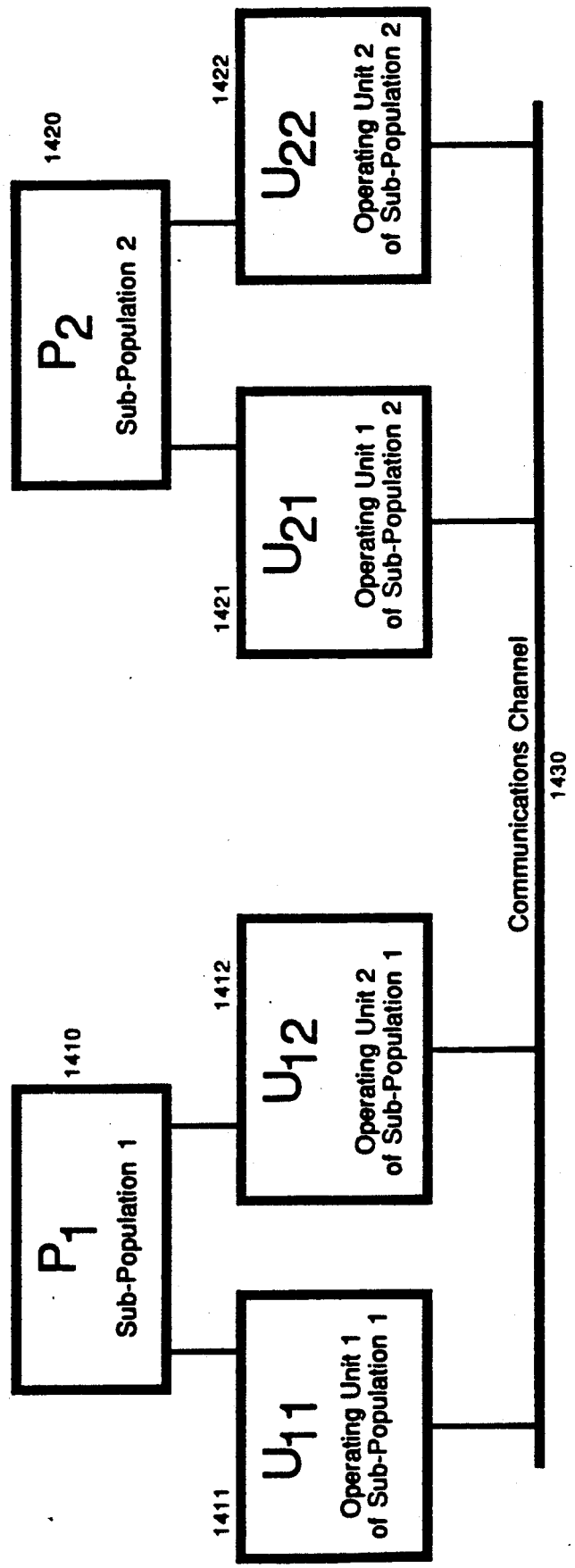
FIG. 8 is a block diagram of the parallel processing embodiment of the present invention.

The process of the present invention can benefit greatly from parallel operation. By using parallel processing, the overall rate of activity rises in almost direct proportion to the number of activities performed simultaneously. FIG. 8 is a block diagram depicting parallel processing of the present invention using two sub-populations each having two operating units. Sub-population $P_1$ 1410 is coupled to operating units $U_{11}$ 1411 and $U_{12}$ 1412. Sub-population $P_2$ 1420 is coupled to operating units $U_{21}$ 1421 and $U_{22}$ 1422. Communications channel 1430 couples all four operating units. FIG. 8 illustrates two sub-populations each with two operating units; however, in general, there can be an arbitrary number of sub-populations and arbitrary number of operating units involved.

Two types of parallel activity can occur. In the first type, each of the operations (crossover, reproduction, permutation, etc.) are performed simultaneously in parallel on different entities (or different groups of entities for crossover) selected from a given population of individuals. If the entities are computer programs, parallel processing is accomplished by a computing machine having multiple operating units (control and arithmetic) capable of simultaneously working on entities selected from a particular single computer memory area.

To show this first type of parallel processing, consider operating units $U_{11}$ 1411 and $U_{12}$ 1412 which are coupled to sub-population $P_1$ 1410. Each operating unit can access the sub-population to select entities for the operations based on their relative fitness, followed by performing the operation, adding new programs, and the rest of the iterative process simultaneously.

The second type of parallel processing involves simultaneously occurring activity in two or more different sub-populations. To show this type of parallel processing, consider sub-population $P_1$ 1410 and sub-population $P_2$ 1420. While $P_1$'s two operating units operate on $P_1$, $P_2$'s two operating units operate on $P_2$. Both types of parallelism are highly efficient because very little information need be communicated along the communication channel 1430. In addition, each operating unit need perform only a few very simple activities in response to the information received from the communications channel 1430.

Communication and coordination is performed by communications channel 1430, which couples all the operating units associated with the various sub-populations. In a computer, the communication channel is a communication bus.

To illustrate the efficiency of parallel processing, let us suppose that selection is performed using probabilities proportionate to fitness. The computation of this probability for a particular individual typically requires two pieces of information—namely, the value (fitness) assigned to the result of executing the particular individual and the total of all such values for all individuals in the entire population. Typically this calculation is performed by dividing the individual's assigned value (fitness) by the total for the entire population. Once the total has been once computed for the initial entire population, the total is easily modified by incrementing it for each newly created individual and by debiting it for each individual that is removed.

This simple computation can be performed by each operating unit whenever it receives information via the communications channel 1430 about any insertion or removal of an individual in the population. Similarly, each operating unit must transmit information along the communications channel 1430 to all other operating units whenever it inserts or removes any individual from the sub-population which it accesses. The message consists of the increment (in the case of an insertion) or the decrement (in the case of a removal) in the total value (fitness) of the population. Note that these messages are relatively short and require very little effort to send and act on in comparison to the considerably larger effort needed to perform the iterative process. Because processing messages is relatively minor in comparison to performing the genetic algorithm, the overall rate of activity in this parallel configuration rises almost in direction proportion to the number of activities being performed in parallel. In the case of computer programs, the benefits of parallel activity (using parallel operating units accessing parallel sub-populations) is manifested in terms of a rate of overall computer processing activity, rising almost in direct proportion to the number of parallel activities. That is, the amount of computation performed per unit of time rises almost in direct proportion to the number of parallel activities.

From time to time, the communications channel is also used to exchange large groups of individuals between the sub-populations so that each sub-population receives new genetic material that have achieved relatively high values of fitness from other sub-populations. These occasional transmissions of information add to the administrative overhead of a parallel system; however, because they occur only occasionally (i.e. after many generations of activity confined to the sub-populations), they have only a minor effect on the overall efficiency of the parallel configuration.

Two examples (Solving Linear Equations and Sequence Induction) are discussed below.

SOLVING LINEAR EQUATIONS

In this example, the environment in which adaptation takes place consists of n sets of two consistent non-indeterminate linear equations in two variables. If we delete the subscripts identifying the particular pair of equations involved, the typical equation pair is:

$$A11\ X1 + A12\ X2 = B1$$

$$A21\ X1 + A22\ X2 = B2$$

Without loss of generality, the coefficients of each pair of equations have been normalized so that the determinant is 1. This particular problem has a known mathematical solution for the first variable (x1) which, if written as an S-expression in the LISP programming language, is (−(*B1 A22) (*B2 A12)). A similar S-expression gives the solution for the second variable (x2). A natural metric for evaluating an S-expression's proffered solution is the sum of the deviations from the known mathematical solution produced by the proffered S-expression. This sum is the aggregate, over the series of all pairs of equations, of the Euclidean distance between the proffered solution point and the known actual solution point. A sum of zero for a particular S-expression means the expression is a perfect solution. A very small sum represents the kind of solution acceptable in practice from a digital computer. Since the solution for the second variable (x2) is directly derivable from either of the two (consistent) equations of a given pair, a proffered solution to this problem can be viewed as simply a single valid S-expression whose return value is the solution for the first variable (x1) for each pair of equations in the series. The proffered solution can then be evaluated by deriving the solution for the second variable from the first; then computing the Euclidean distance. Finally the distances are accumulated over the series. This approach happens to make the atomic arguments A12 and A22 extraneous to the solution for the variable (x1).

Figure 9:
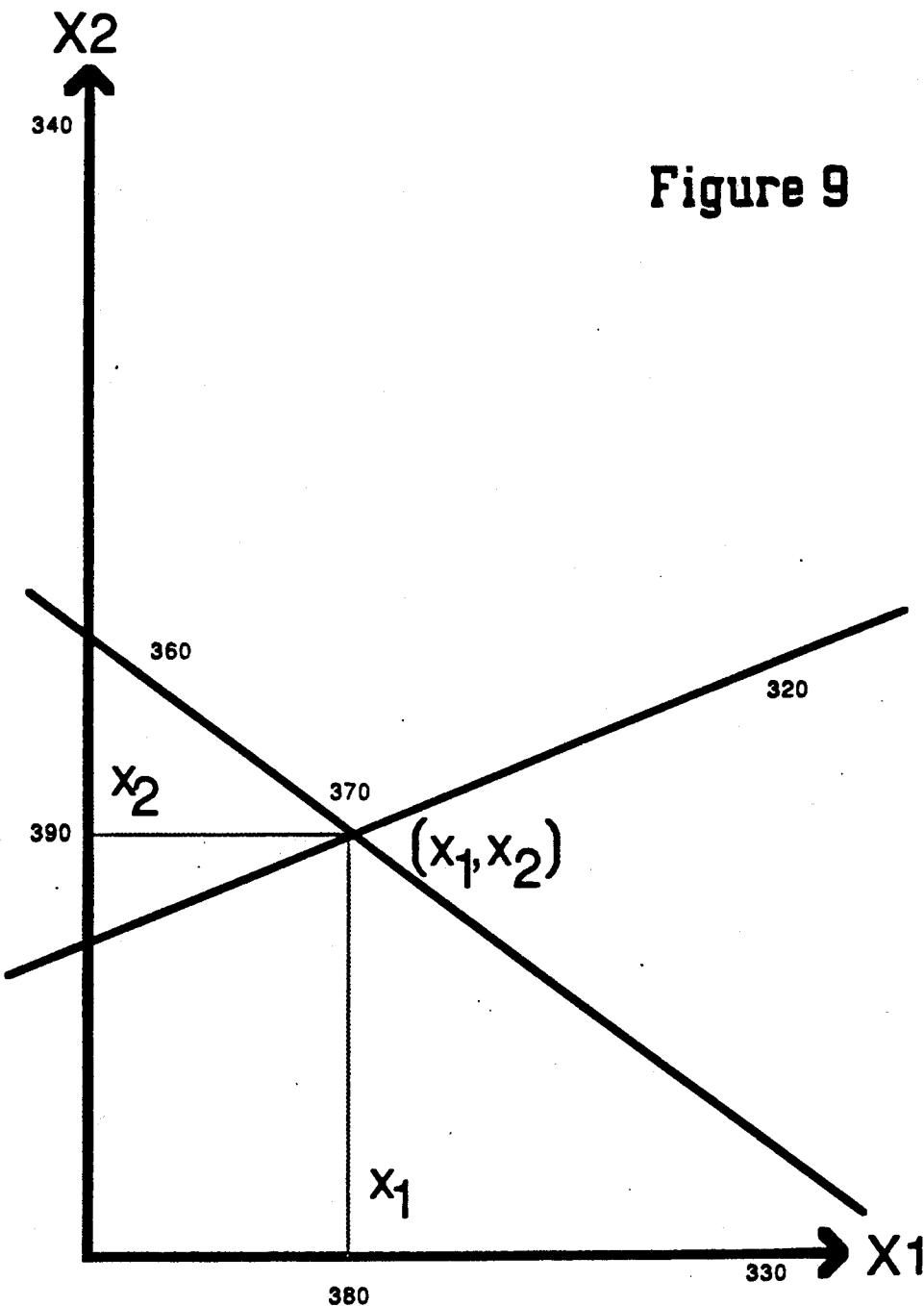
FIG. 9 is a chart diagram of the linear equation problem.

FIG. 9 shows a pair of linear equations having two variables x1 and x2. In FIG. 9, the first equation 310 corresponds to the straight line 320 drawn on the plane defined by the horizontal axis X1 330 and vertical axis X2 340. The second equation 350 corresponds to the straight line 360 drawn on the same plane. The point of intersection 370 has a coordinate 380 (x1) along the horizontal axis X1 330 and a coordinate of 390 (x2) along the vertical axis X2 340.

The universe from which proffered solutions for the first variable x1 consists of any valid LISP S-expression (with any level of embedding of functions) constructed from the useful input atomic arguments (A11, A21, B1, and B2), the extraneous input atomic arguments (A12 and A22), the useful functions of multiplication and subtraction (* and −), and the extraneous function of addition (+). The presence of an extraneous function and arguments tends to make this example problem more realistic.

The search space in which the solution to this problem lies is thus a very large, non-linear, non-continuous space of rooted trees whose points are labeled with various mathematical symbols (either functions or arguments). A large number of possible tree structures can represent valid LISP S-expressions, even if one arbitrarily limits the level of embedding and all the functions have only two arguments. In addition, there are many ways of labeling the internal points of these trees with the available functions and there are many ways of labeling the external points (leafs) of these trees with the available arguments. Some LISP S-expressions in the search space equal mathematically, the most parsimonious solution cited above [for example, adding in (−A11 A11) to the solution]. However, these occasional numerically equivalent S-expressions provide no usable simplification of the problem or usable reduction of the large number of possible S-expressions involved here.

Solving these problems starts by generating a population of individual S-expressions using the functions *, −, and + and the atomic arguments A11, A12, A21, A22, B1, and B2. The initial population can be generated entirely at random. That is, starting at the top of the tree, one of the available functions or arguments is chosen at random. If an atomic argument is chosen as this first choice, the process is complete and the S-expression consists of this single atom. If a function is chosen, the process continues. If the function chosen requires K arguments (and K is 2 for all three of the functions in this problem example), then a similar random selection is made for each end-point of each of K lines radiating downwards from the initial point. That selection is also made at random and may be an atomic argument or a function. If an atomic argument is selected, that particular point becomes an external point (leaf) on the tree and no further attention is paid to that line. If a function is selected, then the process continues recursively with additional selections being made in the same manner. When, at some point, atomic arguments have been selected for all external points, the process of randomly constructing the tree is then completed. The initial population is merely a random subset of the domain in which the subsequent search is to take place.

Figure 10:
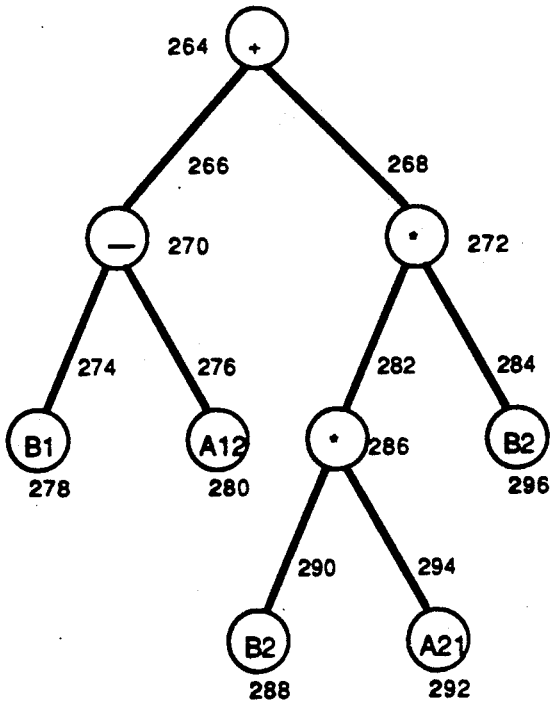
FIG. 10 is a tree diagram representation of an S-expression which is a member of initial population for solving the linear equation problem of the present invention.

For some problems, the system can be primed by including some S-expressions (or some portions of S-expressions) which are believed to be important in dealing with the problem at hand. In addition, the operation of the system may be interrupted at any point and restarted with the population of individuals existing at the end of the previous run. That method of re-starting operations can be viewed as priming the system with an entire population. FIG. 10 is an example of randomly generating an initial population of S-expressions using the example expression 262, which is:

(+(−B1 A12)(*(*B2 A21)B2))

Starting at the root 264 of the tree, one of the available functions (*, +, or −) or one of the available atomic arguments (A11, A12, A21, A22, B1 or B2) is selected. In this figure, the function + (addition) was selected at random to appear at the root 264 of the tree. Since this function has two arguments, there are two lines 266 and 268 radiating downwards from the internal point 264. For the endpoint 270 of the line 266 and endpoint 272 of the line 268, another similar random selection must be made from the set of available functions or available arguments. For point 270, the function − (subtraction) has been selected. Since this function also has two arguments, there are two lines 274 and 276 radiating downwards from point 270. For the endpoint of each such radiating line, a similar random selection must be made. Here, the variable B1 has been selected for the endpoint 278 of the line 274. Since B1 is an atomic argument, that completes the process for this branch of the tree. Also, the variable A12 has been selected for the endpoint 280 of the line 276. This completes the process for the line 266 radiating downwards from the root 264.

For the second argument of root 264 at the internal point 272, a function * (multiplication) has been selected. Since this function has two arguments, two lines 282 and 284 radiate downward from point 272. For point 286 at the end of line 282, another function * (multiplication) has been selected. The endpoint 288 of the first line 290, which radiates downward from point 286, has the atomic argument of the variable B2. The endpoint 292 of the second line 294, which radiates from point 286, has the atomic argument of the variable A21. Similarly, the line 284 radiating downward from point 272 has the atomic argument of the variable B2 at its endpoint (leaf) 296. This completes the random generation of the tree and corresponding S-expression.

Shown below are some examples of possible S-expressions for this example which could have been generated at random as the initial population of individuals:

(+A11 A12)            (1)

(-(*B1 B2)A2)         (2)

(+(-B1 A2)(*(*B2 A21)B2))   (3)

Examining one of these expressions, example (1) consists of the sum of the coefficients of the first linear equation. Its interpretation is the solution for the first variable (x1) in a system of two linear equations in two variables always equals the sum of A11 and A12, regardless of any of the other coefficients or constants in the equations. One would expect this wrong expression to usually produce proposed solutions which are far from the correct solutions. Of course, this incorrect S-expression might occasionally, by coincidence, produce the correct solution for a particular pair of equations.

Once the population of individuals is generated, each of the S-expressions in the population is executed (i.e. evaluated in LISP) to produce a result. In LISP, each S-expression can be executed to return some kind of numerical, symbolic, logical, or other result. In practice, this execution is repeated over a series (i.e. different games for the Prisoner's Dilemma and different pairs of linear equations for the current example problem) to avoid accidentally misleading conclusions. By performing this evaluation over a series of different situations, a better measure of performance is obtained. For example, (+A11 A12) might give the correct solution to the first variable (x1) for some unusual set of linear equations in two variables, though not the solution to the problem in general.

For purposes of this example problem and in order to simplify the discussion, the "result" of evaluating the S-expression here is simply a numerical value for the first variable x1. As previously mentioned, if the possibility of parallel lines (i.e. inconsistent equations) were allowed in this example, the "result" might be either numeric or symbolic. Alternately, the "result" could be the pair (vector) of numbers (x1, x2) specifying the coordinates of the point in the plane where the two lines intersect. Once the result of the execution of the computational procedure (S-expression) takes place, the result can be assigned a value in the particular environment involved for the particular problem involved.

In the case of this example problem, the solution for the second variable (x2) is directly derivable from the first variable (x1) using either of two (consistent) equations of a given pair of equations. The variables x1 and x2 correspond to a point in the plane (the point whose horizontal coordinate is x1 and whose vertical coordinate is x2) while the actual solution corresponds to another point in the plane. The distance between the two points in the plane can be computed. The distances obtained by evaluating the S-expression using the other pairs of linear equations can be similarly computed. The cumulative distance provides a natural measure of value (fitness) of a particular individual S-expression in this environment. If the sum of these distances for a particular individual S-expression is zero, then the S-expression has the best value (best fitness) in this environment because it produces points of intersection that are exactly correct in each case (i.e. have zero distance, in each case, from the correct points).

INDUCTION ON SEQUENCES

In this example problem, the environment in which adaptation is to take place consists of a single given sequence:

$$S_0, S_1, S_2, S_3, \ldots, S_i, \ldots$$

The goal is to produce a computational procedure (S-expression) for the sequence (that is, a computational procedure which gives $S_i$ for any index i). A proffered solution to this sequence induction problem consists of a LISP S-expression using the argument INDEX which gives the value of the sequence for position INDEX of the sequence. The first element of a sequence is considered to have an INDEX of 0 (not 1) by convention. For example, the sequence 0, 2, 4, 6, 8, 10, . . . can be represented by the computational procedure (*2 INDEX). That is, the value of the sequence for positon INDEX of the sequence is 2 times the INDEX.

This problem of sequence induction, of course, has no strictly mathematical solution. Nonetheless, we can evaluate proffered solutions according to how well they match the available known elements of the sequence. In this case, a higher value for the matching function is better. The known best value for the matching function is the value that occurs if all the available known elements of the sequence exactly match the result of executing the computational procedure under consideration.

Since many sequences are defined recursively (that is, earlier elements in the sequence are used to define later elements), it is desirable to have a function for referencing the value of the sequence for k positions earlier in the sequence than the current position (i.e. the position numbered INDEX). For example, it may be necessary to express $S_i$ in terms of $S_{i-1}$ (the previous element of the sequence) or in terms of $S_{i-k}$ (k elements earlier in the sequence). Note that if the value of k were zero, negative, or greater than INDEX, the attempted reference would be to values of the sequence which do not exist. For these non-existent positions, a default value should be defined for the function to make it complete. Thus, the referencing function should have two arguments. The first argument is k and the second argument is a default value. The referencing function is termed "&".

The function & (k, D) of the variables k and D returns the value of the sequence for position INDEX-k whenever INDEX-k lies between 0 and INDEX-1, and, otherwise, this function returns the default value D. For example, the sequence 2, 4, 8, 16, 32, . . . can be represented by the computational procedure (*2 (& 1 1)) because the value of the sequence for position INDEX is generally 2 times the value of the sequence for position INDEX- 1. Note that when INDEX is 0 (and a reference is attempted for sequence position −1), the value of the sequence is 2 times the default value of 1.

Similarly, for example, the Fibonacci sequence:

1, 1, 2, 3, 5, 8, 13, 21, 34, 55, . . .

may be expressed as $S_i = S_{i-2} + S_{i-1}$ (with the understanding that if $S_{i-2}$ or $S_{i-1}$ refer to sequence elements earlier than sequence element 0, a default value of 1 will be used). The Fibonacci sequence can also be represented by the doubly recursive computational procedure:

(+(& 1 1)(& 2 1))

Except for the special argument INDEX and except for the special referencing function & needed to allow references to the sequence itself, the process of sequence induction can proceed using the same functions available in LISP as were used for the linear equations example.

Figure 11:
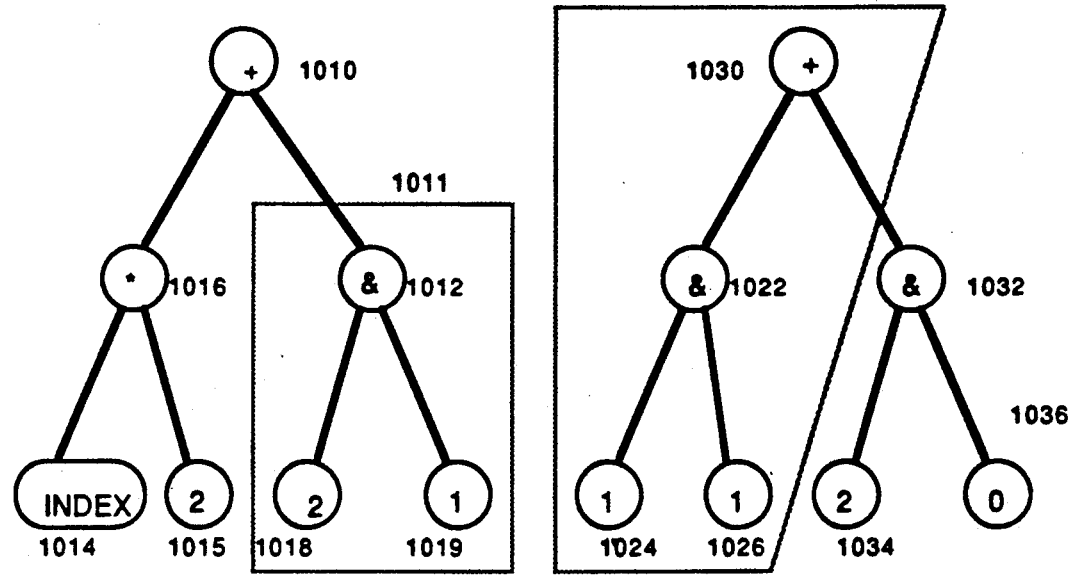
FIG. 11 is a tree diagram representation of a crossover operation of the Fibonacci series problem.
Figure 11:
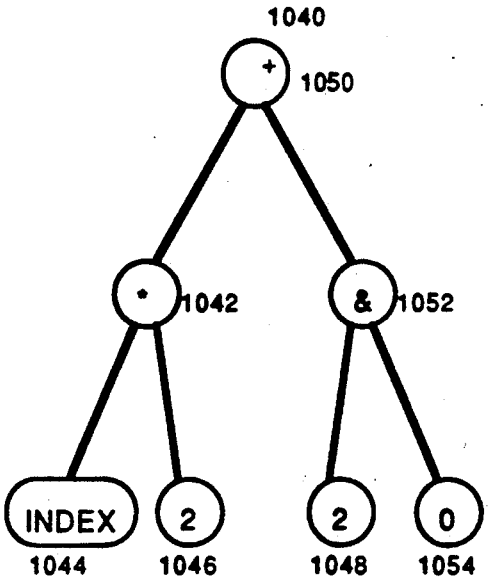
Figure 11:
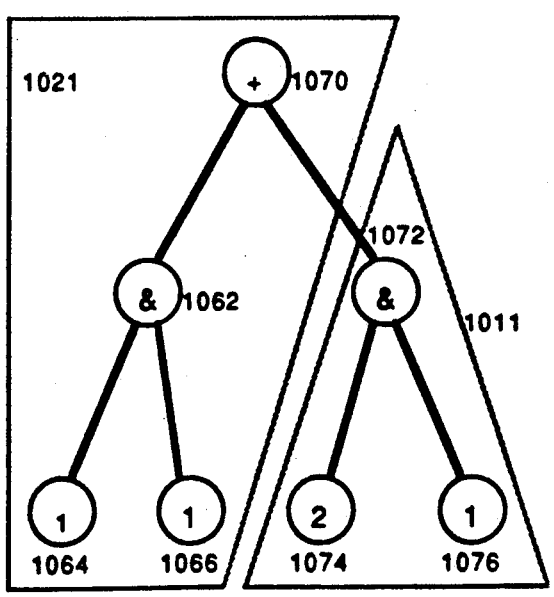

FIG. 11 illustrates the crossover operation applied to two parents whose functions and arguments include the special function & and the special argument INDEX appropriate for the sequence induction problem. The first parent is computational procedure 1000, (+(*INDEX 2) (& 2 1)), represented by the tree with root 1010. Root 1010 is the addition function and has lines to arguments at internal nodes 1016 and 1012. Node 1016 is the multiplication function and has lines to arguments at leafs 1014 and 1015 (the variable INDEX and the number 2, respectively). Node 1012 is the & (referencing) function and has lines to arguments at leafs 1018 and 1019 (the numbers 2 and 1, respectively). Sub-tree 1011 comprises 1012, 1018, and 1019. The argument INDEX appears as one of the arguments 1014 of the multiplication function (*) 1016. The referencing function & appears at internal point 1012 of the tree and operates on the arguments 1018 and 1019 (the numbers 2 and 1, respectively). This function (& 2 1) means give the value of the sequence 2 positions earlier in the sequence (or gives the default value 1 if the current position of the sequence is only 0 or 1). The second parent is computational procedure 1020, (+(&1 1) (&2 0)), represented by the tree with root 1030. Root 1030 is the addition function and has lines to arguments at internal nodes 1022 and 1032. Node 1022 is the & function and has lines to arguments at leafs 1024 and 1026 (the numbers 1 and 1). Node 1032 is the & function and has lines to arguments at leafs 1034 and 1036 (the numbers 2 and 0, respectively). Tree 1021 comprises 1030, 1022, 1024, and 1026. Internal point 1012 of the tree with root 1010 and internal point 1032 of the tree with root 1030 are chosen as the crossover points.

The first offspring 1040, (+(*INDEX 2) (& 2 0)), is represented by the tree with root 1050. Root 1050 is the addition function and has lines to arguments at internal nodes 1042 and 1052. Node 1042 is the multiplication function and has lines to arguments at leafs 1044 and 1046 (the variable INDEX and the number 2, respectively). Node 1052 is the & function and has lines to arguments at leafs 1048 and 1054 (the numbers 2 and 0, respectively).

The second offspring 1060, (+(&-1 1) (& 2 1)), represented by the tree with root 1070 is composed of tree 1021 of the second parent 1020 combined with the sub-tree 1011. Root 1070 is the addition function and has lines to arguments at internal nodes 1062 and 1072. Node 1062 is the & function and has lines to leafs 1064 and 1066 (the numbers 1 and 1). Node 1072 is the & function and has lines to leafs 1074 and 1076 (the numbers 2 and 1, respectively). This second offspring is the known correct solution to the problem of inducing the formula for the Fibonacci sequence.

It should be noted that the sequences involved here need not be deterministic sequences. Instead, they can be produced by probabilistic processes. For example, the sequence 0, 1, 2, 5, 4, 5, 8, 7, ... might be generated by simply making the value of the sequence equal to INDEX 75% of the time and equal to (+INDEX 2) 25% of the time. For example, when INDEX is 0, 1, 2, 4, 5, and 7, the value of the sequence was 0, 1, 2, 4, 5, and 7, respectively. That is, the value of the sequence was equal to INDEX. But, when INDEX was 3 and 6, the value of the sequence was 5 and 8, respectively. That is, the value of the sequence was equal to INDEX plus 2. In these cases, the perfect matches will not be obtained; however, higher fitness levels will be associated with computational procedures that produce matches more often than others.

Many seemingly different problems in artificial intelligence, symbolic processing, and machine learning can be viewed as requiring discovery of a computer program that produces some desired output for particular inputs. When viewed in this way, the process of solving these seemingly different problems becomes equivalent to searching a space of possible computer programs for a most fit individual computer program. This most fit individual computer program can be found by applying the techniques of the present invention described herein, in which populations of hierarchical entities of various sizes and shapes, such as computer programs, are genetically bred.

This invention is useful for solving at least three groups of problems.

The first group of problems consists of a problem that presents itself under at least seven different names, namely, the problem of symbolic function identification, symbolic regression, empirical discovery, modeling, induction, chaos, and forecasting.

The second group of problems contains several similar, but different, problems. This group contains the problems of symbolic integration, symbolic differentiation, symbolic solution of differential equations, symbolic solution of integral equations, symbolic solution of mathematical equations, and inverses.

The third group of problems contains several other seemingly different but related problems, namely, function learning, planning, automatic programming, game playing, concept formulation, pattern recognition, and neural net design.

All of these problems can be formulated and then solved in the manner described herein.

Depending on the terminology of the particular field of interest, the "computer program" may be called a robotic action plan, a strategy, a decision tree, an econometric model, the state transition equations, the transfer function, mathematical expression, or perhaps merely a composition of functions. Similarly, the "inputs" to the "computer program" may be called sensor values, state variables, independent variables, attributes of an object, or perhaps merely, the arguments to a function. However, regardless of different terminology used, the underlying common problem is discovery of a computer program that produces some desired output value when presented with particular inputs.

First Group—Symbolic Function Identification, Symbolic Regression, Empirical Discovery, Modeling, Induction, Chaos and Forecasting The problem of symbolic function identification appears under several different names, including symbolic regression, empirical discovery, modeling, induction, chaos and forecasting.

Symbolic function identification requires finding a function in symbolic form that fits given data points. In other words, symbolic function identification requires finding a function that produces the values of the dependent variable(s) for given values of the independent variable(s). This problem is also called symbolic regression, empirical discovery, induction, modeling, chaos, or forecasting. The function that describes the system can then be used to construct a model of the process. The model of the process can then be used in forecasting future values of the variables of the system. In particular, forecasting is done by setting the independent variables to values outside the domain of values of the original given data points. Typically, time is the independent variable in forecasting problems.

Regardless of the name, this problem requires finding a function in symbolic form that fits the given values of the dependent variable(s) associated with the particular given values of the independent variable(s).

While conventional linear, quadratic, or higher order polynomial regression requires merely finding the numeric coefficients for a function of a pre-specified functional form, symbolic regression involves finding both the appropriate functional form and the appropriate numeric coefficients

Group 2—Symbolic Integration, Symbolic Differentiation, Symbolic Solution of Differential Equations, Symbolic Solution of Integral Equations, Symbolic Solution of Mathematical Equations, and Inverses Symbolic integration and symbolic differentiation require the finding of a function, in symbolic form, which is the integral or derivative of an unknown curve represented by a sampling of data points.

Symbolic solution to differential equations, integral equations, or mathematical equations requires the finding of a function in symbolic form, which when substituted into the equation, satisfies the equation (in the case of differential equations, also satisfies the initial conditions associated with the equation).

Symbolic solutions to inverse problems require the finding of a function in symbolic form which generates the independent variable from a sample of values of the dependent variable.

Group 3—Function Learning, Planning, Automatic Programming, Game Playing, Concept Formulation, Pattern Recognition, and Neural Net Design Function learning of a function requires developing a composition of functions that can return the correct functional value after seeing only a relatively small number of specific examples of combinations of arguments and their associated functional value. An example of machine learning of a function is the problem of learning the Boolean multiplexer function.

Planning requires generation of a plan that receives information from sensors about the state of various objects in the environment and uses that information to select a sequence of actions to execute to change the state of the objects in the environment.

Automatic programming involves the development of a suitable computer program using genetic techniques. The computer program automatically created will generate desired output for a given set of inputs.

Game playing requires the development of a strategy for playing a game.

Concept formation requires developing a computer program for classifying any object in a universe into a particular class on the basis of the attributes of that object.

Pattern recognition requires finding a computational procedure that processes an input image to determine whether a particular pattern is present in the input image.

Neural net design requires finding a network whose points contain linear threshold elements and whose lines are weighted so that the output of the network performs a certain task (such as classification) using the inputs to the network.

We describe the use of non-linear genetic algorithm by specifying (1) the nature of the structures that undergo adaptation in this process, (2) the search space of structures, (3) the initial structures, (4) the environment, (5) the fitness function which evaluates the structures in their interaction with the environment, (6) the operations that are performed to modify the structures, (7) the procedure for using the information available at each step of the process to select the operations and structures to be modified, (8) the state (memory) of the algorithmic system at each point in time, and (9) the method for terminating the process and identifying its output.

The structures that undergo adaptation in the process are hierarchically structured computer programs whose size and shape can dynamically change during the process. This is in contrast to the one-dimensional linear strings (whether of fixed or variable length) of characters (or other objects) used in conventional genetic algorithms.

Various functional programming languages (e.g. FORTH) might be suitable for accomplishing the work described in this invention. However, the LISP programming language (first developed by John McCarthy in the 1950's) is especially well-suited for handling hierarchies, recursion, logical functions, compositions of functions, self-modifying computer programs, self-executing computer programs, iterations, and complex structures whose size and shape is dynamically determined (rather than predetermined in advance). The LISP programming language is especially appropriate when the structures to be manipulated are hierarchical structures. Moreover, both programs and data have the same form in LISP.

The set of possible S-expressions for a particular domain of interest depends on the functions and atoms that are available in the domain. The possible S-expressions are those that can be composed recursively from the available set of n functions $F=\{f_1, f_2, \ldots, f_n\}$ and the available set of m atoms $A=\{a_1, a_2, \ldots, a_m\}$. Each particular function f in F takes a specified number $z(f)$ of arguments $b_1, b_2, \ldots, b_{z(f)}$.

Note that infix form is used to represent the application of a function to its arguments in the LISP programming language. Thus, for example, (+1 2) evaluates to 3. In Common LISP, any argument can itself be an S-expression so that, for example, (+1 (*2 3)) evaluates to 7. The S-expression k+1 2 (IF (>TIME 10) 3 4)) demonstrates the "function"> being applied to the variable atom TIME and the constant atom 10. The sub-expression (>TIME 10) then evaluates to either T (True) or NIL, and this value becomes the first argument of the "function" IF. The function IF returns either its second argument (the constant atom 3) or the third argument (the constant atom 4) according to whether the first argument is T or NIL, respectively. The entire S-expression thus evaluates to either 6 or 7.

The search space for non-linear genetic algorithms is the hyperspace of valid LISP S-expressions that can be recursively created by compositions of the available functions and available atoms for the problem. This search space can, equivalently, be viewed as the hyperspace of rooted point-labeled trees in the plane having internal points labeled with the available functions and external points (leaves) labeled with the available atoms.

The process of generating the initial random population begins by selecting one of the functions from the set F at random to be the root of the tree. Whenever a point is labeled with a function (that takes k arguments), then k lines are created to radiate out from the point. Then for each line so created, an element is selected at random from the entire combined set C to be the label for the endpoint of that line. If an atom is chosen to be the label for any point, the process is then complete for that portion of the tree. If a function is chosen to be the label for any such point, the process continues. The probability distribution over the atoms and functions in the combined set C and the number of arguments required for each function determines an average size for the trees generated by this process. In this invention, this distribution is typically a uniform random probability distribution over the entire set C (with the exception of the root of the tree where the selection is limited to just the functions in F); however, it is possible to bias the initial population for a particular problem with a non-uniform distribution or with entire seeded individuals that might be useful in solving the particular problem at hand.

Each individual in a population is assigned a fitness value as a result of its interaction with the environment. Fitness is the driving force of Darwinian natural selection and genetic algorithms.

The environment is a set of cases which provide a basis for evaluating particular S-expressions.

The "raw fitness" of any LISP S-expressions is the sum of the distances (taken over all the environmental cases) between the point in the solution space (whether real-valued, complex-valued, vector-valued, symbolic-valued, Boolean-valued, or integer-valued) returned by the S-expression for a given set of arguments and the correct point in the solution space.

If the solution space is integer-valued or real-valued, the sum of distances is the sum of absolute values of the differences between the numbers involved. In particular, the raw-fitness $r(h,t)$ of an individual LISP S-expression h in the population of size M at any generational time step t is:

$$r(h,t) = \sum_{j=1}^{N_e} |V(h,j) - S(j)|$$

where $V(h,j)$ is the value returned by the S-expression h for environmental case j (of $N_e$ environmental cases) and where $S(j)$ is the correct value for environmental case j.

If the solution space is Boolean-valued, the sum of distances is the number of mismatches. If the solution space is symbolic-valued, the sum of distances is, similarly, the number of mismatches. If the solution space is complex-valued, vector-valued, or multiple-valued, the sum of the distances is the sum over the various components. Either the sum of the absolute values of the distances or the Euclidean distance (square root of the sum of the squares of the distances) can be used.

The closer this sum of distances is to zero, the better the S-expression.

Each raw fitness value is then adjusted (scaled) to produce an adjusted fitness measure $a(h,t)$. The "adjusted fitness" value is $$a(h,t) = 1/(1 + r(h,t)),$$

where $r(h,t)$ is the raw fitness for individual h at time t. Unlike raw fitness, the adjusted fitness is larger for better individuals in the population. Moreover, the adjusted fitness lies between 0 and 1.

Each such adjusted fitness value $a(h,t)$ is then normalized. The "normalized fitness" value $n(h,t)$ is $$n(h,t) = a(h,t) / \sum_{j=1}^{M} a(j,t)$$

The normalized fitness not only ranges between 0 and 1 and is larger for better individuals in the population, but the sum of the normalized fitness values is 1. Thus, normalized fitness is a probability value.

The raw fitness, adjusted fitness and normalized fitness can be computed in several alternative ways. The normalized fitness should, however, (i) range between 0 and 1, (ii) be larger for better individuals in the population, and (iii) the sum of the normalized fitness values should be 1.

If the solution space is integer-valued or real-valued, the sum of squares of distances can, alternatively, be used to measure fitness (thereby increasing the influence of more distant points). It is also possible for the fitness function to consider factors in addition to correctness (e.g. efficiency of the S-expression, parsimony of the S-expression, compliance with the initial conditions of a differential equation, successfully reaching a sub-goal, etc.) It is also possible to compute the fitness function using a sampling of the possible environmental cases (including possibly a sampling that varies from generation to generation to minimize the possible bias resulting from such sampling within any one generation).

The two primary operations for modifying the structures undergoing adaptation are Darwinian fitness proportionate reproduction and crossover (recombination). In addition to the two primary genetic operations of fitness proportionate reproduction and crossover, there are other secondary operations for modifying the structures undergoing adaptation. They are mutation, permutation editing, and the "define building block" operation.

The operation of fitness proportionate reproduction for non-linear genetic algorithms is the basic engine of Darwinian reproduction and survival of the fittest. It is an asexual operation in that it operates on only one parental S-expression. The result of this operation is one offspring S-expression. In this operation, if $s_i(t)$ is an individual in the population at generation t with fitness value $f(s_i(t))$, it will be copied into the next generation with probability:

$$f(s_i(t)) / \sum_{j=1}^{M} f(s_j(t)).$$

The crossover (recombination) operation for non-linear genetic algorithms is a sexual operation that starts with two parental S-expressions. At least one of the parents is chosen from the population with a probability equal to its respective normalized fitness. The result of the crossover operation is two offspring S-expressions.

Every LISP S-expression can be depicted graphically as a rooted point-labeled tree in a plane whose internal points are labeled with functions, whose external points (leaves) are labeled with atoms, and whose root is labeled with the function appearing just inside the outermost left parenthesis. The operation begins by randomly and independently selecting one point in each parent using a specified probability distribution (discussed below). Note that the number of points in the two parents typically are not equal. As will be seen, the crossover operation is well-defined for any two S-expressions. That is, for any two S-expressions and any two crossover points, the resulting offspring are always valid LISP S-expressions. Offspring contain some traits from each parent.

The "crossover fragment" is produced by deleting the crossover fragment of the first parent from the first parent, and then impregnating the crossover fragment of the second parent at the crossover point of the first parent. In producing this first offspring the first parent acts as the base parent (the female parent) and the second parent acts as the impregnating parent (the male parent). The second offspring is produced in a symmetric manner.

Note also that because entire sub-trees are swapped, this genetic crossover (recombination) operation produces valid LISP S-expressions as offspring, regardless of which point is selected in either parent.

Note that as the root of one tree happens to be selected as the crossover point, the crossover operation will insert that entire parent into the second tree at the crossover point of the second parent. In addition, the sub-tree from the second parent will, in this case, then become the second offspring. If the root of both parents happens to be chosen as crossover points, the crossover operation simply degenerates to an instance of fitness proportionate reproduction.

Note that as an individual mates with itself, the two resulting offspring will generally be different (if the crossover points selected are different).

Note that as an atom is located at the crossover point selected in both parents, the crossover operation merely swaps these atoms from tree to tree. Similarly, if an atom is located at the crossover point in precisely one parent, then the sub-tree from the second parent is inserted at the location of the atom in the first parent, and the atom from the first parent is inserted at the location of the sub-tree of the second parent. In this case, the crossover operation often has the effect of increasing the depth of one tree and decreasing the depth of the second tree. A non-uniform probability distribution allocating about 90% of the crossover points equally amongst the internal (function) points of each tree and 10% of the crossover points equally amongst the external (atom) points of each tree is advantageous. This non-uniform probability distribution promotes the recombining of larger structures than would be the case with a uniform distribution (which may do an inordinate amount of mere swapping of atoms from tree to tree in a manner more akin to point mutation rather than true crossover).

The basic principle of crossover is that part of one parent, and part of another part, are recombined to produce the offspring. Thus, other variations on the basic crossover operation may be advantageous.

The mutation operation provides a means for introducing small random mutations into the population.

The mutation operation is an asexual operation in that it operates on only one parental S-expression. The individual is selected in a manner proportional to normalized fitness. The result of this operation is one offspring S-expression. The mutation operation selects a point of the LISP S-expression at random. The point of insertion can be an internal (function) or external (atom) point of the tree. This operation removes whatever is currently at the selected point and inserts a randomly generated sub-tree at the randomly selected point of a given tree. This operation is controlled by a parameter which specifies the maximum depth for the newly created and inserted sub-tree. A special case of this operation involves inserting only a single atom (i.e. a sub-tree of depth 0) at a randomly selected point of the tree.

The mutation operation potentially can be beneficial in reintroducing diversity in a population that may be tending to prematurely converge.

The permutation operation is an asexual operation in that it operates on only one parental S-expression. The individual is selected in a manner proportional to normalized fitness. The result of this operation is one offspring S-expression. The permutation operation selects a function (internal) point of the LISP S-expression, a random permutation is selected at random from the set of k! possible permutations. Then the arguments of the function at the selected point are permuted in accordance with the random permutation. The operation described here allows any one of k! possible permutations to occur. Note that a simple reversal of the order is but one the k!possible permutations.

The permutation operation can potentially bring closer together elements of a relatively high fitness individual so that they are less subject to later disruption due to crossover.

The editing operation provides a means to edit S-expressions as the algorithm is running. The editing operation is applied after the new population is created through the action of the other operations. It is controlled by a frequency parameter which specifies whether it is applied on every generation or merely a certain subset of the generation. The editing operation is an asexual operation in that it operates on only one parental S-expression. The result of this operation is one offspring S-expression. The editing operation, if it is used at all, is typically applied to every individual S-expression in the population.

The editing operation recursively applies a pre-established set of editing rules to each S-expression in the population. First, in all problem domains, if any sub-expression has only constant atoms as arguments, the editing operation will evaluate that sub-expression and replace it with the value obtained. In addition, the editing operation applies particular sets of rules that apply to various problem domains, including rules for numeric domains, rules for Boolean domains, etc. In numeric problem domains, for example, the set of editing rules would typically include a rule that inserts zero whenever a sub-expression is subtracted from an identical sub-expression and a rule that inserts a zero whenever a sub-expression is multiplied by zero. In Boolean problem domains, the set of editing rules typically would include a rule that inserts X in place of (AND X X), (OR X X), or (NOT (NOT X)).

The editing operation primarily serves to simplify S-expressions. It also typically improves performance by reducing the vulnerability of an S-expression to disruption due to crossover at points within a potentially collapsible, non-parsimonious sub-expression. Crossover at such points typically leads to counter-productive results. For example, if an example an S-expression contains a sub-expression such as (NOT (NOT X)), which is susceptible to editing down to a more parsimonious sub-expression, a crossover in the middle of this sub-expression would produce exactly the opposite Boolean result. The editing operation prevents that kind of crossover from occurring by condensing the sub-expression.

The "define building block" operation is a means for automatically identifying potentially useful "building blocks" while the algorithm is running. The "define building block" operation is an asexual operation in that it operates on only one parental S-expression. The individual is selected in a manner proportional to normalized fitness. The operation selects a function (internal) point of the LISP S-expression at random. The result of this operation is one offspring S-expression and one new definition. The "define building block" operation works by defining a new function and by replacing the sub-tree located at the chosen point by a call to the newly defined function. The body of the newly defined function is the sub-tree located at the chosen point. The newly defined functions are named DF0, DF1, DF2, DF3, ... as they are created.

Figure 19:
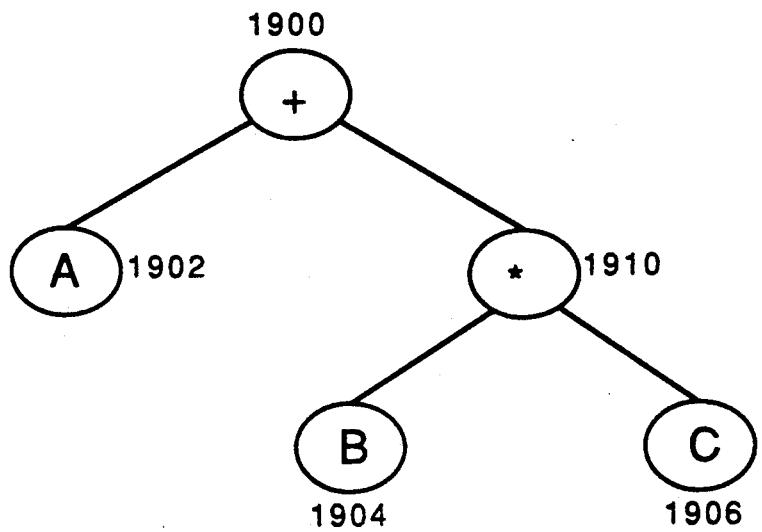
FIG. 19 illustrates a simple entity, namely the symbolic expression in the LISP programming language for the mathematical expression $A+BC$.

For the first occasion when a new function is defined on a given run, "(DF0)" is inserted at the point selected in the LISP S-expression. The newly defined function is then complied. The function set of the problem is then augmented to include the new function so that, if mutation is being used, the arbitrary new sub-tree grown at the selected point might include a call to the newly defined function. FIG. 19 shows a simple entity, namely the symbolic expression in the LISP programming language for the mathematical expression A+BC. In LISP, this mathematical expression would be written as (+A (*B C)). The figure shows the graphical representation of this LISP symbolic expression, namely the tree with root 1900.

Figure 20:
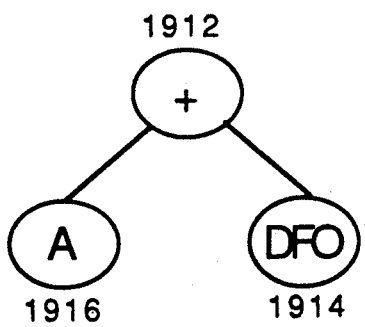
FIG. 20 illustrates the simple entity in FIG. 19 after application of the "Define Building Block" operation.

The "define building blocks" operation works by first selecting a point using a probability distribution. Suppose that the point 1910 is selection. The sub-tree (sub-expression,-sub-list) starting at point 1910 is then replaced by a call to the function DF0. The function in FIG. 19 has no explicit arguments. Thus, the tree with root 1900 is replaced by the tree with root 1912, as shown in FIG. 20. The new tree has the function (DF0) at point 1914, in lieu of the sub-tree 1910. In LISP, the new S-expression is (+A (DF0)).

Figure 21:
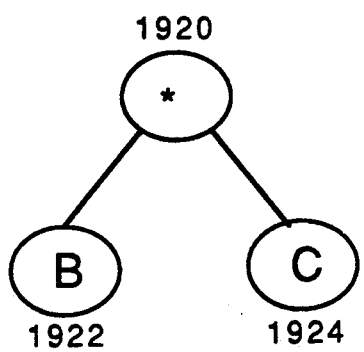
FIG. 21 illustrates the portion of the simple entity in FIG. 19 being represented by the "Define Building Block" function.

At the same time, a function DF0 is created. Its definition is shown in FIG. 21. Its definition consists of the operations shown in the tree with root 1920. In LISP, the function might be written as

```
(DEFUN DF0 ( )
  (* B C)
```

)

In implementing this operation on a computer, the sub-tree calling for the multiplication of B and C is first defined and then complied during the execution of the overall run. The LISP programming language facilitates the compilation of functions during the execution of an overall run.

The effect of this replacement is that the selected sub-tree is no longer subject to the potentially disruptive effects of crossover because it is now an individual single point. The newly defined function is now indivisible. The newly defined function is a potential "building block" for future generations and may proliferate in the population based on fitness. The "define building block" operation appears to improve performance of the overall algorithm significantly.

Note that, for each operation described above, the original parent S-expression is unchanged by the operation. Moreover, since the selection of the parental S-expression is in proportion to fitness, the original unaltered parental S-expression may participate in additional genetic operations during the current generation, including replication (fitness proportionate reproduction), crossover (recombination), mutation, permutation, editing, or the "define building block" operation.

The state of the non-linear genetic algorithm system at any stage in the process (as with genetic algorithms in general) consists only of the current population of individuals in the population. There is no additional memory, centralized bookkeeping, or administration to guide the adaptive process.

The algorithm is controlled by various parameters, including three major parameters, namely the population size, the number of individuals in the population undergoing fitness proportionate reproduction, and the number of individuals in the population undergoing crossover.

A population size of 300 is appropriate for all of the examples described herein. In general, population size is the parameter that must be adjusted to accommodate the complexity of the problem at hand. A larger population is, in the absence of any other consideration, better at producing a solution to the problem at hand than a smaller population. However, as the population size is increased, there may be decreasing benefits in relation to the increased amount of resources needed. Crossover was performed on 90% of the population. That is, if the population size is 300, then 135 pairs of individuals (270 individuals) from each generation were selected (with reselection allowed) from the population with a probability equal to their normalized adjusted fitness. Fitness proportionate reproduction was performed on 10% of the population on each generation. That is, 30 individuals from each generation were selected (with reselection allowed) from the population with a probability equal to their normalized adjusted fitness. Note that the parents remain in the population and can often repeatedly participate in other operations during the current generation. That is, the selection of parents is done with replacement (i.e. reselection) allowed. Mutation and permutation are used very sparingly. Their use at a rate of 1 per generation would be appropriate for many problems. Our experience is that it is advantageous to use editing on all problems. The "define building blocks"

operation can be advantageously used on 10 occasions in each generation.

Several minor parameters are used to control the computer implementation of the algorithm. In all of the examples described herein, a maximum depth of 15 was established for S-expressions. This limit prevented large amounts of computer time being expended on a few extremely large (and usually highly unfit) individual S-expressions. Of course, if we could execute all the individual LISP S-expressions in parallel (as nature does) in a manner such that the infeasibility of one individual in the population does not proportionately jeopardize the resources needed by the population as a whole, we would not need this kind of limit. Thus, if a crossover between two parents would create an individual whose depth exceeded this limit, the crossover operation is simply aborted. In effect, the contemplated crossover operation is replaced with fitness proportionate reproduction for the two parents. Similarly, a maximum depth of 4 was established for the random individuals generated for generation 0. These numbers must of course be adjusted upwards as the complexity of the problem increases. Note that these limits are not necessary. They are merely a convenient and effective way to limit the use of resources (which is especially important with serial machinery).

The solution produced by this process at any given time can be viewed as the entire population of disjunctive alternatives (presumably with improved overall average fitness), or more commonly, as the single best individual in the population at that time ("winner takes all"). The process can be terminated when either a specified total number of generations have been run or when some performance criterion is satisfied. For example, if a solution can be recognized if it is discovered, the algorithm can be terminated at that time and the single best individual can be considered as the output of the algorithm.

We now summarize below the six major steps necessary for using the non-linear genetic algorithm.

The first major step is to identify the appropriate set of variable atoms and constant atoms for the problem. For some problems, this identification may be simple and straightforward. For example, in the symbolic regression problem with one independent variable, the single necessary variable atom in the problem corresponds to the single independent variable of the problem. The difficulty in identifying an appropriate set of variable atoms for a particular problem, if any, usually arises from the inherent difficulty (common to all science) of correctly identifying variables which have explanatory power for the problem at hand. For example, one would not be able to discover Kepler's Third Law if one were given only the color of the surface of the planets.

Constant atoms, if required at all, can enter a problem in two ways: One way is to use the constant creation procedure described herein. The second way for constant atoms to enter a problem is by explicity including them. For example, one might include $\pi$ in a particular problem where there is a possibility that this particular constant might be useful. Of course, if one failed to include $\pi$ in such a problem, the non-linear genetic algorithm would probably succeed in creating it (albeit at a certain cost in computational resources).

The second major step is to identify the appropriate set of functions for the problem. For real-valued domains, the obvious function set might be $\{+, -, *, \%\}$.

In a Boolean function learning domain, for example, a set of functions such as {AND, OR, NOT, IF} might be the choice. This set is certainly sufficient for any Boolean function learning problem since it is computationally complete. Moreover, this set is convenient in that it tends to produce easily understood logical expressions. Of course, the function set might consist of NAND alone, and in some domains (e.g. design of semiconductor logic networks), this might be a natural choice.

If the problem involves economics (where growth rates and averages often play a role), the function set might also include the exponential, logarithmic, and moving average functions in addition to the four basic arithmetic operations. Similarly, the SIN and COS functions might be useful additions to the function set for some problems.

Some functions may be added to the function set merely because they might possibly facilitate a solution (even though the same result could be obtained without them). For example, one might include a squaring function in certain problems even though the same result could be attained without this function (albeit at a certain cost in computational resources).

Sometimes, the consequences of failing to include a potentially useful function is that one gets a rough approximation to the missing function. For example, if the SIN, COS or EXP function were missing from a function set, one might get the first one or two terms of the Taylor power series expansion of those functions in a solution in lieu of the missing function.

In any case, the set of functions must be chosen so that any composition of the available functions is valid for any value that any available variable atom might assume. Thus, if division is to be used, the division function should be modified so that division by zero is well-defined. The result of a division by zero could be defined to be zero, a very large constant, or a new value such as ":infinity". Note that, in Common LISP, one could define the result of a division by zero as the keyword value ":infinity". Then each of the other functions in the function set must be well-defined if this ":infinity" value happens to be one of its arguments. Similarly, if square root is one of the available functions, it could either by an especially defined real-valued version that takes the square root of the absolute value of the argument or it could be LISP's complex-valued square root function. If logical functions are to be mixed with numerical functions, then a real-valued logic should be used. For example, the greater-than function GT can be defined so as to assume the real value 1.0 if the comparison relation was satisfied and the real value 0.0 otherwise.

Note that the number of arguments must be specified for each function. In some cases, this specification is obvious or even mandatory (e.g. the Boolean NOT function, the square root function). However, in some cases (e.g. IF, multiplication), there is some latitude as to the number of arguments. One might, for example, include a particular function in the function set with differing numbers of arguments. The IF function with two arguments, for example, is the IF-THEN function, whereas the IF function with three arguments is the IF-THEN-ELSE function. The multiplication function with three arguments might facilitate the emergence of certain cross product terms, although the same result could be achieved with repeated multiplication function with two arguments. It is often useful to include the PROGN ("program") function of common LISP with varying number of arguments in a function set to act as a connective between the unknown number of steps that may be needed to solve the problem.

The choice of the set of available functions, of course, directly affects the character of the solutions that can be attained. The set of available functions form a basis set for generating potential solutions. For example, if one were trying to do symbolic regression on the simple absolute value function on the interval $[-1, +1]$ and the function set contained the IF-THEN-ELSE function and a negation function, one might obtain a solution in the familiar form of a conditional test on x that returns either x or $-$x. On the other hand, if the function set contained COS, COS3 (i.e. cosine of 3 times the argument), COS5 (i.e. cosine of 5 times the argument) instead of the IF-THEN-ELSE function, one might obtain a solution in the form of a Fourier series approximation to the absolute value function. Similarly, if the $\Sigma$ summation operator were not available in a real-valued problem for which the solution was an exponential, one would probably see the first couple of polynomial terms of the Taylor series in the solution instead of $e^x$.

The third major step is the construction of the environment for the problem. In some problems, the nature of the environment is obvious and straight-forward. For example, in the symbolic function identification (symbolic regression), empirical discovery, and Boolean function learning problems, the environment is simply the value(s) of the independent variable(s) associated with a certain sampling (or, perhaps, the entire set) of possible values of the dependent variable(s). In some problems (e.g. block-stacking), the environment is a set of "starting condition" cases. In some problems where the environment is large and not susceptible to simple random sampling (e.g. block-stacking), a representative sampling must be constructed. In some problems, such as solving pairs of linear equations and solving the quadratic equation, the environment is a set of equations and their respective solution points.

The fourth major step is construction of the fitness function. For most problems, the fitness function is constructed in a simple, natural, and straightforward way as the sum of the distances (taken over all the environmental cases) between the point in the solution space returned by the S-expression for a given set of arguments and the correct point in the solution space. In general, the only issue is the minor issue of whether to use the absolute value of the difference or the square of the difference in computing the distance. However, as we illustrate in the second version of the block-stacking problem below (where both efficiency and correctness were sought) and in the solution of differential equations (where both the shape of the solution curve and the satisfaction of initial conditions are required), the fitness function can sometimes be somewhat more complicated (and correspondingly, more powerful).

The fifth major step is the selection of the major and minor parameters of the algorithm and a decision on whether to use any of the secondary genetic operations (described below). Often, the selection of the population size is the most important choice. In general, the larger the population the better. But, the improvement due to a larger population may not be proportional to the increased computational resources required.

Finally, the sixth major step is the selection of a termination criterion and solution identification procedure. The approach to termination depends on the problem. In many cases, the termination criterion may be implicity selected by merely selecting a fixed number of generations for running the algorithm. For many problems, one can recognize a solution to the problem when one sees it. Examples are problems where the sum of differences becomes zero (or, acceptably close to zero, if the problem is in a real-valued domain). However, for some problems (such as problems where no exact mathematical solution is known), one cannot necessarily recognize a solution when one sees it (although one can recognize that the current result is better than any previous result or that the current solution is in the neighborhood of some estimate to the solution). The solution identification procedure is often simply a matter of identifying the best single individual of some generation where the termination criterion is satisfied as the solution to the problem ("winner takes all").

Note the process desired herein may be used to obtain useful approximations, in functional form, of the solution to difficult or intractable problems. The result may only be a good fit or good approximation to the solution of the problem.

There are numerous opportunities to use domain specific heuristic knowledge in connection with nonliner genetic algorithms. First, it may be useful to include domain specific heuristic knowledge in creating the initial random population. This might include inserting sub-programs believed to be useful for solving the problem at hand. This might also include using a probability distribution other than the uniform distribution to initially select the functions and atoms when the initial random individuals are recursively generated. Secondly, domain specific heuristic knowledge may be helpful in over-selecting or under-selecting of certain points in the computer programs for the crossover operation. This may even include protecting certain points from selection for crossover under certain circumstances or requiring certain points to be selected for crossover under certain circumstances. Thirdly, domain specific heuristic knowledge may be useful in varying the parameters of the run based on information gained during the run. Fourth, domain specific heuristic knowledge can be used in the selection of the set of available functions and atoms for the problem so that this set is not merely minimally sufficient to solve the problem, but so that the set of available functions and atoms actively facilitates solution of the problem.

Because the process described herein involves executing and modifying computer programs in non-standard ways and because these computer programs were either originally generated at random or created genetically, a number of practical computer implementation issues come to the forefront.

First, it should be noted that if the experimenter chooses to use the Common LISP function EVAL to implement the measurement of fitness of individual LISP S-expressions, the evaluation will work correctly only if all of the variable atoms appearing in the given S-expressions are declared to be global variables.

Secondly, the most efficient implementation of the crossover operation in LISP known to the author uses the COPY-TREE and RPLACA functions in LISP. First, the COPY-TREE function is used to make a copy of each parent. Then, the RPLACA function is used to destructively change the pointer of the CONS cell of the copy of one parent at its crossover point so that it points to the crossover fragment (subtree) of the copy of the other parent. Then, the RPLACA function is used to destructively change the pointer of the CONS cell of the copy of second parent at its crossover point so that it points to the crossover fragment (subtree) of the copy of the first parent. After destructively changing the pointers in the copies, the resulting altered copies become the offspring. The original parents remain in the population and can often repeatedly participate in other operations during the current generation. That is, the selection of parents is done with replacement (i.e. reselection) allowed.

Third, because the process described herein involves executing randomly generated computer programs, the individuals in the initial random population as well as the individuals produced in later generations of the process often have sub-expressions which evaluate to astronomically large numbers or very small numbers. When the range is integral, the BIGNUM mode is automatically used in the Common LISP programming language. In this mode, integer numbers can grow arbitrarily large (limited only by the virtual address space of the machine). Thus, the potential growth in size of the integers produced by the randomly generated S-expressions presents no problem, as a practical matter. On the other hand, when the range is real-valued, floating point overflows or underflows will frequently occur. In problems involving such floating point variables, it is therefore a practical necessity to wrap the entire algorithm in error handlers that accommodate every possible kind of floating point underflow and overflow applicable to the particular computer involved.

Fourth, it is important to note that this non-linear genetic algorithm is probabilistic in the following four different ways: (a) the initial population is typically generated entirely at random from the available functions and atoms; (b) both parental individuals participating in the crossover operation are chosen at random (typically, at least one individual is chosen randomly proportionate to fitness and the other is chosen either randomly proportionate to fitness or simply at random using a uniform probability distribution); (c) the crossover points within each parent are selected at random (using a probability distribution); and (d) the individuals undergoing the operation of fitness proportionate reproduction are chosen randomly in proportion to normalized fitness. Thus, in implementing genetic algorithms on a computer, it is important to have an effective randomizer that is capable of producing the numerous random integers needed by the algorithm. Many randomizers originally written for the purpose of generating random floating point numbers are not suitable for this purpose. A randomizer with 3 independent seeds was used here. It is also convenient, for experimental purposes, to have the option of seeding the randomizer so that interesting runs can potentially be replicated (e.g. perhaps with additional details displayed, such as an audit trail).

Fifth, in problems involving iteration with a DU ("Do-Until") operator, a DUL operator, or a SIGMA summation operator, it is necessary to suppress premature evaluation of the WORK and PREDICATE arguments (if any) of the operator. Neither the WORK argument nor the PREDICATE argument (if any) of such operators are to be evaluated outside the operator. Instead, these argument(s) must be evaluated dynamically inside the operator on each iteration. Because of the evaluation model of Common LISP, such operators cannot be implemented directly as functions in Common LISP. The reason is that the argument(s) would be evaluated prior to entry into the function and the operator would, for example, then merely repeatedly evaluate the value of the WORK as opposed to doing the WORK itself.

Thus, these iterative operators must be implemented as a Common LISP macro with a related function and should expand into, for example, '(DU-1', WORK', PREDICATE). (Note the three quotation marks are back quotes). Then the body of the related function DU-1 is implemented so as to have the desired iterative behavior (i.e. (LOOP DO (EVAL WORK) UNTIL (EVAL PREDICATE))). This is possible because the arguments to the sub-expressions WORK and PREDICATE are bound in the global environment. We could, in principle, have addressed this porblem by introducing a quoting operator into the set of functions so as to allow DU to have the semantics of DU-1. But this approach results in incorrect performance whenever the QUOTE function happens to occur at a crossover point and becomes separated from its intended argument. Moreover, some implementations of Common LISP (the Texas Instruments Explorer machines being among this group) use a technique called "macro displacement" to side-effect programs being interpreted with the macro-expanded version. This has the beneficial effect of speeding up execution by incurring the cost of the macro-expansion only once. However, because this technique side-effects the program itself, if macro displacement is not disabled for genetic operators, then crossover that occurs on individuals after macro-expansion may see forms that are introduced by the macro-expander, not forms that are really part of the problem. On Texas Instruments machines, this behavior can be disabled by setting "si:inhibit-displacing-flag" to T.

Sixth, when iterative operators (such as DU, DUL, and SIGMA) are used, individual S-expressions in the population will often contain an unsatisfiable termination predicates. Thus, it is a practical necessity (when working on a serial computer) to place limits on both the number of iterations allowed by any one execution of a such an operator. Moreover, since the individuals S-expressions in the genetic population often contain deep nestings of such operators, a similar limit must be placed on the total number of iterations allowed for all such operators that may be evaluated in the process of evaluating any one individual S-expression for any particular environmental case. Thus, the termination predicate of each operator is actually an implicit disjunction of the explicit predicate for that operator and two additional implicit termination predicates. The typical "time out" limits that we have used for the problems herein are that the DU operator "times out" if there have been more than 25 iterations for an evaluation of a single DU operator, or if there have been a total of more than 100 iterations for all DU operators that are evaluated for a particular individual S-expression for a particular environmental case. Of course, if we could execute all the individual LISP S-expressions in parallel (as nature does) so that the infeasibility of one individual in the population does not bring the entire process to a halt, we would not need these limits. Note, however, that even when a DU operator times out, it nevertheless returns a value. In particular, the DU operator evaluates to T unless one of the two implicit termination predicates times out. The value resulting from this evaluation of the DU operator is, of course, in addition to the side effects of the DU function on the state variables of the system (particularly the STACK and TABLE in the block-stacking problem) If the predicate of a DU operator is satisfied when the operator is first called, then the DU operator does no work at all and simply returns a T. The DUL operator and the SIGMA operator are treated similarly.

Seventh, for all but the simplest problems, the overwhelming majority of computer time is consumed by the evaluation of fitness of the individuals (rather than, as one might suppose, the actual genetic operations or other administrative aspects of the program). For some problems, fine-grained parallel computers, and "data parallelism" techniques may be advantageous. When the fitness calculation consumes the overwhelming majority of computer-time, then fine-grained parallel computers (as compared to coarse-grained parallel computers) and the techniques of "data parallelism" confer no particular advantage. The problem may simply be paralleled by handling the environmental cases in parallel. Similarly, if this concentration exists, ones efforts at optimization must necessarily be focused almost entirely on the relatively small number of lines of code that are used to compute fitness (over the various environmental cases of the particular problem). One highly effective way to optimize the fitness calculation is to create a look-up table of S-expressions that have been previously encountered so that their fitness need not be recomputed. This hash table can span both generations and runs (provided the environmental cases remain the same). Not that the technique of look-up tables may be, however, inconsistent with the technique of changing the environmental cases on every generation so as to minimize the possible bias of a small sampling of environment cases.

Eight, many problems involve time-consuming transcendental functions (e.g. EXP, SIN, COS) that are computed via Taylor power series. In such problems, both the initial randomly-generated individuals and the later genetically-created individuals in the population often contain multiple occurrences of these functions within a single individual. A considerable amount of computer time can be saved by evaluating these functions via table look-up, rather than direct computation.

Ninth, an informative and interactive interface is an invaluable tool in carrying out computer experiments in the field of machine learning. Accordingly, the computer program used here has extensive interactivity, including three full-color graphs, a "hits histogram", a "fitness histogram" (in deciles of numerical fitness values), a window showing the best single S-expression of the current generation in both graphical and symbolic form, three scrolling windows, and three non-scrolling windows (with various mouse-sensitive points for inspecting progress of the program while it is executing). The three color graphs provide a variety of information about the run in progress.

A first graph dynamically tracks the average normalized fitness of the population. This graph also tracks the number of "hits" for the best single individual of each generation for problems where exact matches are possible (or the number of "near hits" for real-valued numerical problems). This number of "hits" or "near hits" is not used by the genetic algorithm in any way. The algorithm uses only the fitness values computed from the sum of the distances described above. Nonetheless, the number of "hits" or "near hits" has proved to be extremely valuable for monitoring the overall progress of the algorithm.

A second graph dynamically tracks the average raw fitness of the population for each generation, the raw fitness of the best individual in the population, and the raw fitness of the worst individual in the population for each generation. This graph also displays the average raw fitness of the initial random population as a baseline.

A third graph is used only in a subset of the problems described in this paper, namely, the problems of sequence induction, symbolic function identification, symbolic regression, symbolic integration, symbolic differentiation, symbolic solution to differential and/or intergral equations, chaos, empirical discovery, and power series problems. This graph dynmaically graphs the "target" functions and the best individual S-expression from the current generation. The best S-expression changes with each generation. The horizontal axis of this graph is the domain of the problem area and the vertical axis is the range of the target function. In the special case of the symbolic integration and symbolic differentiation problems, the graph of the integral or derivative of the current best S-expression is added to this third graph as an additional item.

A "hits histogram" showing the number of individuals in the population with a particular number of "hits" (or "near hits", for numerical problems) provides a particulary informative and dramatic view of the learning process. At the initial random generation, the bulk of the population appears at the far left of the histogram (with perhaps 0 or 1 hits). Then, after a few generations, the bulk of the population typically start shifting gradually from left to right in the histogram. As learning takes place, this undulating "slinky" movement from left to right continues during the run. Finally, in the late stages of a run, individuals representing a perfect solution to the problem may start appearing at the far right of the histogram. Complete convergence occurs when 100% of the populations becomes concentrated at the far right of the histogram (although one usually does not run the algorithm to that point). Premature convergence can often be readily identified from the histogram as a concentration of the population at one single-sub-optimal number of hits. In contrast, normal progress towards a solution and towards convergence is typically indicated by a broad "flowing" distribution of individuals over many different numbers of hits in the histogram.

In addition, a "fitness histogram" showing the number of individuals in the population having a fitness lying on a particular numerical range of fitness values provides another informative view of the learning process. This histogram uses the actual fitness values representing the sum of the distances described above and is presented in deciles over the range of such fitness values. Note that this "fitness histogram" is based on the sum of distances, while the "hits histogram" is a cont of the integral number of "hits" (or "near hits").

Tenth, appropriate computing machinery should be used in implementing this process. A computer program implementing this process, consisting of 11562 lines of Common Lisp code, was run on a Texas Instruments Explorer II+$^{TM}$ computer with a 40 megahertz LISP microprocessor chip with 32 megabytes of internal memory and a half gigabyte of external hard disk memory. It is advantageous to use a computer especially designed to execute LISP instructions and to use a computer with a large amount of internal memory and additional external memory.

Symbolic Function Identification and Regression

Problems in the area of symbolic function identification require finding a function in symbolic form that fits given data points.

In linear regression, one is given a set of values of various independent variable(s) and the corresponding values for the dependent variable(s). The goal is to discover a set of numerical coefficients for a linear combination of the independent variable(s) which minimizes some measure or error (such as the sum of the squares) between the given values and computed values of the dependent variable(s). Similarly, in quadratic regression, the goal is to discover a set of numerical coefficients for a quadratic expression which similarly minimizes the error. In Fourier "regression", the goal is to discover a set of numerical coefficients for sine and cosine functions of various periodicities which similarly minimizes error.

Of course, it is left to the researcher to decide whether to do a linear regression, quadratic regression, or a higher order polynominal family of functions (e.g. sines and cosines of various periodicities, etc.). But, often the most difficult and most important issue is deciding what family of functions most appropriately fits the data, not merely computing the numerical coefficients given the appropriate functional form of the model.

For example, suppose we are given a sampling of the numerical values from an unknown curve over 20 points in the domain $-2$ to $+2$. That is, we are given 20 pairs $(x_i, y_i)$. These points might include pairs such as $(+1.0, +5.86), (+2.0, +17.16), (-1.0, -0.42), (-2.0, +4.59)$, etc. The goal is to find the function, in symbolic form, from the 20 pairs of numerical data points. (The unknown curve happens to be $2.71828x^2 + 3.14159x$ for this example).

Figure 12:
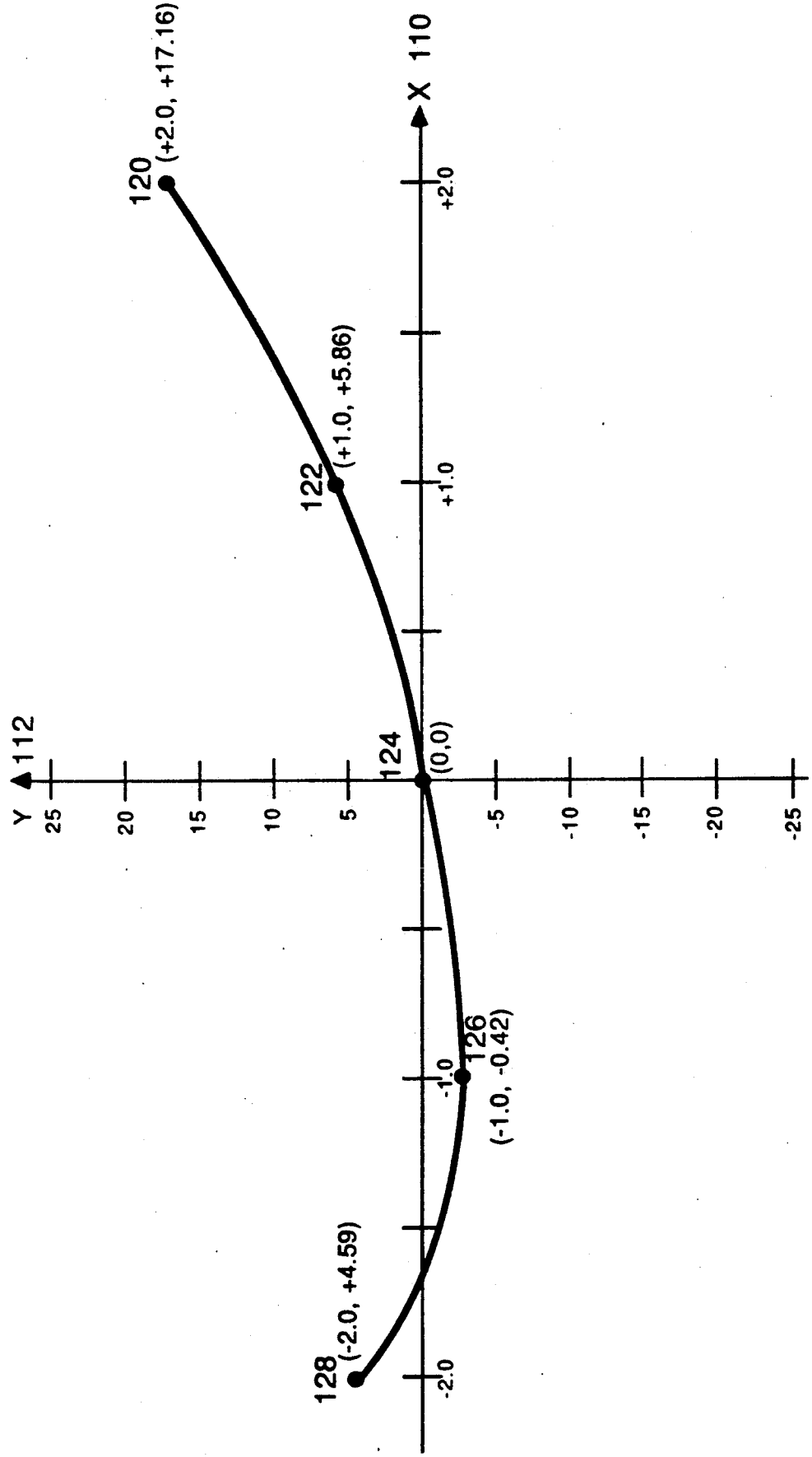
FIGS. 12, 13, and 14 are graphs of points for an unknown curve used to illustrate symbolic function identification and regression.

FIG. 12 is a graph of the pairs of points for the unknown curve. The curve is graphed in a conventional way in a plane defined by the horizontal axis (X-axis) 110 and the vertical axis 112. In FIG. 12, only 5 points of the curve are shown. The points on the curve are drawn with a solid line. Starting at far right, the point 120 is the point on the curve $(+2.0, +17.16)$. That is, when x is $+2$, the value of the curve is $+17.16$. The point 122 is the point $(+1.0, +5.86)$ on the curve. The point 124 is the point $(0, 0)$ on the curve. The point 126 is the point $(-1.0, -0.42)$ on the curve. The point 128 is the point $(-2.0, +4.59)$ on the curve.

Figure 13:
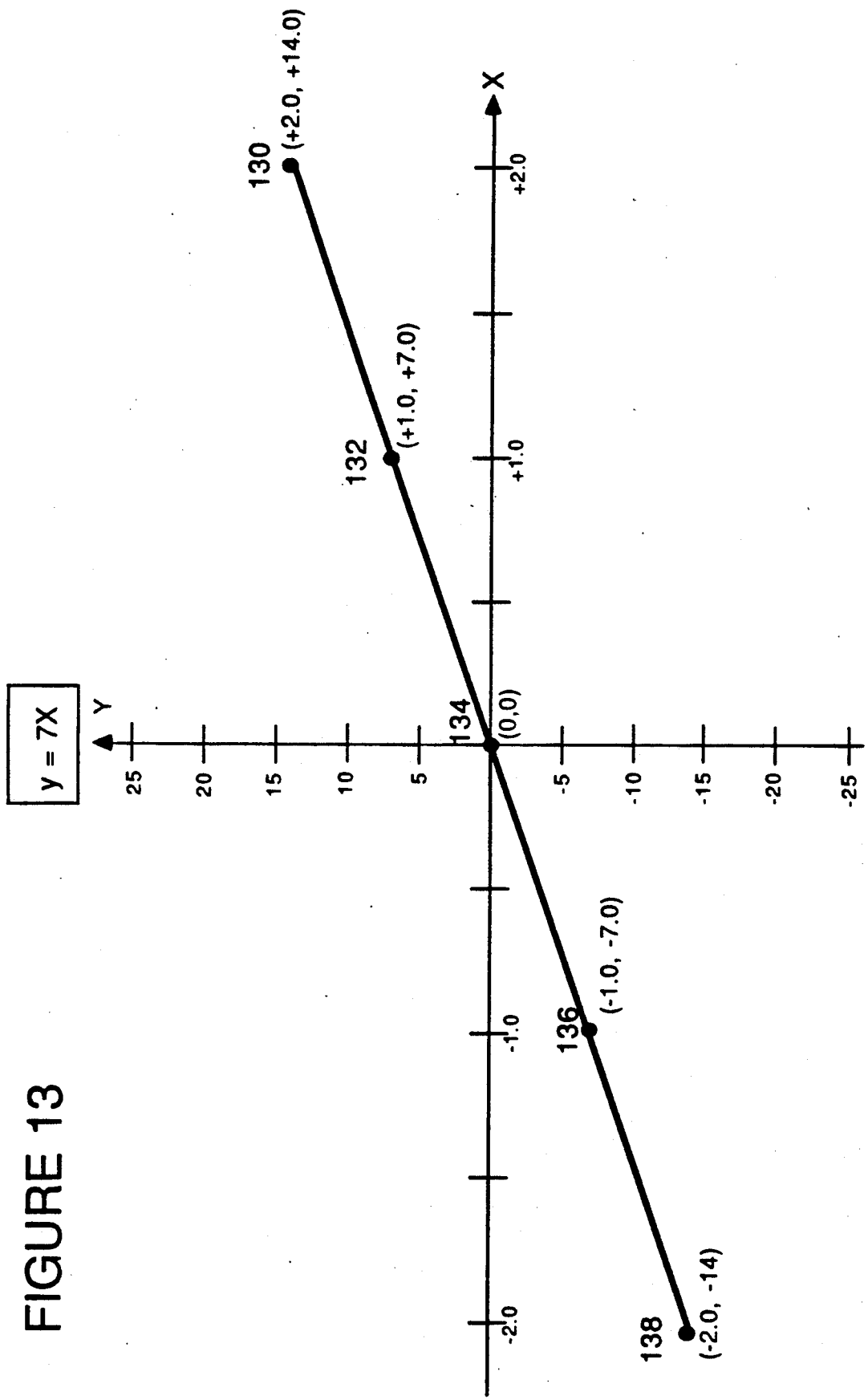

FIG. 13 is a graph of another curve, namely $y=7x$. Point 130 is the point $(2, 14)$ on the curve. Point 132 is the point $(1,7)$. Point 134 is the point $(0, 0)$ on the curve. Point 136 is the point $(-1, -7)$ on the curve. Point 138 is the point $(-2, -14)$ on the curve.

Figure 14:
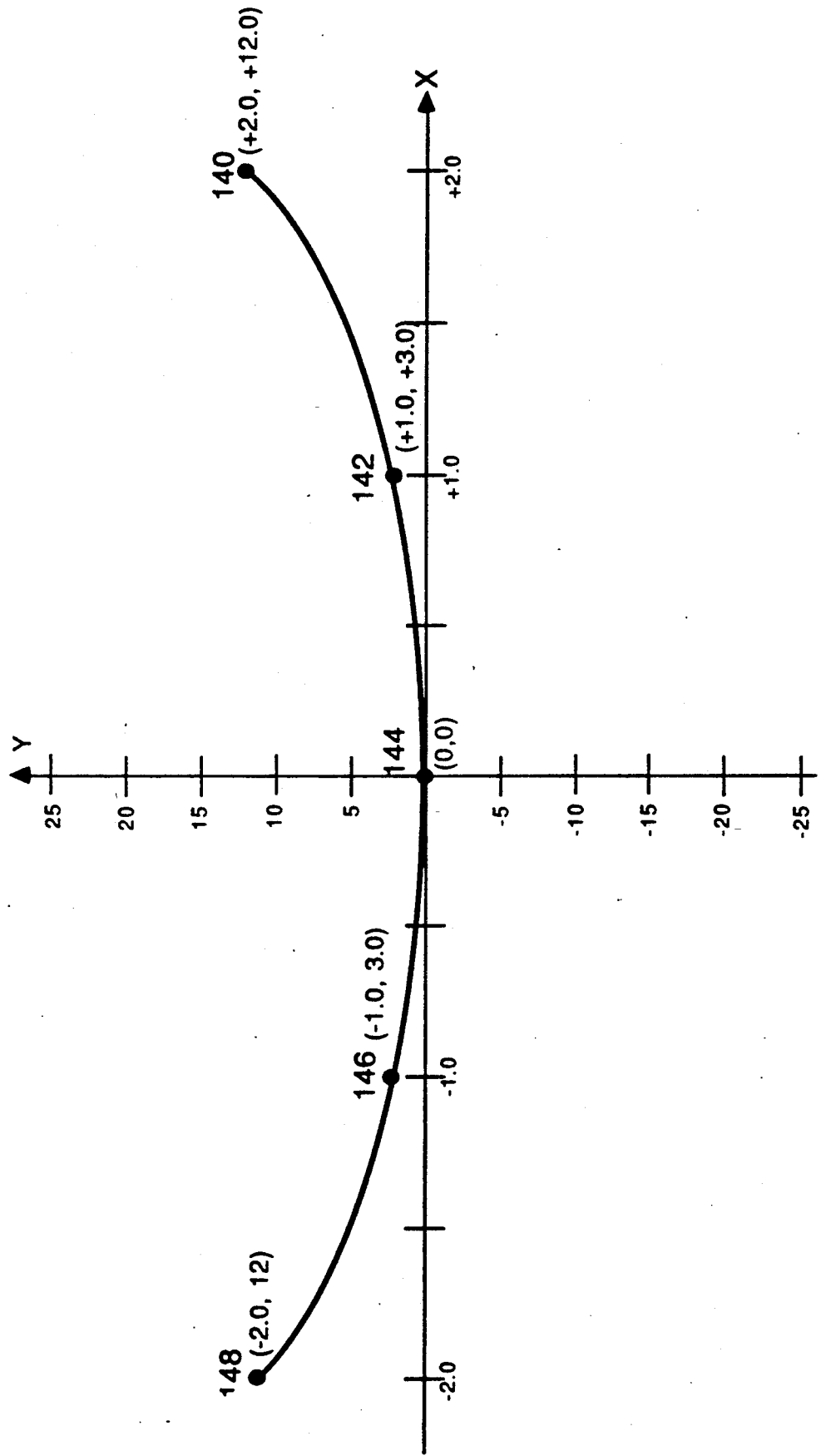

FIG. 14 is a graph of another curve, namely $y=3x^2$. Point 140 is the point $(2, 12)$ on the curve. Point 142 is the point $(1, 3)$ on the curve. Point 134 is the point $(0, 0)$ on the curve. Point 136 is the point $(-1, 3)$ on the curve. Point 148 is the point $(-2, 12)$ on the curve.

Neither the second curve nor the third curve is a good fit to the first curve. However, each curve bears some resemblance to the unknown curve. For example, the first curve is generally closer to the unknown curve than the second curve when x is positive. That is, points 120 and 122 are closer to the unknown curve that points 140 and 142. However, the second curve is not very close to the unknown curve when x is negative. While the second curve is a straight line, the third curve is of the same general parabolic shape as the unknown curve.

While neither the second curve nor the third curve are particularly good fits to the unknown curve, they are far better than many alternatives, such as $Y=7x+10$, $Y=x^3+x^2+x+1$, etc.

The desired solution to this problem of finding an unknown function in symbolic form can be viewed as a search for a function from a hyperspace of functions that can be composed from a set of candidate functions. The set of available candidate functions might include addition $(+)$, subtraction $(-)$, and multiplication $(*)$. The set of atoms for this particular problem consists of just the independent variable X.

In symbolic regression problems, the problem is both the discovery of the correct functional form that first the data and the discovery of the appropriate numeric coefficients.

Discovery of the appropriate numeric coefficients is a new problem that must be addressed in order to successfully do symbolic regression. This problem of constant creation can be solved by extending the atom set by one ephemeral element (called "R") during the generation of the initial random population. Thus, the atom set for this problem would be enlarged to size 2 for this particular problem. Whenever the ephemeral atom is chosen for any point of the tree during the generation of the initial random population, a random number in a specified range is generated and attached to the tree at that point. In this particular problem, the random constants were real numbers between $-1.0$ and $+1.0$. Of course, in a problem involving integers (e.g. induction of a sequence of integers), integers would be used for the ephemeral "R" atoms. This generation is done anew for each such point so that the initial random population of individuals contains a variety of different random numbers.

The random number produced by the ephemeral "R" atoms will then be moved around from tree to tree by the various crossover operations that occur and will become embedded in various sub-trees that are subject to various arithmetic operations. This moving around of the constants is not at all random, but instead is driven by the overall process of achieving ever higher levels of fitness. A symbolic expression that is a reasonable good fit to a target function may become a better fit if a particular constant is, for example, decreased slightly. A slight decrease can be achieved in several different ways. For example, there may be a multiplication by 0.90, a division by 1.10, a subtraction of 0.08, or an addition of $-0.04$. However, things are not always so direct.

In one particular problem where $\pi/2$ was needed, $2-\pi/2$ (about 0.429) was approximated by a succession of decreasing numbers in 11 steps. Starting with the available constant 1 and the available function SIN, (SIN 1) was computed as 0.841. The the SIN of 0.841 was taken to obtain a still smaller number, namely 0.746. This result was then squared to obtain a still smaller number, namely 0.556. Then the SIN function was successively applied six more times to obtain a succession of still smaller numbers, of which the last one was 0.433. That is, the composition (SIN (SIN (SIN (SIN (SIN (SIN (* (SIN (SIN 1)) (SIN (SIN 1)))))))))) was used to compute the constant 0.433.

Referring again to the regression examples in FIGS. 12-14, the best individual in the initial random population of individuals did not come close to any of the 20 actual given data points and the sum of the deviations between it and the 20 points was very large. However, starting with generation 1, the average population began improving.

Starting in generation 41, the best individual S-expression was (+(−(*−0.50677 X) (+(*−0.5077 x) (*−0.76526 X)))) (*(+0.11737) (+(−X (*−0.76527 X)) X))). This S-expression is equivalent to 2.76 $X^2$+3.15 X.

In other runs, the symbolic regression was successfully performed on additional target expressions such as $X^4+X^3+X^2+X$ and SIN X+COS X+$X^2$+X using function sets containing SIN, COS, and a restricted logarithm function RLOG (i.e. the logarithm of the absolute value returning 0 for an argument of 0).

Empirical Discovery—Kepler's Third Law

Kepler's Third Law of planetary motion was discovered in 1618. It is an example of empirical discovery of a scientific law by observing data. Kepler's Third Law states that the cube of a planet's distance from the sun is proportional to the square of its period. That is, $D^3/P^2$=c.

In attempting to rediscover Kepler's Third Law using non-linear genetic algorithms, we used the function set F={+,−,*,%, SRT, SIN, COS} and the atom set A={DIST}. The environment consisted of 9 cases relating the distance DIST (in astronomical units) of each planet from the sun and the period P of the planet (in Earth years). The object was to find an S-expression for P in terms of DIST.

The most parsimonious versions of the solutions were S-expressions such as (SRT (*DIST (*DIST DIST))) and (*DIST (SRT DIST)). Less parsimonious correct solutions included S-expressions such as (*DIST (+(−DIST DIST) (+(−DIST DIST) (SRT DIST)))) and (−(*DIST (SRT DIST)) (SIN 0.0)).

Interestingly, the S-expression (*DIST DIST) appeared several times as an imperfect (but approximately correct) ancestor of the correct final solution on several runs. Ten years before publishing the correct version of his Third Law, Kepler published this incorrect version.

Modelling and Forecasting—Econometric Time Series

An important problem area in many areas of science is finding the empirical relationship underlying the observed numeric values of various variables measuring the system so that a model of the process can be constructed. It is also possible to then use the model of the process to forecast future values of the process. In practice, the observed data may be noisy and there may be no known way to express the relationships involved in a precise way.

The problem of discovering such empirical relationships can be illustrated by the well known econometric "exchange equation" M=PQ/V, which relates the money supply M, price level P, gross national product Q, and the velocity of money V of an economy. Suppose that our goal is to find the relationship between quarterly values of the money supply M2 and the three other elements of the equation.

In particular, suppose we are given the 112 quarterly values (from 1961:1 to 1988:4) of the econometric time series. The first time series is "GNP82" (i.e. the annual rate for the United States gross national product in billions of 1982 dollars). The second time series is "GD" (i.e. the gross national product deflator normalized to 1.0 for 1982). The third series is "FYGM3" (i.e. the monthly interest rate yields of 3-month Treasury bills, averaged for each quarter). The fourth series is "M2" (i.e. the monthly values of the seasonally adjusted money stock M2 in billions of dollars, averaged for each quarter). The time series used here were from the CITIBASE data base of machine-readable econometric time series collected and distributed by Citibank N.A. of New York.

The actual long term historic postwar value of the M2 velocity of money in the United States is 1.6527 so that the "correct" solution is the multiplicative (non-linear) relationship $$M2 = \frac{GD * GNP82}{1.6527}$$

However, we are not told a priori whether the functional relationship between the given observed data (the three independent variables) and the target function (the dependent variable M2) is linear, multiplicative, polynomial, exponential, logarithmic or otherwise. The set of available functions for this problem is F={+,−,*,%, EXP, RLOG}. The set of available atoms for this problem is A={GNP82, GD, FYGM3}. They provide access to the values of the 28-year time series for particular quarters. We are not told that the addition, subtraction, exponential, and logarithmic functions and the time series for the 3-month Treasury bill yields (FYGM3) are irrelevant to the problem.

Note that the restricted logarithm function RLOG used here is the logarithm of the absolute value and returns 0 for an argument of 0. Note also that the restricted division function % returns a value of 0 is division by 0 is attempted.

In generating the initial random population (generation 0), various random real-valued constant were inserted at random as atoms amongst the initial random LISP S-expressions. The initial random population was, predictably, highly unfit. In one fairly typical run, none of the population came within 3% of any of the 112 environmental data points in the time series for M2. The sum of errors between that best S-expression and the actual time series was very large (88448). Similarly, the best individuals in generations 1 through 4 came close to the actual time series in only a small number of cases (i.e. 7, 2, 3 and 5 of 112 cases, respectively), and also had a large sum of error measures (72342, 70298, 26537 and 23627). However, by generation 6, the best individual came close the the actual time series in 41 of the 112 environmental cases and had a sum of errors of 6528.

In generation 9, the following S-expression for M2 emerged: (*GD (% GNP82 (% (%−0.587 0.681) (RLOG −0.587)))).

Note that this S-expression for M2 is equivalent to (% (*GD GNP82) 1.618), or, more familiarly, $$M2 = \frac{GD * GNP82}{1.618}$$

The S-expression discovered in the 9th generation comes within 3% of the actual values of M2 for 82 of the 112 points in the 28-year time series. The sum of the absolute errors between the S-expression discovered and the 112 points of the 28-year time series is 3765.2. The S-expression discovered here compares favorably to the "correct" "exchange equation" M=PQ/V (with a value of V of 1.6527) which had a sum of errors of 3920.7 and which came within 3% of the actual time series data for only 73 of 112 points in the 28-year time period studied.

Once a LISP S-expression has been found as the solution for any problem, it can be translated into another computer programming language (such as C or FORTRAN) for more convenient re-use. LISP is a particularly convenient programming language in which to perform such translation. Thus, the LISP S-expression: (%(*GD GNP82) 1.618) could be translated into an equivalent FORTRAN assignment statement: M2=(GD*GNP82/1.618).

Chaos

One aspect of the study of chaos involves finding the function that fits a given sample of data. Often the functions of interest are recursive in the sense that the sequence of values of the function over time depends on one or more initial condition values. One simple example of such a function 4 $x(t-1)$ $(1-x(t-1))$ over the unit interval [0,1]. For each time, after the initial time $t=0$, the value of the function is computed using the value of the function at the previous time step. The initial condition is the value (e.g. 0.26) for the function at time 0.

In one run, the sample S-expression data was provided for times 0, 1, 2, ..., 50.

(*PREV (*2(*2(−1PREV))))

was found after six generations. The atom PREV allows access to the value of the function at a previous time step. The initial condition is the value of the function at time 0.

The above example for chaos illustrates forcasting for a dependent variable x for a time outside the region of time associated with the sample of data (i.e. a time greater than 50) from which the S-expression was discovered.

Symbolic Integration

In "symbolic integration" we are given numerical values for a sampling of points on an unknown curve and we desire to find the function, in symbolic form, that is the integral of the unknown curve.

In particular, suppose we are given a sampling of 50 numerical values from an unspecified curve. That is, we are given 50 pairs $(x_1, y_1)$, where each $x_i < x_{i+1}$, for i between 1 and 49. The domain may be 0 to $2\pi$. The unspecified curve happens to be Cos $x+2x+1$, but the genetic algorithm is not given this information in functional form. The goal is to find, in symbolic form, the integral of the unspecified curve from the given pairs of numerical points. That is, the goal is to find Sin $x+x^2+x$ in symbolic form from the 50 pairs $(x_i, y_i)$.

It will be seen that the problem is, in fact, similar to the problem of symbolic regression discussed above, except for an additional numerical integration step. We first numerically integrate the curve $(x_i, y_i)$ over the domain starting at $x_1$ and running to $x_i$ so as to obtain a value for the integral of the unspecified function for each point $x_i$.

We call this integral $I(x_i)$ for the domain point $x_i$.

This numerical integration can be performed using any one of several well known techniques.

One well known technique for numerically integrating involves viewing the area under the curve as areas under rectangles. If the point is $x_4$, the sum is the sum of the areas of three rectangles. The first rectangle has a base running from $x_1$ and $x_2$ and a height equal to the average of $x_1$ and $x_2$, that is, $(x_1+x_2)/2$. The second rectangle has a base running from $x_2$ and $x_3$ and a height equal to the average of $x_2$ and $x_3$. The third rectangle has a base running from $x_3$ to $x_4$ and has a height equal to the average of $x_3$ and $x_4$. The sum of the areas of these three rectangles is $I(x_4)$.

As each individual candidate function $f_j$ is generated by the genetic algorithm, we evaluate $f_j(x_i)$ so as to obtain claim 50 pairs $(x_i, f_j(x_i))$.

The raw fitness of an individual candidate function is the sum of the absolute values of differences between the individual candidate function $f_j(x_i)$ at domain point $x_i$ and the integral $I(x_i)$ of the unspecified function up to domain point $x_i$.

As before, the desired solution can be viewed as a function from a hyperspace of functions that can be composed from the available functions (which are the same as above).

As before, the set of atoms contains just the single variable value x. Thus, the combined set of functions and atoms for this problem is C={X,+,−,*, SIN, COS, RLOG} having 0, 2, 2, 2, 1, 1, and 1 arguments, respectively.

After 4 generations, the S-expression (+(+(−(SIN X) (−X X)) X) (* X X)) emerged. This function has a very small error with respect to the 50 numerical points and it has a perfect score of 50 "near hits" in the sense that this function is within the criterion (0.01) of the integral of the unspecified curve for each of the 50 $x_i$ values. This S-expression is equivalent to Sin $x+x^2+x$.

To summarize, we found the functional form Sin $x+x^2+x$ from the 50 given data points $(x_i, y_i)$.

To another experiment, $x^4+x^3+x^2+x$ was obtained as the symbolic integral of $4x^3+3x^2+2x+1$.

It is advisable to use comparatively more points for numerical integration than for a symbolic regression because the numerical integration process is itself an approximate process. Thus, we used 50 points in this example concerning integration as compared to 20 points for the example concerning symbolic regression.

Symbolic Differentiation

In "symbolic differentiation", we are given numerical values for a sampling of points on an unknown curve and we desire to find the function, in symbolic form, that is the derivative of the unknown curve.

In particular, suppose we are given a sample of 200 numerical values from an unspecified curve in the domain 0 to $\pi/2$. That is, we are given 200 pairs $(x_i, y_i)$. The unspecified curve happens to be Sin $x+x^2+x$, but the genetic algorithm is not given this information in functional form. The goal is to find in symbolic form the derivative of the unspecified curve from the given pairs of numerical points. That is, the goal is to find Cos $x+2x+1$ in symbolic form.

It will be seen that the problem is, in fact, similar to the problems of symbolic regression and symbolic integration discussed above except for an additional numerical differentiation step. These are well known techniques for numerical differentiation. One approach follows. In numerically differentiating the curve $(x_i, y_i)$ for points other than endpoints of the domain, the derivative is the average of the slope of the curve between point $x_{i-1}$ and $x_i$, and the slope of the curve between point $x_i$ and $x_{i+1}$. For the two endpoints of the domain the slope is the (unaveraged) slope of the curve to the nearest point.

After 30 generations, the S-expression (+(+(COS (−X X)) (+X X)) (COS X)) emerged. This function has a very small error with respect to the 200 numerical data points and it has a perfect score of 200 "hits" in the sense that this function is within the criterion (0.01) of the $y_i$ value for each of the 200 $x_i$ values. This S-expression is equivalent to Cos $x+2x+1$.

In another experiment, $4x^3+3x^2+2x+1$ was obtained as the symbolic derivative of $x^4+x^3+x^2+x$.

It is advisable to use comparatively more points for numerical differentiation than numerical integration because the numerical differentiation process is itself an approximate process. Thus, we used 200 points in this example concerning differentiation, as compared to 50 points for the example concerning symbolic integration.

Differential Equations

Differential equations are typically approached using analytic methods or numerical approximation methods. However, the problem of solving differential equations may be viewed as search in a hyperspace of functions for a function which satisfies the equation and its initial condition.

Consider the simple differential equation:

$$\frac{dy}{dx} - 2y = 0$$

having an initial value of y of 7.389 for an initial value of x of 1.0. The goal is to find a function which satisfies the equation, namely, $e^{2x}$.

For convenience, we standardize the equation so that the right hand side of the equation is always zero. The left hand side of the differential equation may involve addition, subtraction, multiplication, division, derivatives (with respect to a specified variable), second derivative, higher derivative, scaling by a constant, or some other function of the individual candidate function $f(x_i)$. We start by generating 200 random values of $x_i$ over a domain such as between 0 and 2.0. As each individual candidate function $f_j$ is generated, we evaluate $f_j(x_i)$ so as to obtain 200 pairs $(x_i, f_j(x_i))$. We then numerically differentiate the curve $(x_i, f_j(x_i))$ to obtain the value of the derivative $f_j'(x_i)$ for all 200 points. We then perform the multiplication by 2 for all 200 pairs of points and then perform the subtraction $f_j'(x_i)-2f_j(x_i)$ for all 200 points. In other words, we compute the left hand side of the equation for all 200 $x_i$ points.

The sum of the absolute values of the differences between the zero constant function (the right hand side of the equation) and the left hand side (involving the individual candidate function) is then computed. The closer this sum of differences is to zero, the better.

The fitness of an individual candidate function is composed of two factors. The sum of absolute differences mentioned above represents the largest contribution to the raw fitness of the function (say 75%). The other 25% of the raw fitness is derived from the closeness of the candidate function to the initial condition, namely, the absolute value of the difference between the value computed by the individual candidate function $f_j$ for the domain value x * for the initial condition and the actual value y * for the initial condition.

The combined set of functions and atoms for this example problem is C={, X,+,−,*, SIN, COS, RLOG, REXP} having 0, 2, 2, 2, 1, 1, 1, and 1 arguments, respectively.

By the 4th generation of one run, the LISP S-expression (EXP (*2 X)) emerged.

To further illustrate this process, consider the differential equation $$\frac{dy}{dx} + y\text{Cos } x = 0$$

having an initial value of y of 1.0 for an initial value of x of 0.0.

Again, as a matter of convention, the right hand side of this differential equation is zero.

The left hand side involves the unknown function y, the first derivative of the unknown function y, and the cosine of the independent variable x.

We start by generating 200 random values of $x_i$ over some domain such as 0 and 1.0. As each individual candidate function $f(x)$ by the genetic algorithm, we evaluate $f_j(x_j)$ so as to obtain 200 pairs $(x_i, f_j(x_i))$. We then multiply so as to obtain 200 pairs $(x_i, f_j(x_i)*\text{Cos } x_i)$. We then take the numerical derivative of $f_j$ so as to obtain 200 pairs $(x_i, f_j'(x_i)+f_j(x_i) \text{ Cos } x_i)$. To the extent that $f_j'(x_i)+f_j(x_i) \text{ Cos } x_i$ is close to zero for the 200 values of $x_i$, the candidate function $f_j$ is a good approximate solution to the differential equation.

In one run, the best individual in the initial random population (generation 0) was the function:

$$e^{1-ex}$$

Its raw fitness was 58.09 and only 3 of the 200 points were "near hits". By generation 2, the best individual in the population was:

$$e^{1-e\text{Sin }x}$$

Its raw fitness had improved to 44.23 and only 6 of the 200 points were "near hits".

By generation 6, the best individual in the population was equivalent to $e^{-\text{Sin }x}$. The raw fitness had dramatically improved (decreased) to only 0.057. Moreover, 199 of the 200 points were "near hits". The function $e^{-\text{Sin }x}$ is the solution to the differential equation.

Another example is the differential equation:

$$\frac{dy}{dx} = \frac{2 + \text{Sin } x}{3(y-1)^2}$$

with initial condition such that y=2 when x=0

In one run, the best individual in the 13th generation was:

(−(CUBRT (CUBRT 1)) (CUBRT (−(−(−(RCOS X) (+1 (CUBRT 1))) x) X))).

where CUBRT is the cube root function. This is equivalent to:

(+1 (CUBRT (−(+2 (*2 X)) (RCOS X)))

which is equivalent to $1+(2+2X-\text{Cos } X)^{\frac{1}{3}}$, which is the solution to this equation.

When the initial condition of the differential equation involves only a value of the function itself (as is typically the case when the differential equation involves only first derivatives), any point in the domain of the independent variable (X) may be used for the initial condition. On the other hand, when the initial condition of the differential equation involves a value of any derivative of the function (as may be the case when the differential equation involves second derivatives or higher derivatives), it is necessary that the value of the independent variable (X) involved in the initial condition be one of the points in the random set of points $x_i$ (and preferably an internal point). This allows the first derivative (or higher derivative) to be evaluated for the initial condition point.

Power Series Solution to a Differential Equation

It is also possible to discover the power series program for $e^x$ when an exponential function is part of the solution to a differential equation.

In this experiment, we demonstrate the use of two tools which are commonly used in computer programming, namely iteration and the ability to give a name to the results of a calculation (or the result of a sub-program) so that it can be subsequently referred to and subsequently used.

For this experiment, the problem is to find the solution to:

$$\frac{dy}{dx} - y = 0$$

having an initial value of y of 2.718 for an initial value of x of 1.0. In effect, the problem is to compute $e^x$ using the power series:

$$\sum_{j=0}^{\infty} \frac{x^j}{j!}$$

The functions available for this problem include addition (+), multiplication (*), and the modified division operation % (which returns a value of zero when division by zero is attempted), the "set" operator SA, an an iterative summation operator SIGMA. The atoms available for this problem include the variable X, an iterative summation index II, and the assignable variable AAA.

The "set" operator SA has one argument and sets the global variable AAA equal to the value of its assignment. The set function allows a computer program to assign a name to the results of a calculation (or the results of a sub-program) so that it can subsequently refer to and subsequently use that result. It fills a role similar to the assignment statement found in programming languages, such as FORTRAN or PASCAL.

In writing computer programs, computer programmers often mistakenly use a variable that has not yet been defined by their program. Depending on the programming language or machine involved, such undefined variables typically either cause the computer program to halt or they are assigned a default value (which may well be inappropriate to the specific problem involved). Our purposes here are best served by not having the evaluation of any one individual halt the overall operation here. Thus, we assign a default value to any undefined variable. Since this problem involves real-valued variables, the default value here should be a floating point number. In order to simplify the particular problem here, we have made the default value 1.0 for undefined variables. Note that a given S-expression typically changes the value of an assignable variable during the course of the program (and may do so many times).

The iterative summation operator SIGMA has one argument called WORK and performs a function similar to the familiar summation operator $\Sigma$ in mathematics. In particular, the operator SIGMA evaluates its WORK argument repeatedly until a summand is encountered that is very small (e.g. less than 0.000001 in absolute value). The operator SIGMA then returns the value of its accumulated sum.

The operator SIGMA is similar to the iterative DU ("Do Until") operator, described below, in that an indexing variable II is available inside the SIGMA operator as it iterates. While a SIGMA operator is performing iterations, an iteration variable II counts the number of iterations (starting with 1). This variable can be one of the atoms in the set of available atoms. Thus, if the argument WORK happens to contain II, the SIGMA operator becomes a summation over the indexing variable. Of course, if it does not, the SIGMA operator merely accumulates a sum of summands that are independent of II (but which may, nonetheless, change due to the operation of assignable variables or other side effects).

Since individual S-expressions in the population are not generally or necessarily very small in absolute value, there is no guarantee that the operator SIGMA will terminate. Therefore, it is a practical necessity (when working on a serial computer) to place limits on both the number of iterations allowed by any one execution of a SIGMA operator and to place a similar limit on the total number of iterations allowed for all SIGMA operators that maybe evaluated in the process of executing any one individual S-expression for any particular environmental case. Note that even when a SIGMA operator times out, it nevertheless returns a real value equal to the sum accumulated up to the time.

The LISP S-expression (SIGMA (SA (*AAA (%·X II)))) is a parsimonious LISP S-expression for computing the value of the power series for $e^x-1$ for a given value of X. This S-expression consists of a SIGMA operator that starts by setting AAA t the result of multiplying the value of AAA (which initially is 1) by X and dividing by the iteration variable II. As this iterative process continues, the summands successively consist of the powers of X divided by the factorial of the iteration number. When the current assignable variable AAA gets very near zero, the SIGMA operator terminates and returns its accumulated value (namely, the last overall sum). Note that if the termination predicate is ill formed (as it often is), the iterative summation operator will "time out" when the limit on the number of iterative steps is reached (e.g. 15).

In one run, we obtained (SIGMA-(SA (*SA AAA) (SA (% X II))))) as the best individual LISP expression on the 13th generation. When simplified, this LISP S-expression is equivalent to the correct solution to the differential equation and its initial conditions.

Inverse Problems

Suppose we have a set of data consisting of $(x_i, y_i)$ pairs such as (9, 6), (16, 8), (25, 10), (36, 12), (2.25, 3.0), etc. Symbolic regression would reveal that the dependent variable $y_i$ is twice the square root of the independent variable $x_i$. That is, $y_i = 2\sqrt{x_i}$.

The problem of finding the inverse function involves a set of $(x_i, y_i)$ pairs of data such as (6, 9), (8, 16), (10, 25), (12, 36), (3, 2.25), etc. and concluding that the dependent variable $y_i$ is the square of half of the independent variable $x_i$. That is, $$y_i = \frac{x_i^2}{2}$$

It will be seen that the problem of finding the inverse function for a given set of data is similar to the problem of symbolic regression discussed above, except for an additional step of switching the roles of the independent and dependent variables of the data set.

Integral Equations

It can be seen that integral equations can be solved with the same approach as the above.

Integral equations are equations that involve the integral of the unknown function. In fact, some integral equations that commonly appear in engineering and physical problems involve both the integral of the unknown function and the derivative of the unknown function. Such equations are called integro-differential equations.

It will be seen that the problem of solving such integral equations (or integro-differential equations) is similar to the problem of symbolic regression discussed above, except for the additional step of taking the integral of the candidate function (or, in the case of integro-differential equations, taking the integral and derivative of the candidate function). One example of an integral equation is:

$$y(t) + 2 \int_{r=0}^{r=t} \text{Cos}(t - r)y(r)dr - 1 = 0.$$

This integral equation can be solved for $$y(t) = 1 - 2 t e^{-t}$$

in the same manner as the differential equations. Note that the process of integration creates a variable (r in this case), which is similar to the indexing variable of an iterative loop, (described below in connection with the "DU" and "DUL" functions and described above in connection with the SIGMA function).

Solving Mathematical Equations

Other even more complicated types of equations can be solved with the genetic process described herein.

In each case, the principle is to search the hyperspace of compositions of functions for a function which, when substituted into the given equation, is good, best, or perfect in satisfying the given equation.

For convenience, the right hand side of the equation is zero. The steps are as described above. Many equations have additional conditions (similar to the initial conditions of differential equations). Such additional conditions can be given weight in computing fitness as described above.

There are many applications in science, engineering and other fields which require solving equations (either exactly or approximately). As an example, consider the following functional equation:

$$f(2x) - 1 + 2 \text{Sin}^2 x = 0.$$

The goal is to solve this equation for the function f, which when substituted into the equation satisfies the equation.

As before, we begin by defining a set of functions and arguments (atoms). In this case, the set of functions might contain functions such as the exponential function (EXP), the sine function (SIN), the cosine function (COS), the square root function (SQRT), etc. The set of arguments would contain the variable atom X. The set of arguments might also contain some constant atoms that might be useful (such as 0 or 1) and some random real numbers (denoted by "R" in the atom set). In it this example, the solution to this particular equation (which is the function Cos 2x) will not need these particular constant atoms or the random constants; however, we do not usually know this in advance.

Proceeding as before, we select a number of random points in a suitable domain. In particular, we select 50 points $x_i$ in the domain of real numbers between $-3.14$ and $+3.14$. In a computer implementation, we would typically use a vector (array) to store these 50 values $x_i$. We compute another vector of 50 values corresponding to the sine of each $x_i$. We then compute another vector of 50 values corresponding to the square of the sine of each $x_i$. Next, we compute another vector corresponding to twice the square of the sine of the 50 $x_i$ values. Each of these computed vectors can also be viewed as a curve; since, we can think of the points for 2 $\text{Sin}^2 x$ being plotted graphically on conventional graphic axes.

Similarly, we compute a vector for the constant 1 (denoted "constant curve)". This consists of a vector of 50 values each identical to 1. We then subtract this "constant curve" from the "curve" computed earlier for 2 $\text{Sin}^2 x$. Finally, we consider each of the S-expressions in the current population of individuals. If the population size is 300, for example, we then consider each of these 300 individual functions $f_j$ (j between 1 and 300) in turn so as to compute its fitness. In this particular problem, we must first perform the additional step of multiplying the 50 $x_i$ values by 2 before beginning the evaluation. We then compute the new "curve" for $f(2x) - 1 + 2 \text{Sin}^2 x$ for the 50 values $x_i$.

If we happen to have the exact function f that exactly satisfies the equation $$f(2x) - 1 + 2 \text{Sin}^2 x = 0,$$

the new "curve" computed will consist of all zeros. In any case, the value of the left hand side $f(2x) - 1 + 2 \text{Sin}^2 x$ corresponds to the fitness of the function in this problem environment.

In one run, the S-expression below was attained on the 7th generation with a raw fitness of zero:

(*1 (COS (+X X)).

This S-expression is equivalent to Cos 2x and solves the equation. That is, when Cos 2x is substituted into the equation $$f(2x) - 1 + 2 \text{Sin}^2 x = 0,$$

the equation is satisfied (i.e. the left hand side evaluates to zero for each random $x_i$).

An important special case of the process of solving equations is where the set of arguments (atoms) consists only of constants. That is, there are no variable arguments (such as x) in the set of arguments used to construct the S-expressions. In this special case, the process can be used to solve an equation for numerical values.

For example, consider the simple equation which one would conventionally write as:

$$x^2 - 2\sqrt{2}x + 2 = 0.$$

This equation has two identical roots, namely, $\sqrt{2}$, which is approximately 1.414214. For clarity here, this equation may be represented as being a functional equation $$f^2(x) - 2\sqrt{2} f(x) + 2 = 0$$

where the function f(x) is the unknown (instead of the conventional variable x being the unknown).

We proceed by using a set of functions that contain functions such as addition (+), subtraction (−), multiplication (*), division (%), and perhaps other functions. The set of arguments (atoms), however, consists only of random constants ("R"). Note that x does not appear in this set of arguments (atoms). The set of arguments could also contain some particular specific constant atoms that might be useful in solving the problem; although, we do not use any in this particular example. As a result, the set of S-expressions contains only random constants. Typical S-expressions might be (+0.234 (* −0.685 0.478)) and (*(*0.537 −1.234) (+1.467 0.899)).

As before, 50 random values of $x_i$ are selected in a suitable domains (such as −2.0 to +2.0). A "curve" is then built up by squaring each $x_i$. Next, each $x_i$ is multiplied by $2\sqrt{2}$ and this result is subtracted from the square of each $x_i$. The value 2 is added to each of the 50 values. The next step is to evaluate the fitness of each of the 300 individual S-expressions $f_j$ in the population. Each S-expression in this problem has a particular numeric value because the initial population of S-expressions contained only constants. Its value does not depend on $x_i$. Thus, when each $f_j$ is evaluated for fitness, the value is the same for all 50 cases (because the value $f_j$ does not depend on $x_i$). As before, the sum of these 50 (identical) values is the fitness of the S-expression $f_j$. If the S-expression causes the left hand side of the equation (i.e. the raw fitness side) to be zero, that S-expression (which is, in fact, a numeric constant value) satisfies the equation.

In one run, the best individual S-expression in the 42nd generation evaluated to 1.41417, which is within 0.00004 of the value of $\sqrt{2}$, which is approximately 1.41421.

Note that this genetic approach to solving equations for numeric values produces quite precise values. This result is contrary to the conventional view that genetic algorithms are only good for searching for the general neighborhood of a correct answer in a large search space. This view is perhaps correct when applied to genetic conventional algorithms operating on character strings whose length is fixed in advance. However, in genetic algorithms where the size and shape of the solution is allowed to dynamically vary as the problem is being solved, it is possible to search large search space for the correct neighborhood and then converge closely onto the precise correct solution.

Multiple Regression

The examples above included problems with one dependent variable x and problems with several independent variables (such as the econometric time series problem where there were two independent variables).

Problems with more than one dependent variable can also be solved. For example, consider the following problem with four independent variables $x_1$, $x_2$, $x_3$ and $x_4$, and two dependent variables $y_1$ and $y_2$. Suppose we are given a set of 50 data points in the form of 50 6-tuples, namely, $(x_{1i}, x_{2i}, x_{3i}, x_{4i}, y_{1i}, y_{2i})$. The unknown functional relationships might be $$y_{1i} = x_{1i} x_{3i} - x_{2i} x_{4i}$$

$$y_{2i} = x_{2i} x_{3i} + x_{1i} x_{4i}$$

for i between 1 and 50.

Problems of this type require the use of a somewhat more complex structure for the individuals in the population because there are two return values ($y_{1i}$ and $y_{2i}$), instead of just one. Two changes are required from the process described earlier to accomodate multiple return values.

First, the root of the tree (i.e. the function just inside the left most parenthesis of the LISP S-expression) should be the function LIST. This function LIST should have two arguments. That is, the value returned by the LISP S-expression is a pair (LIST) of two numbers, rather that a single number.

The LISP S-expressions created in the initial generation of the process can be of this form merely by restraining the choice for the function just inside the leftmost parenthesis of the S-expression to the particular function LIST (with two arguments). Thereafter, the process of generating the initial individuals in the population would be unrestricted as before.

Second, the choice of points in the crossover operation should be correspondingly restrained so as to preserve the structure required by the problem. The structure required by the problem is that the root of the tree must be the LIST function. In other words, the rule of construction for S-expressions for this problem is to always initially place a LIST function at the root of the tree and then preserve it at that location.

This restraining process can be conceived in two ways.

One way of conducting this restraining proces is to exclude the root of the tree (i.e. the function point just inside the left most parenthesis of the LISP S-expression) from being selected as the crossover point of either parent in the crossover operation. With this exception, the crossover process then proceeds as before.

A second way of conducting the selection of the crossover point illustrates the general principle involved somewhat more clearly. In this second way of conducting the selection of the crossover point, any point may be selected in the first parent. There is no restriction. However, the selection of the crossover point in the second parent is restricted to a point of the same "type" as the point just chosen from the first parent. There are only two "types" of points involved in the multiple regression problem, namely, the root point and the non-root point of the tree (LISP S-expression). Thus, if a non-root point is chosen as the crossover point for the first parent, then a non-root point must be chosen as the crossover point for the second parent. If the root happens to be chosen as the crossover point for the first parent, then the selection of crossover points in the second parent is limited to points of this same "type". Therefore, the root of the second parent must be chosen. As it happens, the crossover operation merely swaps entire parents when the crossover points are both roots.

This second way of looking at the restraining process is more dramatically illustrated in the problem of game playing and neural net design (both described below).

In games, for example, the internal points of the tree may be labeled with the player who is entitled to move at that point in the game. The "types" of points in the tree therefore correspond to the players involved. As before, any point may be chosen in the first parent. The restraint applied is to limit the selection of the crossover point in the second parent to a point in the game tree that belongs to the same player as the crossover point already chosen in the first parent.

Note that the fitness function for multiple regression problems must be modified to take into account the fact that more than one dependent variable is involved. One way to do this is to make the fitness equal to the absolute value of the difference between the value of the first dependent variable returned by the S-expression and the target value of the first dependent variable plus the absolute value of the difference between the value of the second dependent variable returned by the S-expression and the target value of the second dependent variable. Of course, other ways of measuring differences (such as the square root of the sum of the squares of differences) can also be used in the multiple regression problem (in the same way as when there is only one dependent variable).

In one run of the illustrative multiple regression problem described above, the LISP S-expression (LIST (−(*X3 X1) (*X4 X2)) (+((*X3 X2) (*X1 X4))))

emerged on the 31st generation. The two S-expressions in the LIST are the two desired S-expressions.

The technique described above for handling the return of more than one value from a program and the associated calculation of fitness for that situation can be applied to many of the other problems described herein. For example, there may be more than one value returned as the solution to an equation or a pair of equations; or, there may be multiple values returned from a program that performs a task that can be measure as to several different attributes.

Function Learning

The problem of machine learning of a function requires developing a composition of functions that can return the correct functional value after seeing only a relatively small number of specific examples of the functional value that is associated with particular combinations of arguments.

In this first experiment, the problem is to learn the Boolean multiplexer function. The input to the Boolean multiplexer function consists of k "address" bits $a_i$ and $2^k$ "data bits" $d_i$ and is a string of length $k+2^k$ of the form $a_{k-1} \ldots a_1 a_0 d_{2^k-1} \ldots d_1 d_0$. The value of the multiplexer function is the value (0 or 1) of the particular data bit that is singled out by the k address bits of the multiplexer. For example, for the 11-multiplexer (where k=3), if the three address bits $a_2 a_1 a_0$ are 110, then the output is the sixth data bit $d_6$.

The set of available functions for this problem is F={AND, OR, NOT, IF}. In fact, this set of basic logical functions seems appropriate (and is certainly adequate) for any problem involving a Boolean function. The AND and OR functions take two arguments. The NOT function takes one argument. The IF function is the IF-THEN-ELSE function and takes three arguments.

The set of available atoms for this problem has 11 elements and is C={A0, A1, A2, D0, D1, . . . , D7}.

The potential set of structures undergoing adaptation in this problem is the set of all LISP S-expressions that can be recursively composed from the set of available functions and the set of available atoms.

The Boolean multiplexer function with $k+2^k$ arguments is one of $2^{k+2^k}$ possible Boolean functions of $k+2^k$ arguments. Thus, the search space for the Boolean multiplexer is of size $2^{k+2^k}$. Every possible Boolean function of $k+2^k$ arguments can be realized by at least one LISP S-expression composed from the functions and atoms above (via disjunctive normal form, for example). Thus, the search space for the 11-multiplexer (where k=3) is of size $2^{2048}$, which is approximately $10^{616}$.

The environment consists of the $2^{k+2^k}$ possible combinations of arguments $a_0 a_1 a_2 d_0 d_1 d_2 d_3 d_4 d_5 d_6 d_7$, along with the associated correct value of the 11-multiplexer function. For the 11-multiplexer (where k=3), there are 2048 such combinations of arguments in the environment. In our discussion here of this particular problem, we use the entire set of 2048 combinations of arguments (i.e. we do not use sampling of the environment).

The raw fitness of a LISP S-expression is the sum of the distances (taken over all the environmental cases) between the point returned by the S-expression for a given set of arguments and the correct point. When Boolean variables are involved, this is equivalent to the number of mismatches. Thus, the raw fitness of an S-expression can range over 2049 different values between 0 and 2048. A raw fitness of 0 denotes a 100% correct individual.

We have found it highly useful to define an auxiliary measure for monitoring the progress of runs which count the number of "hits" between an S-expression and the correct value. For this problem the number of "hits" is simple 2048 minus the raw fitness (mismatches). For problems involving integer values discussed later, this auxiliary measure counts the number of "hits" between an S-expression and the correct environmental value (whereas the raw fitness is a cumulative distance measure). For problems involving real values discussed later, this auxiliary measure counts the number of "near hits" for which the S-expression comes within a small tolerance of the correct environmental value. This measure of "hits" or "near hits" is not accessible to, or used by, the genetic algorithm for any problem discussed herein. It is used only for monitoring runs.

We illustrate the overall process by discussing one particular run of the Boolean 11-multiplexer in detail. The process begins with the generation of the initial random population (i.e. generation 0).

Predictably, the initial random population includes a variety of highly unfit individuals. Some involve logical contradictions, such as (AND A0 (NOT A0)). Others involve inefficiencies such as (OR D7 D7). Some are passive and merely pass an input through as the output, such as (NOT (NOT A1)). Some of the initial random individuals base their decision on precisely the wrong arguments (i.e. data bits), such as (IF D0 A0 A2). Most of the initial random individuals are partially blind in that do not involve all 11 arguments that are necessary for a solution. Some are just nonsense, such as (IF (IF (IF D2 D2 D2) D2) D2).

Nonetheless, even in this highly unfit initial random population, some individuals are somewhat more fit than others. For the run in question, the individuals in the initial random population (generation 0) had raw fitness values ranging from 768 mismatches (1280 hits) to 1280 mismatches (768 hits). As it happens, a total of 25 individuals out of 4000 tied with the high score of 1280 hits on generation 0. One such individual was the S-expression (IF A0 D1 D2). In spite of its obvious shortcoming (e.g. it is partially blind, in that is uses only 3 of the 11 necessary atoms of the problem), this individual nonetheless does some things right. It uses an address bit (A0) as the basis for selecting one of two data bits as the output. Moreover, if A0 (which is the low order binary bit of the 3-bit address) is T (True), an odd numbered data bit (D1) is selected, while if A0 is NIL, an even numbered data bit (D2) is selected. This individual is far from perfect, but it is more fit than any of the others. The worst individual in the population was (OR (NOT A1) (NOT (IF (AND A2 A0) D7 D3))) and had 1280 mismatches. The average raw fitness for generation 0 is 985.4.

The "hits" histogram of the population provides additional details about the population and is particularly valuable in monitoring the progress of learning from generation to generation. A total of 50 different levels of raw fitness are represented in the population. A histogram would show, for example, that 1490 had raw fitness 1152 (the high point for generation 0).

A new population is then created from the current population. This process begins with the selection of a mating pool equal in size to the entire population using fitness proportionate reproduction (with reselection allowed). The crossover operation is then performed on the specified percentage of the mating pool. When these operations are completed, the new population (i.e. the new generation) replaces the old population.

Starting with generation 1, the average raw fitness of the population immediately begins improving (i.e. decreasing) from the baseline value for generation 0 of 985.4 to about 891. We typically see this kind of generation. As it happens, in this particular run, the average raw fitness improves monotonically between generation 2 and generation 9 and assumes values of 845, 823, 762, 731, 651, 558, 459, and 382.

At the same time, we typically see a generally improving trend in the raw fitness of the best individual in the population from generation to generation. As it happens, in this particular run, the raw fitness (i.e. number of mismatches) of the best single individual in the population improves monotonically between generation 2 and generation 9 and assumes values of 640 (i.e. 1408 hits), 640, 576, 384, 384, 256, 256, 128, and 0 (i.e. a perfect score of 2048 hits), respectively. On the other hand, the raw fitness of the worst individual in the population typically fluctuates considerably. It is rarely monotonically improving. For this particular run, this number starts at 1280 and actually deteriorates to 1792 (only 256 hits out of 2048) by generation 9.

The number of hits for the best single individual in the population rises to 1408 for generations 1 and 2 of the run. In generation 1 for example, one individual in the population had a score of 1408, namely (IF A0 (IF A2 D7 D3) D0). Note that this individual performs better than the best individual from generation 0 because it considers two address bits (A0 and A2) in deciding which data bit to choose as output and because it incorporates three data bits as its potential output. In contrast, the best individual in generation 0 considered only one address bit (A0) and incorporated only two data bits as potential output. Although still far from perfect, the best individual from generation 1 is less blind and more complex than the best individual of the previous generation.

By generation 2, the number of individuals sharing this high score of 1408 rose to 21. The histogram for generation 2 reflects the beginning of the left-to-right undulating "slinky" progress that characterizes the learning by the population. Note that the high point of the histogram for generation 2 has advanced from 1152 for generation 0 to 1280. There are now 1620 individuals with 1280 hits.

In generation 3, one individual in the population attained a new high score of 1472 hits. This individual is:

(IF A2 (IF A0 D7 D4) (AND (IF (IF A2 (NOT D5) A0) D3 D2) D2)).

The histogram for generation 3 shows further advances in fitness for the population as a whole. The number of individuals with a fitness of 1280 (the high point of the histogram) has risen to 2158 for generation 3, and the number of individuals with fitness 1280 or better has risen from 1679 in generation 2 to 2719 in generation 3.

In generations 4 and 5, the best individual has a score of 1664 hits. This score is attained by one individual in generation 4 and 13 individuals in generation 5. This best individual is:
(IF A0 (IF A2 D7 D3) (IF A2 D4 (IF A1 D2 (IF A2 D7 D0)))).

Note that this individual uses all three address bits (A2, A1, and A0) in deciding upon the output. It also uses five of the eight data bits. By generation 4, the high point of the histogram has moved to 1408 with 1559 individuals.

In generation 6, four individuals attain a score of 1792. The high point of the histogram has moved to 1536. In generation 7, 70 individuals attain this score of 1792.

In generation 8, four individuals attain a score of 1920. The high point of the histogram has moved to 1664 and 1672 individuals share this value. Moreover, an additional 887 individuals score 1792.

In generation 9, one individual emerges with a 100% perfect score of 2048 hits. That individual is:

| (IF A0 (IF A2 (IF A1 D7 (IF A0 D5 D0)) (IF A0 (IF A1 (IF A2 D7 D3) D1)D0)) (IF A2 (IF A1 D6 D4) (IF A2 D4 (IF A1 D2 (IF A2 D7 D0))))) |
|---|

Thus, this 100% correct individual can be simplified to:

| (IF A0 (IF A2 (IF A1 D7 D5) (IF A1 D3 D1)) (IF A2 (IF A1 D6 D4) (IF A1 D2 D0))). |
|---|

When so rewritten, it can be seen that this individual correctly performs the 11-multiplexer function by first examining address bits A0, A2 and A1 and then choosing the appropriate one of these eight possible data bits.

A rapid sequential review of the histograms for generations 0 through 9 reveals the left-to-right "slinky" movement of the single best individual, the high point of the histogram, and the "center of mass" of the histogram.

Further insight can be gained by studying the genealogical audit trail of the process. This audit trail consists of a complete record of the details of each instance of the operations. In the case of the operations of fitness proportionate reproduction and crossover, the details consist of the individual(s) chosen for the operation and the particular point chosen within each such participating individual(s).

Construction of the audit trail starts with the individuals of the initial random generation (generation 0). Certain additional information, such as the individual's rank location in the population (after sorting by normalized fitness) and its raw fitness, is carried along as a convenience in interpreting the genealogy. Then, as each operation is performed to create a new individual for the next generation, a list is recursively formed consisting of the operation, the details of the operation, and the entire audit trail (itself a list) accumulated so far for each of the individual(s) participating in that operation.

An individual occurring at generation h has up to $2^{h+1}$ ancestors. The number of ancestors is less than $2^{h+1}$ to the extent that operations other than crossover are involved; however, crossover is, by far, the most frequent operation. For example, an individual occurring at generation 9 has moved up to 1024 ancestors. Note that a particular ancestor may appear more than once in this genealogy because all selections of individual to participate in the basic genetic operations are skewed in proportion to fitness. Moreover, even for a modest sized value of h, $2^{h+1}$ will typically be greater than the population size. This repetition, of course, does nothing to reduce the size of the genealogical tree.

Construction of the genealogical audit trail is exponentially expensive in both computer time and memory space. Note that the audit trail must be constructed for each individual of each generation because the identity of the 100% correct individual(s) eventually solving the problem at generation 0 is not known in advance. Thus, there are 4000 audit trails. By generation 9, each of these 40000 audit trails incorporates recursively the audit trails of up to 1024 ancestors. In order to minimize the size of the audit trail (which depends on the number of generations involved), we selected a relatively large population (i.e. 4000) so as to force down the number of generations needed to produce a 100% correct individual. The audit trail for the single individual of interest in generation 9 alone occupies about 27 densely printed pages.

An examination of the genealogical audit trail for the 100% correct individual emerging at generation 9 reveals a number of interesting points. This individual is the child resulting from the most common genetic operation used in the process, namely crossover. The male parent from generation 8 had rank location of 58 (out of 4000) in the population and scored 1792 hits (out of 2048). The female parent from generation 8 had rank location 1 and scored 1920 hits. Note that it is entirely typical that the individuals selected to participate in crossover had relatively good rank locations in the population since crossover is performed among individuals in a mating pool created using fitness proportionate reproduction.

The male parent from generation 8 (scoring 1792) was:

(IF A0 (IF A2 D7 D3)
    (IF A2 (IF A1 D6 D4)
        (IF A2 D4 (IF A1 D2 (IF A2 D7 D0))))))).

Note that this male parent starts by examining address bit A0. If A0 is T, the italicized and underlined portion then examines address bit 42, and partially blindly makes the output equal D7 or D3 without even considering address bit A1. Moreover, the underlined portion of this individual does not even contain data bit D1 and D5. On the other hand, when A0 is NIL, this individual is 100% correct. In that case, it examines A2 and is A2 is T, it then examines A1 and makes the output equal to D6 or D4, according to whether A1 is T or NIL. Moreover, if A2 is NIL, it twice retests A2 (unnecessarily, but harmlessly) and then correctly makes the output equal to (IF A1 D2 D0). In other words, this imperfect individual handles part of its environment correctly and part of its environment incorrectly. In particular, this father correctly handles the even numbered data bits and often incorrectly handles the odd numbered data bits.

The tree representing this male parent has 22 points. The crossover point was chosen at the second occurrence of the function IF. That is, the crossover fragment consists of the incorrect, underlined sub-expression (IF A2 D7 D3).

The female parent fro generation 8 (scoring 1920) was:

(IF A0 (IF A0 (IF A2 (IF A1 D7 (IF A0 D5 D0))
    (IF A0 (IF A1 (IF A2 D7 D3) D1) D0))
    (IF A1 D6 D4))
(IF A2 D4 (IF A1 D2 (IF A0 D7 (IF A2 D4 D0))))))

The tree representing this female parent has 40 points. The crossover point was chosen at the third occurrence of the function IF. That is, the crossover fragment consists of the italicized and underlined sub-expression. This sub-expression correctly handles the case when A0 it T by making the output equal to D7 when the address bits are 111, by making the output equal to D5 when the address bits are 101, by making the output equal to D3 when the address bits are 011, and by making the output equal to D1 when the address bits are 001. This female parent does not correctly do as well when A0 is NIL. In other words, this mother correctly handles the odd numbered data bits and incorrectly handles the even numbered data bits.

Thus, these two imperfect individuals contain complementary, coadapted portions which, when mated together, produce a 100% correct offspring individual.

As one traces the ancestry back, one encounters parents scoring generally fewer and fewer hits. And of course, as one goes farther back, one encounters more S-expressions that perform irrelevant, counterproductive, partially blind, and incorrect work.

Note that the result of the non-linear genetic algorithm is always inherently hierarchical. In addition, default hierarchies often emerge from the non-linear genetic algorithm. Default hierarchies incorporate partially correct sub-rules into a perfect overall procedure by allowing the partially correct sub-rules to handle the majority of the cases and by then dealing another way for certain specific cases. For example, in one run of the Boolean 6-multiplexer problem, we obtained the 100% correct solution:

(IF (AND A0 A1) D3 (IF A0 D1 (IF A1 D2 D0))).

This solution is a default hierarchy. In this expression, the output defaults to (IF A0 D1 (IF A1 D2 D0)); however, in the specific case when both address bits of the 6-multiplexer problem are 11, the output is the data bit D3. Default hierarchies are considered desirable in induction problems and classifier systems because they are often parsimonious and they are a human-like way of dealing with situations.

Planning Problem—Block Stacking

A simple illustrative problem in robotic planning involves rearranging uniquely labeled blocks in various towers from an arbitrary initial arrangement into an arbitrary specified new order on a single target tower. In the version of the problem involving 9 blocks, the blocks are labeled with the 9 different letters of "FRUITCAKE" or "UNIVERSAL." In the experiment here, the task is to automatically generate a general plan that solves this problem.

This problem is typical of many problems in artificial intelligence in that it is primarily symbolic. This problem illustrates the technique of associating LISP atoms with the state variables of a problem and of using functions and their side effects to alter the state space of a problem. This problem also illustrate the use of an iterative function DU ("Do Until").

Three lists are involved in the formulation of the problem. The GOAL-LIST is the ordered set specifying the desired final order in which the blocks are to be stacked in the target tower (i.e. "FRUITCAKE " or "UNIVERSAL"). The STACK is the ordered set of blocks that are currently in the target tower (where the order is important). The TABLE is the set of blocks that are currently not in the target tower (where the order is not important). The initial configuration consists of certain blocks in the STACK and the remaining blocks on the TABLE. The desired final configuration consists of all the blocks being in the STACK in the order specified by GOAL-LIST and no blocks being on the TABLE.

Three sensors dynamically track the environment in this problem. The sensor TB ("Top correct Block") dynamically specifies the CAR (i.e. first element) of the list which is the longest CDR (i.e. list of remaining elements) of the list STACK that matches a CDR of GOAL-LIST. The sensor NN ("Next Needed") dynamically specifies the next needed block for the STACK (i.e. the immediate predecessor of TB in GOAL-LIST). The sensor CS dynamically specifies the CAR of the STACK (i.e. the top block of the STACK).

Thus, the set of atoms available for solving the problem here is A={TB, NN, CS.} Each of these atoms is a variable that may assume, as its value, one of the 9 block labels or NIL.

The combined set of functions available for solving the problem here contains 5 functions F={MS, MT, DU, NOT, EQ.} The functions NOT and EQ are the usual Boolean Common LISP negation and equality function. The other three functions are described below.

The function MS ("Move to the Stack") has one argument. The S-expression (MS X) moves block X to the top of the STACK if X is on the TABLE. This function MS does nothing if X is already on the STACK, if the table is empty, or if X itself is NIL. Both this function and the function MT described below returns NIL if they do nothing and T if they do something; however, their real functionality is their side effects on the STACK and TABLE, not their return values.

The function MT ("Move to the Table") has one argument. The S-expression (MT X) moves the top item of the STACK to the TABLE if the STACK contains X anywhere in the STACK. This function MT does nothing if X is on the TABLE, if the STACK is empty, or if X itself is NIL.

The iterative operator DU ("Do Until") has two arguments. The S-expression (DU WORK PREDICATE) iteratively does the WORK until the PREDICATE becomes satisfied (i.e. becomes T). The DU operator is similar to the "REPEAT ... UNTIL" loop found in many programming languages. Note that the WORK and PREDICATE arguments are not evaluated outside the iterative DU operator and then passed to the DU operator when the DU operator is called. Instead, these arguments must be evaluated dynamically inside the DU operator on each iteration. First, the WORK is evaluated inside the DU operator. Then the PREDICATE is evaluated inside the DU operator. These two separate evaluations are performed, in sequence, using the LISP function EVAL inside the DU operator. Note that in an iterative construction, the execution of the WORK will almost always change some variable that will then be tested by PREDICATE. Indeed, that is usually the purpose of the loop. Thus; it is important to suppress premature evaluation of the WORK and PREDICATE arguments of the DU operator. The evaluation of arguments to the other iterative and summation operators described elsewhere in this article must be similarly postponed. The iterative function DU has an indexing variable II which is updated for each iteration.

Because the genetic computing paradigm described herein involves executing randomly generated computer programs, a number of computer implementation issues must be addressed. In particular, individual S-expressions in the genetic population will often contain an unsatisfiable termination predicate. Thus, it is a practical necessity (when working on a serial computer) to place limits on both the number of iterations allowed by any one execution of a DU operator. Moreover, since the individuals S-expressions in the genetic population often contain complicated and deep nestings of numerous DU operators, a similar limit must be placed on the total number of iterations allowed for all DU functions that may be evaluated in the process of evaluating any one individual S-expression for any particular environmental case. Thus, the termination predicate of each DU operator is actually an implicit disjunction of the explicit predicate argument PREDICATE and two additional implicit termination predicates. The typical "time out" limits that we have used in the problem herein are: (1) the DU operator "times out" if there have been more than 25 iterations for an evaluation of a single DU operator or (2) if there have been a total of more than 100 iterations for all DU operators that are evaluated for a particular individual S-expression for a particular environmental case. Of course, if we could execute all the individual LISP S-expression in parallel (as nature does) so that the infeasibility of one individual in the population does not bring the entire process to a halt, we would not need these limits. Note that even when a DU operator times out, it nevertheless returns a value. In particular, the DU operator evaluates to T unless one of the two implicit termination predicates times out. The value resulting from this evaluation of the DU operator is, of course, in addition to the side effects of the DU function on the state variables of the system (particularly the STACK and TABLE in the block-stacking problem). If the predicate of a DU operator is satisfied when the operator is first called, then the DU operator does no work at all and simply returns a T.

Note that the fact that each function returns some value under all conditions (in addition to whatever side effects it has on the STACK and TABLE) and the inherent flexibility of the LISP language guarantees that every possible individual S-expression can be executed and evaluated for any composition of functions and arguments that may arise.

The environment consists of millions of different environmental starting cases of N blocks distributed between the STACK and on the TABLE. The raw fitness of a particular individual plan in the population is the number of environmental starting cases for which the particular plan produces the desired final configuration of blocks after the plan is executed.

The computation of fitness in this problem (and indeed, in many genetic algorithm and adaptive systems problems) can be significantly shortened by consolidating various inherently similar initial configurations or by sampling. In particular, there are N+1 cases in which the blocks, if any, in the initial STACK are all in the correct order and in which there are no out-of-order blocks on top of the correctly-ordered blocks in the initial STACK. There are also N−1 additional cases where there is precisely one out-of-order block in the initial STACK on top of various number of correctly-ordered blocks in the initial STACK. In lieu of an environment of up to several million environmental starting cases, we constructed an environment consisting of (1) the 10 cases where the 0-9 blocks in the STACK are already in correct order, (2) the 8 cases where there is precisely one out-of-order block in the initial STACK on top of whatever number of correctly-ordered blocks, if any, happen to be in the initial STACK, and (3) a structured random sampling of 148 additional environmental starting cases with 0, 1, 2, . . . , 8 correctly-ordered blocks in the initial STACK and various random numbers 2, 3, 4, . . . out-of-order blocks on top of the correctly-ordered blocks. The complete structured random sampling used for this problem contained a total of 166 environmental starting cases so that raw fitness ranged over 167 values between 0 and 166. Obviously, this consolidation and sampling process must be done with some care to that the process is not misled into producing solutions that correctly handle the smaller environment and do not correctly handle the entire environment.

The first version of the block-stacking problem involves finding a general plan which can start with any of the environmental starting condition cases and can correctly stack the 9 blocks onto the STACK in the desired order and then stop.

The initial random population of plans have predictably low fitness. Many of these initial random plans were complicated, inefficient, pointless, or counter-productive. Typical random initial plans are plans such as (EQ (MT CS) NN) and (MS TB). This first plan unconditionally moves the top of the STACK to the TABLE and then performs the useless Boolean comparison between the sensor value NN and the return value of the MT function. The second plan (MS TB) futilely attempts to move the block TB (which already is in the STACK) from the TABLE to the STACK. Many initial random plans are so ill formed that they perform no action at all on the STACK and the TABLE. These plans achieve a raw fitness level of 1 (out of a maximum of 166) since they at least leave untouched the environmental starting case consisting of an already perfectly arranged STACK. Many other initial random plans are even more unfit and even disrupt a perfectly arranged initial STACK. These plans achieve a fitness level of 0. Some initial random plans achieve modest fitness levels such as 2, 3, etc. because they contain particular specific action sequences that happen to work on a small fraction of the environmental starting cases. For example, the plan from the TABLE to the STACK. This plan works in the four particular specific environmental starting cases where the initial STACK consists of 6, 7, 8 or 9 already correct blocks and no out-of-order blocks on the STACK.

After about five generations, there is usually one or more individuals in the population that can correctly handle the most simple N+1 (10) environmental cases in group (1) above (i.e. where the blocks, if any, in the initial STACK are all in the correct order and in which there are no out-of-order blocks on top of the correctly-ordered blocks in the initial STACK). Typically, these partially correct sub-plans (sub-goals) are not parsimonious; however, in a few runs, the parsimonious sub-plan (DU (MS NN) (NOT NN) emerged. This plan works by enlarging an initial STACK by iteratively moving needed blocks (NN) in the correct sequence from the TABLE onto the STACK until there are no more blocks needed to finish the STACK (i.e. the sensor NN is NIL). This sub-plan, or course, does not produce a correct final STACK if the blocks originally on the STACK were not correct, and thus, is incorrect in 157 of the 167 environment starting condition cases. Note that the fitness function reflects the affirmament of the sub-goal of correctly handling the 10 cases of 166 cases.

Thereafter, the performance of the best single individual in the population typically increases somewhat from generation to generation and correctly deals with a few more additional cases in the environment. At the same time, the overall average fitness of the population also tends to increase somewhat from generation to generation. After about ten generations, we often see one or more individuals in the population achieving a perfect score (that is, the plan produces the desired final configuration of blocks in the STACK for 100% of the initial environmental starting cases). These 100% correct plans are typically neither parsimonious nor efficient. The most common form for these 100% correct plans are plans, which when restated parsimoniously, are equivalent to:

(EQ (DU (MT CS) (NOT CS)) (DU (MS NN) (NOT NN))).

This overall plan consists of two sub-plans which are connected via the function EQ. The first subplan (DU (MT CS)) does the work of moving CS (i.e. the top of the STACK) to the TABLE until the top of the STACK becomes NIL (i.e. the predicate (NOT CS) becomes T). The second sub-plan does the work of moving the next needed block NN to the STACK until there is no remaining next needed block (i.e. the predicate (NOT NN) becomes T).

Note that the previously discovered, partially correct subplan (DU (MS NN) (NOT NN)) is part of the final solution. It became part of the final solution as a result of the crossover operation working on individuals chosen in proportion to fitness. In effect, this subplan became part of a default hierarchy created by crossover, which, in turn, was driven by fitness.

The particular 100% correct solution discovered above is highly inefficient in that it mindlessly removes blocks from the STACK that are already in the correct order on the STACK. It requires 2319 block movements over the 166 environmental starting cases. The most efficient way to solve this problem, in terms of minimizing total block movements, is to remove only the out-of-order blocks from the STACK and to then move the next needed blocks to the STACK. This approach can be accomplished with 1641 block movements over the 166 environmental starting cases.

We can simultaneously breed the population for both correctness and efficiency by using a new combined fitness measure that assigns the largest part of the weight to correctness (say 75%), and the remaining weight (say 25%) to efficiency. Specifically, 1641 block movements would be assigned the best share of the 25% of fitness assigned to efficiency. Any deviation (up or down) from 1641 would be penalized. Efficiency can be viewed as the work effort required or the amount of time required to solve the problem.

In one run, for example, the best individual from the initial random population (generation 0) performed correctly in only 1 of 166 environmental starting cases and involved a total of 6590 block movements. However, by generation 11, the best individual in the population was (DU (EQ (DU (MT CS) (EQ CS TB)) DU (MS NN)
(NOT NN))) (NOT NN))

Figure 15:
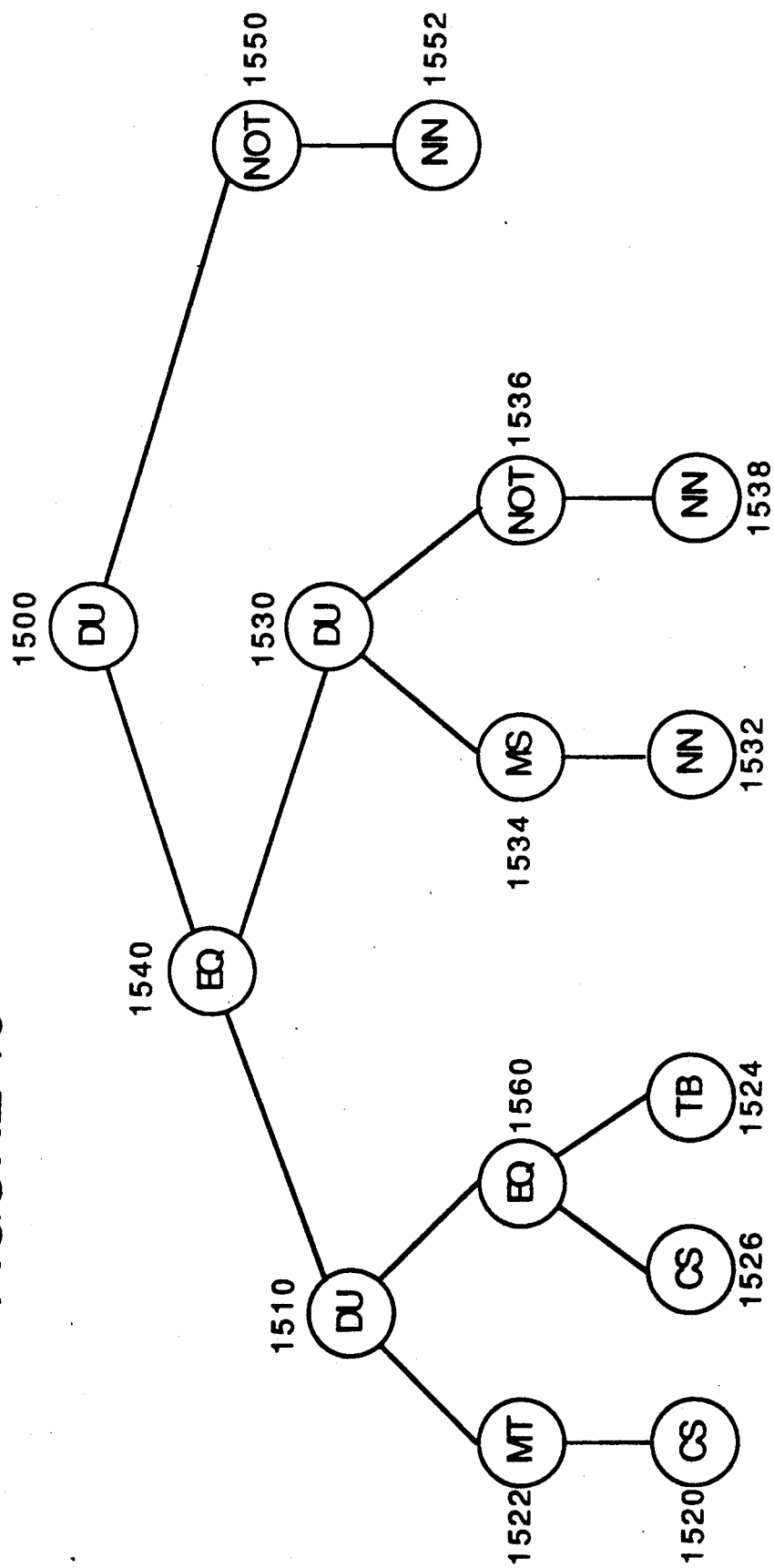
FIG. 15 is a diagram of a block stacking plan used to illustrate the planning problems solved by the present invention.

This plan is 100% correct and 100% efficient in terms of total block movements. It uses the minimum number (1641) of block movements to handle all 166 environmental starting cases. This plan is graphically depicted in FIG. 15.

In this plan, the sub-plan (DU (MT CS) (EQ CS TB)) at 1510 iteratively moves CS (the top block 1520) of the STACK to the TABLE (via the MT function at 1522) until the TB (top correct block 1524) equals CS (at 1526). Then, the sub-plan (DU (MS NN) (NOT NN)) at 1530 iteratively moves the next needed block (NN at 1532) to the STACK (via the MS function at 1534) until there is no longer any next needed block (that is, the predicate (NOT NN) at 1536 is satisfied).

Note that the function EQ at 1540 serves only as a connective between the two sub-plans. Note also that the outermost DU function 1500 performs no function (but does no harm) since the predicate (NOT NN at 1550) is satisfied at the same time as the identical predicate 1536 of the second sub-plan 1530. In that regard, it is similar to the approximately 99% of nucleiotide bases (out of approximately 2.87 billion) in a molecule of human deoxyribonucleic acid that never get expressed into protein.

We can also similarly breed the population for other secondary factors (such as parsimony). Parsimony is the succinctness of the S-expression. Thus, 25% of the weight in the fitness measure can be assigned to the S-expression (with shorter S-expressions receiving a better share of this 25%).

Planning Problem—Artificial Ant

Another illustrative example of a planning problem is the problem of an "artificial ant" attempting to traverse a trail.

The setting for the problem is a square 32 by 32 grid containing stones in 89 of the 1024 cells and nothing in the remaining cells. The trail is a winding trail of stones with single missing stones, double missing stones, a missing stone at some corners, double missing stones at some corners (knight moves), and triple missing stones at some corners (long knight moves).

An "artificial ant" begins at the cell identified by the coordinates (0,0) and is facing in a particular direction (e.g. east) at the beginning of the trail. The artificial ant has a sensor that can see only the single adjacent cell in the direction the ant is facing. At each time step, the ant has the capacity to execute any of four operations, namely, to move forward in the direction it is facing, to turn right (and not move), to turn left (and not move), or to do nothing. The grid is toroidal so that if the ant moves off the edge of the grid, it reappears and continues on the opposite edge.

The objective of the ant is to traverse the entire trail. As the ant moves into a particular cell with a stone, that stone is credited to the ant's account and the cell is then converted into a blank cell so that it is not counted again. The ant's expenditure of effort is measured by the ant's success in finding all 89 stones, the total amount of time required to find the stones, or a weighted average of these two factors. The ant's task is limited to a certain number of time steps which, if exceeded prior to finding all 89 stones, causes the ant to "time out."

This problem was originally presented and solved using conventional genetic algorithms using fixed-length strings of binary bits by Jefferson, Collins, et al. at the Second International Conference on Artificial Life held in Santa Fe, New Mexico in February, 1990. To solve this problem using conventional string-based genetic algorithms, a population of 65,536 individual bit strings of length 453 was processed on the Connection Machine computer using a genetic algorithm using crossover and mutation operating on a selected fraction of the population based on fitness.

Their objective was to find a finite automaton and a neural net that could solve the problem.

The finite automaton necessary to solve the problem was assumed to have 32 or fewer states and was represented by a binary string representing the state transition diagram of the automaton (and its initial state). The ant's sensory input at each time step was coded as one bit and the output at each time step was coded as two bits (for the four possible operations). The next state of the automaton was coded with 5 bits. The complete behavior of the automaton was thus specified with a genome consisting of a binary string with 453 bits (64 substrings of length 7 representing the state transitions and 5 additional bits representing the initial state of the automation). After 200 generations in a particular run, a single individual finite automaton emerged which attained a perfect score of 89 stones within the time limit of 200 operations.

Jefferson, Collins et al. were similarly successful in discovering a multi-layer recurrent neural net for this task using conventional string-based genetic algorithms.

The neural net necessary to solve the problem was assumed to have two processing units in the input layer (for the two possible sensory inputs of the ant), five processing units with 7 inputs each in the hidden layer, and four processing units with 7 inputs each in the output layer (for the four possible operations). The genome for encoding the neural net contained 520 bits representing the weights associated with the inputs, the thresholds, the initial activation levels of the processing units, and other information. The population size was again 65,536 individuals and the Connection Machine computer was used.

Note that Jefferson, Collins, et al. had to predetermine the maximum size of the finite automaton and neural net before they could use the conventional genetic algorithm using fixed length binary character strings to solve the problem.

In our approach to this task using non-linear genetic algorithms, the function set consisted of the functions {MOVE, TURN-RIGHT, TURN-LEFT, IFS, PROGN}. The first three functions have no arguments and operate via their side effects on the ant's state (i.e. its position on the grid or the facing direction). The IFS function has two arguments and returns the first argument if the ant's sensor senses a stone or, otherwise, returns the second argument. The PROGN function is the standard Common LISP connective function that merely sequentially evaluates its arguments (2 or 3) as a "program." The atom set was empty. We allowed 400 time steps before timing out. As can be seen, the movements and turns of the artificial ant are illustrative of the movements that a robot might need to perform tasks in response to sensory input that the robot senses from its robotic environment.

In one run (involving our usual population of 300 individuals), an individual scoring 89 out of 89 emerged on the 7th generation, namely, (IFS (MV) (PROGN (TRG) (IFS (MV) (TLF))
(PROGN (TLF) (IFS (MV) (TRG)) (MV)))).

Figure 16:
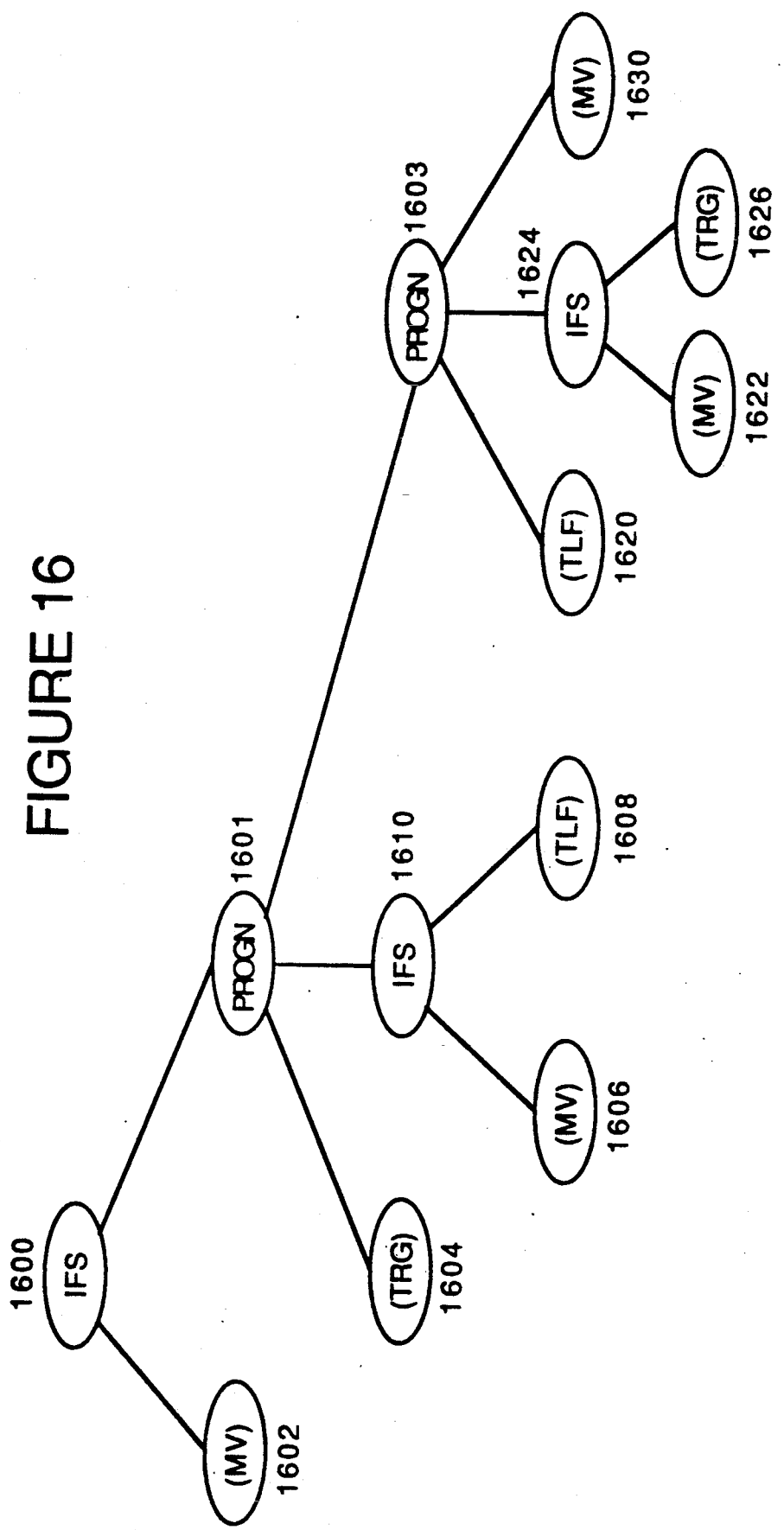
FIG. 16 depicts a plan for moving an "artificial ant" over a trail.

This plan is graphically depicted in FIG. 16.

This individual plan moves the ant forward (via the MV function at 1602) if a stone is sensed by the IFS function at 1600. Otherwise it turns right 1604 and then moves the ant forward 1606 if a stone is sensed, but turns left 1608, (returning to its original orientation) if no stone is sensed. The IFS function at 1610 controls these two choices. Then it turns left 1620 and moves forward 1622 if a stone is sensed (by 1624), but turns right (returning to its original orientation) if no stone is sensed 1626. The fifth operation occurring if the ant originally did not sense a stone (via the left-most IFS of the plan at 1600) is to move forward unconditionally 1630. Note that there is no testing of the backwards directions.

Game Playing

Figure 18:
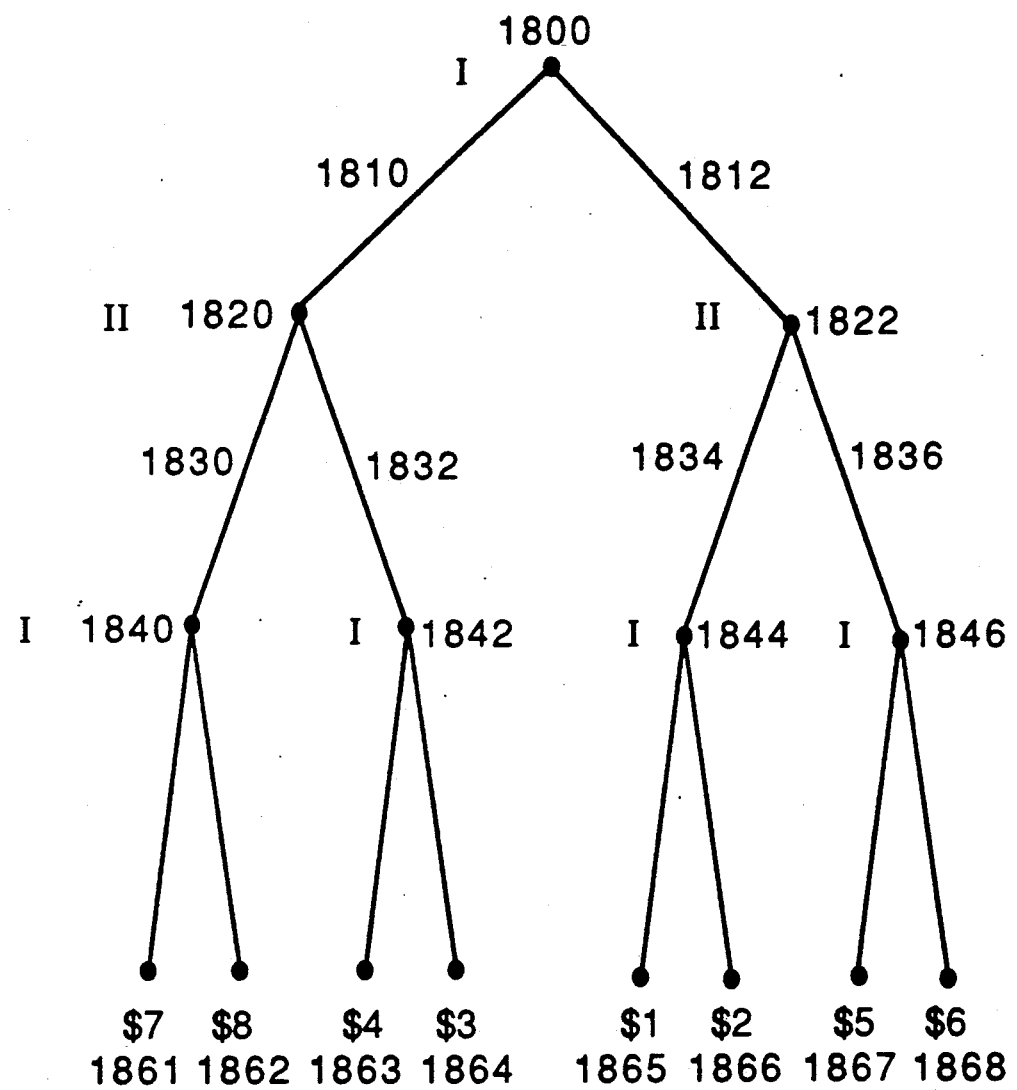
FIG. 18 shows a game tree used to present a method for game playing.

FIG. 18 shows a game tree. A game tree is a graphical way of presenting a game. The game in FIG. 18 is a simple illustrative game involving alternating play by two players who have two choices ("left" and "right") on each occasion when they have the opportunity to move.

The root 1800 of the tree is labeled with the player who is entitled to move at the beginning. The root 1800 of the game tree in FIG. 18 is labeled with player I. One line radiates downwards from the root of the tree for each possible move available to the player entitled to move at the beginning. In particular, the line 1810 on the left and the line 1812 on the right represent the two possible moves available to player I at the beginning of the game.

Similarly, each other internal point of the tree is labeled with the player who is entitled to move at that point in the game. In particular, if player I chooses to move to the left, the state of the game arrives at internal point 1820. Because this game involves alternating play by two players, point 1820 is labeled with player II. If player I chooses to move to the right, the state of the game arrives at internal point 1822.

Similarly, one line radiates downwards from each other internal point of the tree for each possible move available to the player entitled to move at that point in the game. In particular, if the state of the game is at point 1820 (because player I previously moved to the left on his first move), the line 1830 corresponds to player II choosing to move to the left whereas the line 1832 corresponds to player II choosing to move to the right. Similarly, if the state of the game is at point 1822 (because player I previously moved to the right on his first move), the line 1834 corresponds to player II choosing to move to the left whereas the line 1836 corresponds to player II choosing to move to the right.

As one moves deeper into the game tree, the game tree similarly describes the available moves in the game. Thus, the points 1840, 1842, 1844, and 1846 are the points where Player I can make his second move in the game. In this particular simple game, player II's second move is the last move of the game.

The external points (leaves, ending points) of the tree (1861, 1862, 1863, 1864, 1865, 1866, 1867, and 1868) show the payoff (to player I) if the game progresses to the end. For example, if player I moves left at the beginning of the game (at the root 1800), if player II moves to the right at point 1832, and if player I moves to the left at point 1842, then the external point 1863 will be reached. The payoff to player I is $4 for external point 1863.

The objective of player I in the game is to maximize his payoff. Note that, given player I's move to the left at the beginning, player II did the best he could by moving to the right on his move (at 1820) since that limited player I's payoff to either $4 (at 1863) or $3 (at 1864). Player I would then do his best by choosing the $4 (point 1863) by moving to the left on his second move at point 1842. If, after player I's first move to the left, player II had non-optimally moved to the left on his move (at 1820), payoffs of either $7 (at 1861) or $8 (at 1862) would then be available to player I. In particular, player I would then do his best by choosing the $8 (at 1862) by moving to the right on his second move at point 1840.

A "strategy" for a given player in a game is a way of specifying what move the player is to make at a particular point in the game form all the allowable moves at that time and given all the information about the state of the game that is available to the player at that time. Strategies for games may be expressed in several different ways. One way is to specify the player's moves in terms of every possible sequence of previous moves. This method is conceptually simple, but very tedious. Another way is to express the strategy in terms of the state of the game. This method is typical in board games (such as checkers or chess) where the current state of the board (not the particular sequence of moves that led to the current state of the board) is used for expressing the strategy for the subsequent move.

Another way of expressing a strategy for a game is to express the strategy in terms of various features of the current state of the game (e.g. control of the center of the board in checkers) rather than the entire state of the game (i.e. the board).

The best strategy for player I is that player I should move to the left of his first move. Then, if player II moved to the left on his move, player I should move to the right; and, if player II moved to right on his move, player I should move to the left. The best strategy for player II is that if player I moved to the left on his first move, player II should move to the right; and, if player I moved to the right on his first move, player II should move to the left.

We can approach the problem of generating the best strategy for player I by genetically breeding a population of game strategies for player I. A strategy for player I must unambiguously specify player I's move at each opportunity he has to move during the game. In particular, the strategy for player I must specify player I's move at the beginning of the game and it must also specify player I's move given either of the possible first moves by player II.

One possible set of functions that can be used for this problem consists of two functions XF1 and XF2, each with three arguments. As will be seen below, these functions allow the strategy to be expressed in terms of the sequence of previous moves that have occurred in the game. This particular approach is tedious. There are, of course, many alternative approaches for defining the strategy functions that could have been used. We can illustrate the operation of these functions by discussing the LISP S-expression that is the best strategy for player I in this game, namely, (XF1 L (XF2 L R L) (XF2 L L R)).

The function XF1 uses information about player I's first move to specify what move player I should make. The function is designed to produce a move in all cases, including the case where there is no information about player I's first move. The function XF1 chooses its first argument as player I's move if player I's first move is unspecified. This occurs when player I has yet to move (i.e. at the beginning of the game when it is player I's turn to move). The first argument is L. Thus, the best strategy for player I tells player I to move to the left at the beginning of the game. The function XF1 chooses its second argument as player I's move if player I's first move was to the left and chooses its third argument as player I's move if player I's second move was to the right. As it happens, in the best strategy for player I shown above, the second and third arguments of XF1 are themselves functions (in both cases, XF2 functions). Thus, it is necessary to evaluate those XF2 functions in order to determine player I's second move. In other words, in this game, player I's second move depends on both player I's first move and player II's intervening first move.

The function XF2 uses information about player II's move to specify what move player I should make. The function XF2 chooses its first argument as player I's move if player II's move is unspecified. This is the case prior to player II's move. The function XF2 chooses its second argument as player I's move if player II's move was to the left and chooses its third argument as player I's move if player II's move was to the right. If player I's first move was to the left, the best strategy for player I is for player I to move to the right if player II's move is to the left and to move to the left if player II's move is to the right. If player II's move was to the right, the best strategy for player II is for player I to move to the right if player II's move was to the left and for player I to move to the left if player II's move was to the right.

Note that regardless of whether player I has made his first move, and regardless of whether player II has made his first move, a move (R or L) is always unambiguously specified for player I. Moreover, regardless of how these particular two functions XF1 and XF2 may be combined, a move (R or L) is always unambiguously specified for player I. In the best strategy, the move specified for player I is his best move.

The best strategy for player I in playing this game has been discovered in various runs of the process described herein.

The process of finding a best strategy in a game can be facilitated by imposing additional structural limitations on the initial creation of S-expressions and by imposing additional structural limitations on the selection of the crossover points. In particular, for the game in the above example where plays alternate between two players, the root point of the S-expression should be limited to a function operating from the point of view of the player who is entitled to make the first move in the fame. In the particular example above, the function XF1 (but not the function XF2) would be appropriate for the root point of the tree. Similarly, points at the next level of the tree (which correspond to player II) would be limited to functions operating from the point of view of player II. Similarly, points at the next level of the tree (which correspond to player I) would be limited to functions operating from the point of view of player I.

When the crossover operation is being performed, the crossover operation should be restrained so as to preserve the structural limitation introduced at the time of creation of the initial population. There need not be any restriction of the selection of the crossover point in the first parent. However, once the crossover point in the first parent is selected, the selection of crossover point in the second parent should be limited to points in the second parent of the same type. In the particular case of the game in the above example, if the point chosen in the first parent belongs to player I, the crossover point for the second parent would then be limited to points belonging to player I.

In general, there are predetermined rules of construction which limit what functions can appear at particular points in the creation of the initial population. These rules of construction have the effect of limiting, in at least one situation, the choice of function that can appear at a particular point in the initial individuals of the population. Similarly, when crossover is being performed, these rules of construction have the effect of limiting, in at least one situation, the choice of crossover points for the second parent on the basis of which crossover point has already been chosen from the first parent.

A similar limitation was illustrated in the discussion of multiple regression (above) and neural net design (below). In the case of multiple regression, the rule of construction was particularly simple and succint, namely, the root of the tree had to be a LIST function.

Concept Formation

The problem of building up a knowledge base by inductive inference from examples and of acquiring structural knowledge about a domain in the form of concepts has received increasing attention as result of the emergence of knowledge-based expert system technology. Working in Australia, Quinlan has developed and inspired a particularly effective family of hierarchical classification systems for inducing a decision tree from a limited number of training case examples. In ID3 (and various other systems of the ID3 family), the goal is to partition a universe of objects into classes. Each object in the universe is described in terms of various attributes. The system is first presented with a set of training case examples which consist of the attributes of a particular object and the class to which it belongs. The system then generates a decision tree which hopefully can then be used to classify a new object correctly into a class using the attributes of the new object. The external points (leaves) of the decision tree are the eventual class names. The internal points of the decision tree are attributed-based tests which have one branch emanating from the decision point for each possible outcome of the test.

The induction of such decision trees for classifying objects can be approached by genetically breeding LISP S-expressions for performing this task. In particular, the set of atoms is the set of class names. The set of functions is the set of attribute-based tests. Each function has as many arguments as there are possible outcomes of that particular test. When a particular object is presented to the LISP S-expression (i.e. the decision tree), each function in the S-expression tests one attribute of the object and returns the particular one of its arguments designated by the outcome of the test. If the designated argument is an atom, the function returns the class name. When the S-expression is fully evaluated in LISP's usual left-oriented depth-first way, the S-expression as a whole thus returns a class name. That is, the S-expression is a decision tree that classifies the new object into one of the classes.

Figure 17:
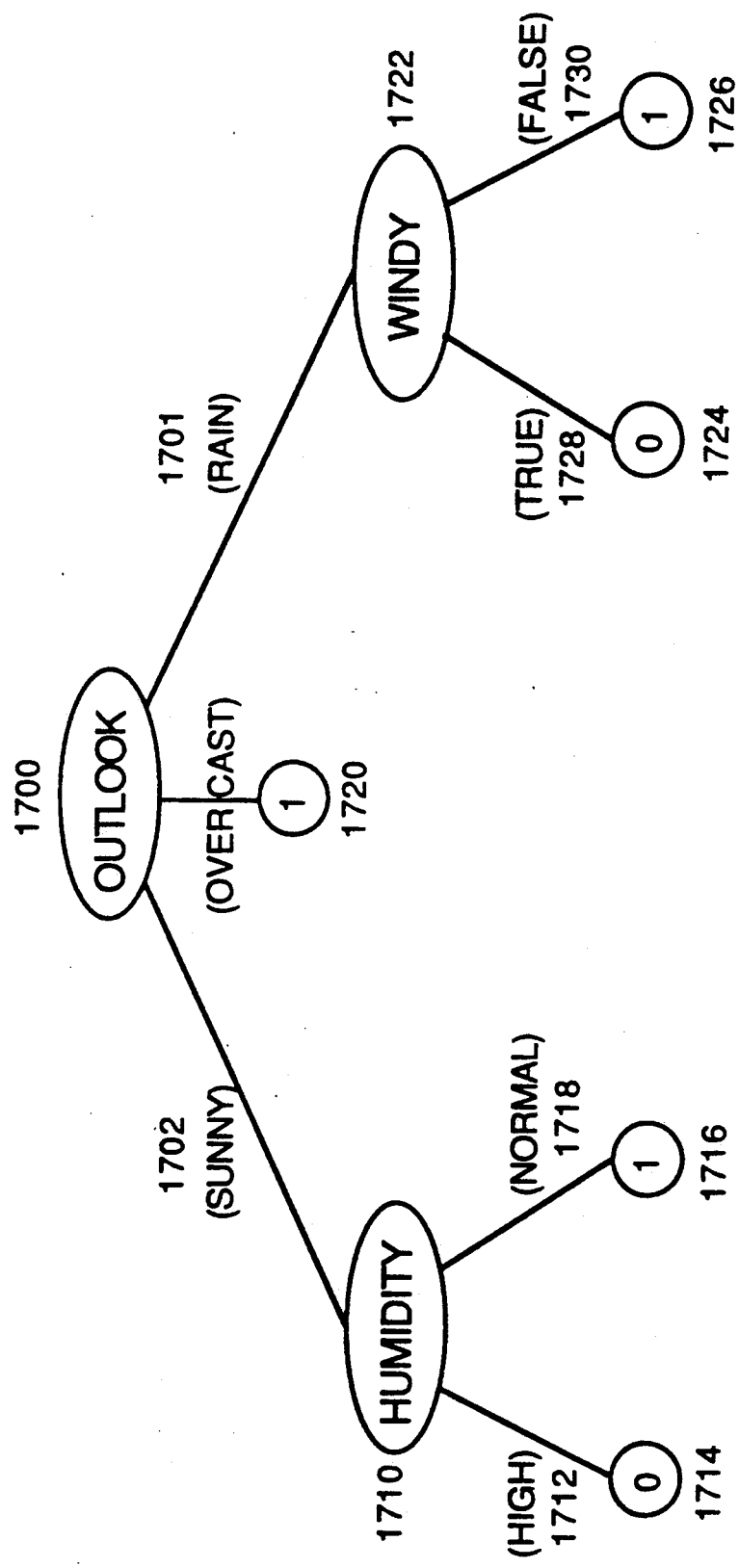
FIG. 17 is a decision tree illustrating a concept formation solution.

To demonstrate the technique of genetically inducing a decision tree, we apply this approach to the small training set of 14 objects presented by Quinlan in 1986. In Quinlan's problem, each object has four attributes and belongs to one of two classes ("positive" or "negative"). The attribute of "temperature", for example, can assume the possible values hot, mild, or cool. Humidity can assume the values of high or normal. Outlook can assume values of sunny, overcast, or rain. Windy can assume values of true or false. The decision tree presented by Quinlan as the solution for this problem is shown in FIG. 17.

If, for example, the OUTLOOK 1700 of a particular object is sunny 1702 and the HUMIDITY 1710 is high 1712, then that object is classified into class 0 (negative) 1714.

In order to genetically induce the decision tree, each of the four attributes in this problem is converted into a function. For example, the function "temperature" operates in such a way that, if the current object has a temperature of "mild," the function returns its second argument as its return value. The other attributes in this problem, namely "humidity", "outlook", and "windy", are similarly converted to functions. The function set for this problem is therefore F={TEMP, HUM, OUT, WIND} with 3, 2, 2, and 2 arguments, respectively. The atom set for this problem is A={0, 1} since there are two classes.

In one run, the LISP S-expression (OUT (WIND 1 0) (WIND 1 1) (HUM 0 1)

emerged on the 8th generation with a maximal fitness value of 14 (i.e. it correctly classified all 14 training cases). Noting that (WIND 1 1) is equivalent to just the atom 1, this S-expression is equivalent to the decision tree 1700 presented by Quinlan using ID3.

Automatic Programming

The problem of automatic programming requires developing a computer program that can produce a desired output for a given set of inputs.

For this experiment, the problem is to solve the quadratic equation $x^2+bx+c=0$ for a complex-valued root. The available functions were multiplication, subtraction, a modified division operation %, and a square root function $\sqrt{}$. The modified division function % returns 0 when division by zero is attempted. The square root function $\sqrt{}$ returns a LISP complex number. Thus, for example, $(\sqrt{}\ -4)$ calls for the square root of $-4$ and would evaluate to the LISP complex number #C(0, 2), which is equivalent to 0+2i.

The environment consisted of a suite of 10 quadratic equations (with some purely real roots, some purely imaginary roots, and some complex-valued roots). For each of the 10 equations in the environment, a given individual S-expression was evaluated to obtain a (generally) complex number. The square root of the square of the real part of the complex number produced by the individual LIPS S-expression and the square of the imaginary part of the complex number produced by the individual LISP S-expression was computed. These distance values were then summed over the 10 quadratic equations in the environmental test suite to obtain the fitness value of the given S-expression.

In one run, a correct solution to the problem emerged at generation 22, namely, the S-expression $(-(\sqrt{}(-(*(\% B2)(\% B2))C))(\% B2))$, which is equivalent to the well-known solution.

The problem of finding primes illustrates a third iterative control structure, namely, an operator equivalent to the "LOOP FOR" found in many programming languages. A prime number is a positive integer which is evenly divisible only by itself and one. The problem of finding primes can be viewed as finding a function over the positive integers that returns the number of divisors. If the number of such divisors is greater than two, then the number is not a prime (i.e. it is a composite number). If the number of such divisors is two (or perhaps one, depending on how one handles the argument one), then the number is a prime. If the test suite is the first 64 integers, then the space of possible two-valued functions for this problem is of size $2^{64}$.

Two approaches to this problem were used. In both approaches, the atom J is an integer between 1 and 64. The objective is to determine whether J is a prime. An assignable variable CNC is available and it is initially zero. In both approaches, the function CZ is available. The function (CZ J M) adds one to CNC if J modulo M is zero.

In the first approach, an iterative operator DUL was used. The DUL operator is equivalent to the "FOR" loop found in many programming languages, whereas the DU operator is equivalent to the "REPEAT . . .

UNTIL" loop and the SIGMA operator is equivalent to the $\Sigma$ notation for infinite series in mathematics. The operator DUL ("Do-Until-Loop") has two arguments, namely, the work WORK and the number of iterations NLOOP to be performed. It is similar to the previously described interactive operator DU ("Do-Until") and the previously described iterative summation operator SIGMA in that an iteration variable II is available inside the DUL operator for possible incorporation into the WORK argument or the NLOOP argument and in that "time out" limits must be established for this operator.

The combined set of functions and atoms for this first approach is C={DUL, CZ, J, II}. If an S-expression returned a value that was not greater than 2, it is deemed to be a prime. Otherwise, it is deemed to be a composite number. Fitness is the number of integers between 1 and 64 that were correctly classified. The S-expression (DUL (CZ J II) J) is a parsimonious and completely correct solution to this problem. This solution was obtained in several runs of the program.

In the second approach, the only operative function available was CZ. The passive function PROGN was included in the set of available functions to allow a sequence of functions to be performed. The available atoms were J, CNC, and the integers up to 8 (i.e. the square root of 64). An appropriate sequence of CZ functions with appropriate arguments can thus functions as a sieve. Moreover, partially correct structures can easily develop. In one run, (CZ J2) appeared as the best individual of generation 0. Then, (PROGN (CZ J2) (CZ J7) CNC) appeared with slightly better fitness. Then, (PROGN (CZ J3) 7 (PROGN (CZ J2) (CZ J7) CNC)) appeared with even better fitness. Finally, (PROGN (CZ (PROGN (CZ J3) 5 J) 5) 7 (PROGN CZ J2) CZ J7) CNC)) appeared in generation 5. This S-expression is as close to a solution as is possible with the available atoms and functions.

Pattern Recognition

A simple illustrative problem in pattern recognition involves the problem of translation-invariant recognition of a one-dimensional shape in a linear binary retina (with wrap-around). In the simplified experiment here, the retina has 6 pixels (with wrap-around) and the shape consists of three consecutive binary 1's. Thus, 001110, 000111, and 100011 are among 6 possible instances of the shape.

The functions available are a zero-sensing function H0, a one-sensing function H1, ordinary multiplication, and a disjunctive function U. The atoms available are the integers 0, 1, and 2, and a universally quantified atom k. The function H0 (or H1) takes two arguments and returns the integer 1 if there is a 0 (or 1) in the position equal to the sum of the two arguments (module the retina length) and returns the integer 0 otherwise. Thus, one argument of these functions can potentially serve as a positional pointer and the other can potentially serve as a displacement. The universally quantified atom k assumes all integral values over the retinal length. The disjunctive function U takes two arguments and returns the integer 1 if either argument is non-zero and returns the integer 0 if both arguments are 0. The ordinary multiplication function * serves as a conjunctive function and returns the integer 1 if all arguments are non-zero and returns the integer 0 if any argument is 0.

The functions U and * so defined resolve potential type problems that would otherwise arise when integers identify positions in the retina. Although LISP is comparatively tolerant as to typing, pattern recognition problems seem to require the ability to freely combine numerical concepts such as positional location (either absolute or universally quantified) and relative displacement (e.g. the symbol 2 pixels to the right) with Boolean concepts (e.g. a particular disjunctive and conjunctive combination of features indicates a particular shape). One does not want to specify or restrict a priori the kind of combination of functions available to solve the problem.

Initial random individuals include contradictions such as (*(H0 2 2) (H1 2 2)), inefficiencies such as (U (H0 2 1) (H0 1 2)), irrelevancies such as (U (H0 0 0) (H1 2 0)), and nonsense such as (U 2 (*k (H1 0 0))). In one particular run, the number of mismatches for the best individual of generation 0 was 48 and rapidly improved to 40 for generations 1 and 3. It then improved to 0 mismatches in generation 3 for the individual (*1 (*(H1 K 1) (H1 K 0) (H1 K 2)) 1). Ignoring the extraneous outermost conjunction of two 1's, this individual returns a value of the integer 1 if and only if a binary 1 is found in the retina in positions 0, 1, and 2 (each displaced by the same constant k).

Neural Net Design

Neural networks are networks containing linear threshold processors at the internal points in the network. Some of the external points of the network are designated as inputs. One (and sometimes more) of the external points of the network are designated as outputs. The lines connecting the various points of the network (except typically for the lines going to the external point designated as outputs) are all weighted. That is, the signal on that line is multiplied by a constant value (typically in a range such as between $-1.00$ and $+1.00$) as it passes along that line. The lines all have a direction. That is, each line connecting two points begins at one point (which can be an internal point or an external "input" point) and ends at another point (which can be an internal point or an external "output" point).

A wide variety of neural networks appear in the existing literature. Some neural nets receive only digital input signals (typically binary 0 or 1 signals) while others process analog data. In some simple neural nets (originally called "perceptrons"), there was only one linear threshold processing element between the input to the net and the output. That is, the neural net had only one layer. Most neural net research today is involved with neural nets with more than one layer of processing elements between the input and the output. In most neural nets described in current literature, the processing elements are arranged in clearly defined layers such that the output of a processing element from one layer feeds into one, many, or all of the processing elements of the next layer (but never back to a processing element of the same or earlier layer). On the other hand, so-called "recurrent" neural nets allow the output of a processor to be connected anywhere, including feeding back to earlier processors or itself.

Neural nets have the common feature of having linear threshold processing elements at the internal points. These processing elements emit a signal from a discrete set of possibilities (typically just 0 or 1) if the sum of the weighted inputs to the processor exceeds a certain threshold value T. That is, the output $O_j$ of the linear threshold processing element j is set to 1 if:

$$\sum_{i=1}^{N} w_{ij} S_{ij} \geq T_j \text{ (otherwise } O_j = 0\text{)}$$

Where $S_{ij}$ is the i-th signal to processing element j, where $w_{ij}$ is the i-th weight to processing element j, and where $T_j$ is the threshold for processing element j. In many (but not all) neural nets described in the literature, the threshold $T_j$ is the same for all processing elements (typically 1) and does not change with time. Some neural nets have one extra input signal to each processing element (called the bias) to provide a constant additional value as input.

Although there are many variations in the details of neural nets, the overall goal typically is to have the neural net learn to perform some task. Usually, this learning is done by training the neural net on a number of training cases and then hoping that it has learned to perform the task well enough so that it can correctly perform the task when it encounters previously unseen cases of the same general problem task. There are a number of different training paradigms in use. Sometimes the neural net is expected to be "self organizing."

The process of designing a neural net to perform a particular task thus primarily involves determining the size of the neural net, the way that the processing elements connected to one another, determining the weights (and sometimes the thresholds and biases) associated with each connection that feeds into a processing element.

Most existing neural net training paradigms start with a fixed arrangement of processing elements (i.e. a specified number of processing elements arranged in a specified way into layers) and then progressively modify the weights (and occasionally the thresholds and biases) so that the neural net becomes able to produce a correct output value when presented with particular input values.

The problem of designing neural nets can be solved in a more flexible and general way using genetic techniques. In the genetic approach, the size of the neural net, the connections in the neural net, and the weights (and thresholds and biases) can all be genetically discovered. In the simple example below, we show how to do this. (In the simple example, the thresholds are all assumed to be 1.0 and there are no biases; however, it will be seen that these secondary attributes can also be genetically discovered, if desired, by proceeding in the same way merely by adding these secondary attributes into the argument list for the processing element function).

The set of functions contains the linear threshold processing function P. This function appears in the set of functions with varying numbers of arguments (e.g. perhaps 2, 3, 4, etc.). The set of functions also contains multiplication (*) and other arithmetic functions (such as addition, subtraction and division).

The set of arguments contains the data input to the problem. In this simple example, we will assume that there is only one output signal from the neural net. (If there were more than one output signal, the techniques described in the earlier discussion of multiple regression would be used to handle multiple output signals). Random constants ("R") will be used in the initial population of individuals. Thus, the possible initial individuals would include individuals such as (P (*D1 1.423) (*D0 −1.037)).

The problem of designing neural nets is similar to the game playing problem and the multiple regression problem in that there are rules of construction that limit what structures are allowed in the initial population of individuals. In addition, the crossover operation is restrained (in the same way as in the game playing problem and multiple regression problem) so that only structures that comply with the rules of construction can emerge from the crossover operation.

In the case of the simple neural net example, the rules of construction specify that the root of the tree (i.e. the function appearing just inside the left-most parenthesis of the LISP S-expression) must be a "P" function. It cannot be a multiplication, another arithmetic operation, or a random constant. Moreover, the function at the next level below a processing function P must be a multiplication (*) function. At the next level below the multiplication, there can be atoms (input signals, such as D0 and D1), any arithmetic operation (addition, subtraction, division, or multiplication), random constants, or another P function. At the next level below another arithmetic operation (whether addition, subtraction, multiplication, or division), there can be atoms (i.e. input signals such as D0 or D1), any arithmetic operation, random constants, or another P function. However, once a P function appears, the rules of construction require that the function on the next function below the P function again be a multiplication function. These rules are repeatedly recursively until a full tree is constructed. The full tree has external points that are either input signals (i.e. D0 or D1) or random constants.

It will be noted that the resulting tree (or S-expression) is a structure that is a neural network. It consists of linear threshold processing elements (the "P" functions) that process weighted inputs to produce a single discrete signal (typically 0 or 1) as the output. The number of inputs to a processing element (P function) can vary; however, the inputs always consist of weighted input signals. These input signals can be the output of other processing elements or can be the inputs to the network from the outside world. (Note that the define building block preparation provides a means for connecting the output of one processing element to more than one subsequent processing element).

Figure 22:
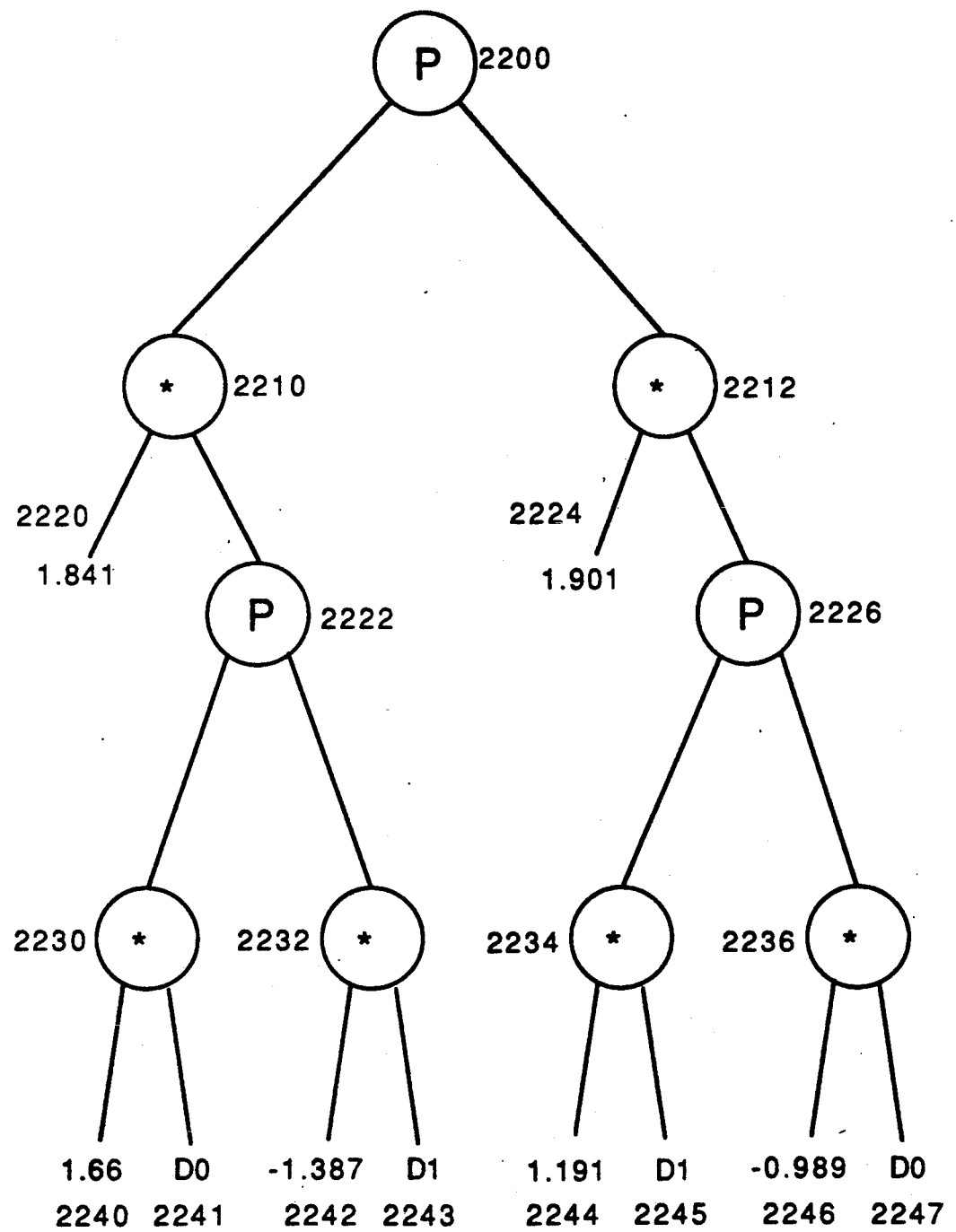
FIG. 22 illustrates a tree representation of a LISP program for a simple neural net.

FIG. 22 shows a LISP S-expression (rooted tree) to illustrate these rules of construction. The root of the tree 2200 contains the linear threshold processing function P. This particular occurrence of the function P has two arguments. The functions at the next level below the P function are multiplication (*) functions in all cases. There is a multiplication function at both 2210 and 2212. Below the multiplication function 2210, there is a random constant 1.841 at the external point 2220 of the tree. Below the multiplication function 2210, there is a P function at internal point 2222. Since there is a P function at internal point 2222, there must be multiplication functions at the level below the P function. Thus, there is a multiplication function at both 2230 and 2232. Below the multiplication function at 2230, there is another random constant (1.66) at external (leaf) point 2240 and there is an input signal D0 at external (leaf) point 2241.

Let us consider the following simple task to further specify the design of a neural net using genetic techniques. Suppose there are two binary inputs D0 and D1. The goal is to design a neural net to perform the task of performing the exclusive-or logical operation on the two inputs. That is, we want a neural net that will produce an output of 1 if either (but not both) of the inputs D0 or D1 are 1, and will produce an output of 0 if otherwise. That is, the output will be zero if the two inputs are either both 0 or both 1.

The following individual emerged on the 42nd generation of one run as a neural net that 100% correctly performs the task of the exclusive-or logical function:

| (P | (* 1.841 | (P | (* 1.66 D0) |
| | | | (* −1.387 D1)))|
| | (* 1.901 | (P | (* 1.191 D1) |
| | | | (* −0.989 D0)))).|

Note that this S-expression appears in FIG. 22.

Figure 23:
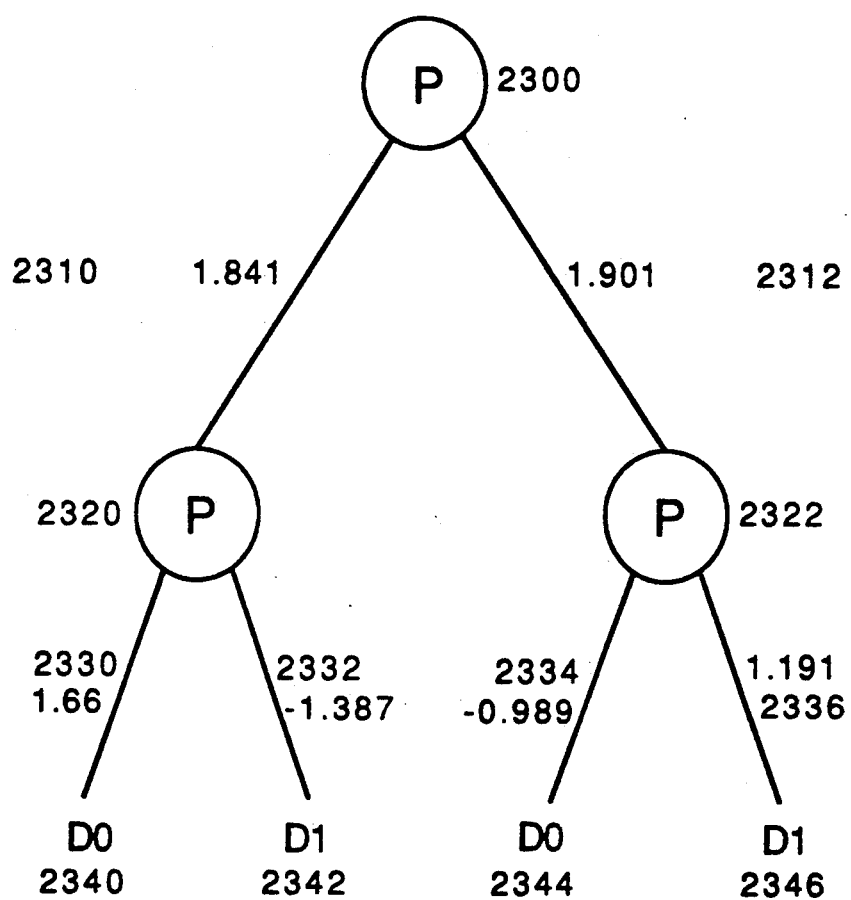
FIG. 23 illustrates a neural net used to perform the exclusive-OR (XOR) task.

FIG. 23 presents the correct solution found by the genetic process for the exclusive-or task in the form that one would typically see in neural network literature. This neural net corresponds to the LISP S-expression presented above and shown in FIG. 22.

In FIG. 23, the input signal D0 at 2340 is weighted by 1.66 at 2330 as the first line into processing element P at 2320. The input signal D1 at 2342 is weighted by −1.387 at 2332 as the second line into processing element P at 2320. Since the inputs D0 and D1 are either 0 or 1, the first line into 2320 is either 0 or 1.66 in value. Similarly, the second line into 2320 is either 0 or −1.387 in value. The processing element P at 2320 adds up the weighted input lines and emits a 1 if the sum exceeds 1 and emits a 0 if otherwise. If D0 and D1 are both 0, the sum of the inputs will be 0 (which is less than the threshold of 1) and, therefore, P will emit 0. If D0 is 1 and D1 is 0, the sum will be 1.66 and P will emit a 1. If D0 is 0 and D1 is 1, the sum will be −1.387 and P will emit a 0. If both D0 and D1 are 1, the sum will be 0.273, which is less than the threshold of 1, and P will emit a 0. In other words, P at 2320 emits a 1 if and only if the input lines are 10.

In effect, the processing element at 2320 is a detector for a single special case when the inputs are 10.

There are two signal lines to the processing element P at 2322. The input signal D0 at 2344 is weighted by −0.989 at 2334 to become one of the two signal lines into processing element P at 2322. The input signal D1 at 2346 is weighted by 1.191 at 2336 to become the second of the two signal lines into processing element P at 2322. When D0 and D1 are both 0, the sum of the signals into P at 2322 is 0 as it will emit a 0. When D0 and D1 are both 1, the sum of the signals into P at 2322 is 0.196, which is less than the threshold of P, and P will emit a 0. If D0 is 0 and D1 is 1, the sum of the signals into P at 2322 is 1.191 and P will emit a 1. If D0 is 1 and D0 is 0, the sum of the signals into P at 2322 is −0.989 and P will emit a 0. In summary, P at 2322 will emit a 1 if and only if the input signals are 01.

The output of the processing elements at 2320 and 2322 are either 0 or 1. The output of P at 2320 is weighted by 1.841 at 2310 and the output of P at 2322 is weighted by 1.901 at 2312. These two weighted values are the signal lines into processing unit P at 2300. It can be seen that the effect of these weights is that the sum exceeds 1 if and only if either signals coming along the lines 2310 or 2312 or both are non-zero. This occurs if the input signals D0 and D1 are either 01 or 10. In other words, the output of processing unit P at 2300 is 1 if either (but not both) D0 or D1 are 1 and 0 otherwise. That is, unit P at 2300 performs the exclusive-or logical task.

Note that in performing the crossover operation, any point may be chosen in the first parent. Having chosen this point, the point in the second parent should be of the same "type", where the relevant "types" for this problem are (1) processing element points, (2) multiplications just below processing element points, and (3) all other points. This is the same principle that applies to the crossover in the game playing and multiple regression problems.

Note that entire arithmetic expressions are often created below the multiplications that are just below the processing elements P.

The specific arrangements and methods herein are merely illustrative of several applications of the principles of this invention. Numerous modifications in form and detail may be made by those skilled in the art without departing from the true spirit and scope of the invention. Thus, a genetic algorithm process for problem solving is described.

Although this invention has been shown in relation to particular embodiments, it should not be considered so limited. Rather it is limited only by the appended claims.

What is claimed is:

1. In a computer system having a population of programs of various sizes and structures wherein each program is a hierarchical arrangement of functions and arguments, an iterative process for finding a composition of functions whose performance is a good fit, best fit or perfect fit to a sample of data, said process comprising iterations of a series of steps, each iteration comprising the steps:

executing each said program to produce a result;

assigning a value to each said result and associating each said value with a corresponding program which produced each said result, said value indicative of the closeness of the fit of said corresponding program to said sample of data;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

2. In a computer system having a population of programs of various sizes and structures wherein each program is a hierarchical arrangement of functions and arguments, an iterative process for finding a composition of functions whose performance is a good fit, best fit or perfect fit to the integral of a curve associated with a sample of data, said process comprising iterations of a series of steps, each iteration comprising the steps:

executing each said program to produce a result;

assigning a value to each said result and associating each said value with a corresponding program which produced each said result, said value indicative of the closeness of the fit of said corresponding program to the integral of said curve associated with said sample of data;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

3. In a computer system having a population of programs of various sizes and structures wherein each program is a hierarchical arrangement of functions and arguments, an iterative process for finding a composition of functions whose performance is a good fit, best fit or perfect fit to the derivative of a curve associated with a sample of data, said process comprising iterations of a series of steps, each iteration comprising the steps:

executing each said program to produce a result;

assigning a value to each said result and associating each said value with a corresponding program which produced each said result, said value indicative of the closeness of the fit of said corresponding program to the derivative of said curve associated with said sample of data;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

4. In a computer system having a population of programs of various sizes and structures wherein each program is a hierarchical arrangement of functions and arguments, an iterative process for finding a composition of functions whose performance is a good solution, best solution or perfect solution to a differential equation and its associated initial condition, said process comprising iterations of a series of steps, each iteration comprising the steps:

executing each said program to produce a result;

assigning a value to each said result and associating each said value with a corresponding program which produced each said result, said value indicative of the closeness of said corresponding program in satisfying said differential equation and its associated initial condition;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

5. In a computer system having a population of programs of various sizes and structures wherein each program is a hierarchical arrangement of functions and arguments, an iterative process for finding a composition of functions whose performance is a good solution, best solution or perfect solution to an integral equation, said process comprising iterations of a series of steps, each iteration comprising the steps:

executing each said program to produce a result;

assigning a value to each said result and associating each said value with a corresponding program which produced each said result, said value indicative of the closeness of said corresponding program in satisfying said integral equation;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

6. In a computer system having a population of programs of various sizes and structures wherein each program is a hierarchical arrangement of functions and arguments, an iterative process for finding a composition of functions whose performance is a good fit, best fit or perfect fit to the inverse function for a sample of data, said process comprising iterations of a series of steps, each iteration comprising the steps:

executing each said program to produce a result;

assigning a value to each said result and associating each said value with a corresponding program which produced each said result, said value indicative of the closeness of the fit of said corresponding program to the inverse function for said sample of data;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

7. In a computer system having a population of programs of various sizes and structures wherein each program is a hierarchical arrangement of functions and arguments, an iterative process for finding a composition of functions whose performance is a good solution, best solution or perfect solution to a mathematical equation, said process comprising iterations of a series of steps, each iteration comprising the steps:

executing each said program to produce a result;

assigning a value to each said result and associating each said value with a corresponding program which produced each said result, said value indicative of the closeness of said corresponding program in satisfying said mathematical equation;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

8. In a computer system having a population of programs of various sizes and structures wherein each program is a hierarchical arrangement of functions and arguments, an iterative process for finding a correct function associated with a particular combination of arguments by reference to a sample of functional results associated with sample combinations of arguments, said process comprising iterations of a series of steps, each iteration comprising the steps:

executing each said program to produce a result;

assigning a value to each said result and associating each said value with a corresponding program which produced each said result, said value indicative of the similarity between said result of said corresponding program and said sample functional results;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program can at least a portion of said other program, said new program can differ in size and shape from said selected program and said other program;

retaining said selected program such that said selected program remains unchanged if said chosen operation is reproduction; and adding said new program to said population.

9. In a computer system having a population of programs of various sizes and structures wherein each program is a hierarchical arrangement of functions and arguments, an iterative process for finding a best plan of action to achieve a desired result given an arbitary initial state, said process comprising iterations of a series of steps, each iteration comprising the steps:

executing each said program to produce a result;

assigning a value to each said result and associating each said value with a corresponding program which produced each said result, said value indicative of the closeness of the performance of said corresponding program to said desired result;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

10. In a computer system having a population of programs of various sizes and structures wherein each program is a hierarchical arrangement of functions and arguments, an iterative process for developing a strategy for playing a game, said process comprising iterations of a series of steps, each iteration comprising the steps:

executing each said program to produce a result;

assigning a value to each said result and associating each said value with a corresponding program which produced each said result, said value indicative of the performance of said corresponding program in playing said game;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

11. In a computer system having a population of programs of various sizes and structures wherein each program is a hierarchical arrangement of functions and arguments, an iterative process for automatically generating a computer program capable of producing a desired output, said process comprising iterations of a series of steps, each iteration comprising the steps:

executing each said program to produce a results;

assigning a value to each said result and associating each said value with a corresponding program which produced each said results, said value indicative of the closeness of the performance of said corresponding program to producing said desired output;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

12. In a computer system having a population of programs of various sizes and structure wherein each program is a hierarchical arrangement of functions and arguments, an iterative process for recognizing a pattern in input data, said process comprising iterations of a series of steps, each iteration comprising the steps:

executing each said program to produce a result;

assigning a value to each said result and associating each said value with a corresponding program which produced each said result, said value indicative of the performance of said corresponding program in recognizing said pattern;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of program if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

13. In a computer system having a population of programs of various sizes and structure wherein each program is a hierarchical arrangement of functions and arguments, an iterative process for generating a decision tree for classifying an object by reference to a sampling of relationships between attributes associated with an object and classifications associated with an object, said process comprising iterations of a series of steps, each iteration comprising the steps:

execting each said program to produce a result;

assigning a value to each said result and associating each said value with a corresponding program which produced each said result, said value indicative of the similarity between said result of said corresponding program and said sampling of relationships;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

14. In a computer system having a population of programs of various sizes and structures wherein each program is a hierarchical arrangement of functions and arguments, an iterative process for designing a neural network for performing tasks, said process comprising iterations of a series of steps, each iteration comprising the steps:

executing each said program to produce a result;

assigning a value to each said result and associating each said value with a corresponding program which produced each said result, said value indicative of the performance of said corresponding program in performing said task;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

15. In a computer system having a population of programs of various sizes and structures wherein each program is a hierarchical arrangement of functions and arguments or a randomly generated constant appropriate to the domain of a problem, an iterative process for problem solving, said process comprising iterations of a series of steps, each iteration comprising the steps:

executing each said program to produce a result;

assigning a value to each said result and associating each said value with a corresponding program which produced each said result, said value indicative of the fitness of said corresponding program in solving or partially solving a problem;

selecting at least one selected program from said population using selection criteria, said selection criteria based on said value associated with each said program, said selection criteria preferring each said program having a relatively high associated value over each said program having a relatively low associated value;

choosing and performing an operation wherein each chosen operation is one of the operations of crossover or reproduction;

creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program;

retaining said selected program such that said selected program remains unchanged if said chosen operation is reproduction; and adding said new program to said population.

16. The process in claims 1, 2, 3, 4, 5, 6, 7, 8, 9, 10, 11, 12, 13, 14, or 15 wherein said step of choosing and performing an operation further comprising an operation of define building block such that if said chosen operation is said define building block operation, a step of define building block occurs before said adding step, wherein a portion of said selected program is replaced by an invocation of a building block function, said building block function being defined as the hierarchical arrangement of functions and arguments originally associated with said selected portion of said selected program.

17. The process in claims 1, 2, 3, 4, 5, 6, 7, 8, 9, 10, 11, 12, 13, 14, or 15 wherein said step of choosing and performing an operation further comprising an operation of editing such that if said chosen operation is said editing operation, a step of editing occurs before said adding step, wherein said selected program is edited, such that predetermined editing rules are applied to said selected program to produce a modified hierarchical structure of said selected program.

18. The process in claims 1, 2, 3, 4, 5, 6, 7, 8, 9, 10, 11, 12, 13, 14, or 15 wherein at least one said program in said population includes an assignment function, wherein a value is computed and a name is associated with said value, said value can be referenced by other said programs in said population using said name.

19. The process in claims 1, 2, 3, 4, 5, 6, 7, 8, 9, 10, 11, 12, 13, 14, or 15 wherein at least one said program in said population includes an iteration function, wherein a portion of said program is performed repeatedly until a predicate condition is satisfied.

20. The process in claims 1, 2, 3, 4, 5, 6, 7, 8, 9, 10, 11, 12, 13, 14, or 15 wherein at least one said program in said population includes an iteration function, wherein a portion of said program is performed repeatedly until a specified number of iterations is completed.

21. The process in claims 1, 2, 3, 4, 5, 6, 7, 8, 9, 10, 11, 12, 13, 14, or 15 wherein at least one said program in said population includes a recursion function, wherein a portion of said program is performed recursively until a base condition is reached.

22. The process in claims 1, 2, 3, 4, 5, 6, 7, 8, 9, 10, 11, 12, 13, 14, or 15 wherein an individual program in said population attaining a pre-established value of fitness with respect to solving a problem is designated as a solution to said problem, said process including the step of translating said program representing a solution to said problem into a different programming language while maintaining the logical consistency of said program representing a solution to said problem.

23. The process in claims 1, 2, 3, 4, 5, 6, 7, 8, 9, 10, 11, 12, 13, 14, or 15 wherein an initial population of programs is created, said programs consisting of hierarchical arrangements of functions and arguments available for a particular problem, said hierarchical arrangements being constructed according to predetermined rules of construction which place a limit on which functions can occur at particular points in said hierarchical arrangement.

24. The process in claim 23 wherein said crossover operation is restrained such that selection of said portion of said other program is restrained according to predetermined rules which place a limit on which portions of said other program may be selected for crossover.

25. The process in claim 1 wherein said sample of data comprising at least one value of an independent variable associated with at least one value of a dependent variable.

26. The process in claim 1 wherein said sample of data comprising at least one value of an independent variable associated with values of more than one dependent variable.

27. The process in claim 1 wherein at least one said result produced by performing at least one said program lies outside of a region associated with said sample of data.

28. The process in claim 27 wherein said sample of data comprising at least one value of an independent variable wherein said independent variable is time.

29. The process in claim 9 wherein said best plan of action to achieve a desired result is used for the purpose of controlling a robotic device.

30. The process in claim 12 wherein said input data is an image and said pattern is an object within said image.

31. The process in claim 15 wherein at least one said randomly generated constant appropriate to the domain of said problems is inserted at random as an argument to at least one function in a created population of said programs.

32. The process in claim 15 wherein said step of assigning a value comprising:
assigning a value to each said result and associating each said value with a corresponding program which produced each said result, said value indicative of the fitness of said corresponding program in solving or partially solving a problem, said value also indicative of the efficiency of said corresponding program in solving or partially solving a problem.

33. The process in claim 15 wherein said step of assigning a value comprising:
assigning a value to each said result and associating each said value with a corresponding program which produced each said result, said value indicative of the fitness of said corresponding program in solving or partially solving a problem, said value also indicative of the parsimony of said corresponding program in solving or partially solving a problem.

34. The process in claim 15 wherein said step of assigning a value comprising:
assigning a value to each said result and associating each said value with a corresponding program which produced each said result, said value indicative of the fitness of said corresponding program in solving or partially solving a problem, said value also indicative of the ability of said corresponding program to solve or partially solve a problem while complying with additional conditions.

35. The process in claim 15 wherein said step of assigning a value comprising:
assigning a value to each said result and associating each said value with a corresponding program which produced each said result, said value indicative of the fitness of said corresponding program in solving or partially solving a problem, said value also indicative of the ability of said corresponding program to solve or partially solve a problem by reaching a subgoal which contributes to reaching a final goal.

36. A computer for solving problems comprising a processor and a memory means coupled to said processor for storing a population of programs of various sizes and shapes wherein each program is a hierarchical arrangement of functions and arguments or a randomly generated constant appropriate to the domain of a problem, said computer further comprising:
means for executing each said program to produce a result, said means for executing coupled to said memory means;
means for assigning a value to each said result and associating each said value with a corresponding program which produced each said result, said value indicative of the fitness of said corresponding program in solving or partially solving a problem, said means for assigning coupled to said memory means;

means for selecting at least one selected program from said population using selection criteria, said selection criteria based on said value associated with each said program, said selection criteria preferring each said program having a relatively high associated value over each said program having a relatively low associated value, said means for selecting coupled to said memory means;

means for choosing and performing an operation wherein each chosen operation is one of the operations of crossover or reproduction, said means for choosing and performing coupled to said memory means;

means for creating at least one new program by crossover using a group of programs if said chosen operation is crossover, said group of programs comprising said selected program and at least one other program from said population, such that any new program created by crossover comprises at least a portion of said selected program and at least a portion of said other program, said new program can differ in size and shape from said selected program and said other program, said means for creating coupled to said memory means;

means for retaining said selected program such that said selected program remains unchanged if said chosen operation is reproduction, said means for retaining coupled to said memory means;

means for adding said new program to said population, said means for adding coupled to said memory means.

37. The computer in claim 36 including a means for defining a building block comprising means for replacing a portion of said selected program by an invocation of a building block function, said building block function defined as the hierarchical arrangement of functions and arguments originally associated with said selected portion of said selected, program, said means for defining a building block coupled to said memory means.

38. The computer in claim 36 including a means for editing comprising means for applying predetermined editing rules to said selected program to produce a modified hierarchical structure of said selected program, said means for editing coupled to said memory means.

39. The computer in claim 36 wherein at least one said program in said population includes an assignment function comprising means for computing a value and means for associating a name with said value, said value referenced by other said programs in said population using said name.

40. The computer in claim 36 wherein at least one said program in said population includes an iteration function, wherein a portion of said program is performed repeatedly until a predicate condition is satisfied.

41. The computer in claim 36 wherein at least one said program in said population includes an iteration function comprising means for repeatedly performing a portion of said program until a specified number of iterations is completed.

42. The computer in claim 36 wherein at least one said program in said population includes a recursion function comprising means for recursively performing a portion of said program until a base condition is reached.

43. The computer in claim 36 wherein an individual program in said population attaining a pre-established value of fitness with respect to solving a problem is designated as a solution to said problem, said computer including means for translating said program representing a solution to said problem into a different programming language while maintaining the logical consistency of said program representing a solution to said problem.

44. The computer in claim 36 including means for creating an initial population of programs coupled to said memory means, said programs consisting of hierarchical arrangements of functions and arguments available for a particular problem, said means for creating an initial population of programs comprising means for constructing said hierarchical arrangements according to predetermined rules of construction which place a limit on which functions can occur at particular points in said hierarchical arrangement.

45. The computer in claim 36 wherein said means for creating at least one new program by crossover includes restraining means such that selection of said portion of said other program is restrained according to predetermined rules which place a limit on which portions of said other program may be selected for crossover.

46. The computer in claim 36 wherein said population of programs includes at least one program including said randomly generated constant appropriate to the domain of said problem as an argument to at least one function of said program.

47. The computer in claim 36 wherein said means for assigning a value comprising:

means for assigning a value to each said result and associating each said value with a corresponding program which produced each said result, said value indicative of the fitness of said corresponding program in solving or partially solving a problem, said value also indicative of the efficiency of said corresponding program in solving or partially solving a problem.

48. The computer in claim 36 wherein said means for assigning a value comprising:

means for assigning a value to each said result and associating each said value with a corresponding program which produced each said result, said value indicative of the fitness of said corresponding program in solving or partially solving a problem, said value also indicative of the parsimony of said corresponding program in solving or partially solving a problem.

49. The computer in claim 36 wherein said means for assigning a value comprising:

means for assigning a value to each said result and associating each said value with a corresponding program which produced each said result, said value indicative of the fitness of said corresponding program in solving or partially solving a problem, said value also indicative of the ability of said corresponding program to solve or partially solve a problem while complying with additional conditions.

50. The computer in claim 36 wherein said means for assigning a value comprising:

means for assigning a value to each said result and associating each said value with a corresponding program which produced each said result, said value indicative of the fitness of said corresponding program in solving or partially solving a problem, said value also indicative of the ability of said corresponding program to solve or partially solve a problem by reaching a subgoal which contributes to reaching a final goal.

* * * * *

UNITED STATES PATENT AND TRADEMARK OFFICE
CERTIFICATE OF CORRECTION

PATENT NO. : 5,136,686

DATED : 8/4/92

INVENTOR(S) : JOHN R. KOZA

It is certified that error appears in the above-identified patent and that said Letters Patent is hereby corrected as shown below:

```
On the title page, insert --
[*] The term of this patent subsequent to June 19, 2007, has been
disclaimed.--
```

Signed and Sealed this

Thirty-first Day of August, 1993

Attest:

BRUCE LEHMAN

*Attesting Officer*  *Commissioner of Patents and Trademarks*